(12) United States Patent
Hutton et al.

(10) Patent No.: US 12,044,064 B2
(45) Date of Patent: Jul. 23, 2024

(54) PANEL CONFIGURABLE ACCESS DOOR

(71) Applicant: ODL, Incorporated, Zeeland, MI (US)

(72) Inventors: Robert Hutton, Providence, RI (US); Ayako Takase, Cranston, RI (US); Scott Michael Brandonisio, Holland, MI (US); Daniel George Parker, Grand Rapids, MI (US); Brian Murray Sommer, Wyoming, MI (US); Richard Anthony Campbell, Holland, MI (US); Joseph Thomas Brophy, Rockford, MI (US); Casey Scott McKellar, Grand Rapids, MI (US); Benjamin Patrick Hummel, Rockford, MI (US)

(73) Assignee: ODL, Incorporated, Zeeland, MI (US)

( * ) Notice: Subject to any disclaimer, the term of this patent is extended or adjusted under 35 U.S.C. 154(b) by 268 days.

(21) Appl. No.: 17/539,571

(22) Filed: Dec. 1, 2021

(65) Prior Publication Data
US 2022/0170314 A1 Jun. 2, 2022

Related U.S. Application Data

(60) Provisional application No. 63/270,692, filed on Oct. 22, 2021, provisional application No. 63/209,080,
(Continued)

(51) Int. Cl.
*E06B 3/70* (2006.01)
*E05B 47/00* (2006.01)
(Continued)

(52) U.S. Cl.
CPC ........ *E06B 3/7015* (2013.01); *E05B 47/0001* (2013.01); *E05C 19/16* (2013.01);
(Continued)

(58) Field of Classification Search
CPC ..... E06B 2003/7011; E06B 2003/7013; E06B 2003/7086; E06B 2003/7088;
(Continued)

(56) References Cited

U.S. PATENT DOCUMENTS 426,327 A   4/1890   Remmert
747,149 A   12/1903  Dahlstrom
(Continued)

FOREIGN PATENT DOCUMENTS

DE   4115577 C1   9/1992
DE   4216782 C2   2/1995
(Continued)

*Primary Examiner* — Kyle J. Walraed-Sullivan
(74) *Attorney, Agent, or Firm* — Barnes & Thornburg LLP

(57) ABSTRACT

An access door may include a core, first and second stiles defined along opposites sides of the core such that the core between the first and second stiles defines a recessed pocket with each of the first and second stiles defining a channel therein extending longitudinally along an inwardly-facing edge thereof, bottom and top elongated panels each defining tongue members at opposite sides thereof and configured to be received transversely in the recessed pocket with the tongue members received within the channels defined along the inwardly-facing edges of the first and second stiles, wherein, with the top and bottom elongated panels received in the recessed pocket, exterior faces of the first and second stiles, exterior faces of the top and bottom elongated panels, and an exposed surface of the recessed pocket between the top and bottom elongated panels define an exterior surface of one side of the door.

20 Claims, 33 Drawing Sheets

Related U.S. Application Data filed on Jun. 10, 2021, provisional application No. 63/120,453, filed on Dec. 2, 2020.

(51) Int. Cl.

| | | |
|---|---|---|
| *E05C 19/16* | (2006.01) | |
| *E05F 15/77* | (2015.01) | |
| *E06B 1/52* | (2006.01) | |
| *E06B 3/28* | (2006.01) | |
| *F21V 8/00* | (2006.01) | |
| *F21V 23/04* | (2006.01) | |
| *F21V 29/70* | (2015.01) | |
| *F21V 33/00* | (2006.01) | |
| *G07C 9/00* | (2020.01) | |
| *E05F 1/00* | (2006.01) | |
| *E05F 1/10* | (2006.01) | |
| *E05F 15/73* | (2015.01) | |
| *E06B 3/72* | (2006.01) | |
| *E06B 5/16* | (2006.01) | |
| *E06B 7/28* | (2006.01) | |
| *F21S 4/28* | (2016.01) | |
| *F21Y 115/10* | (2016.01) | |

(52) U.S. Cl.
CPC ............... *E05F 15/77* (2015.01); *E06B 1/52* (2013.01); *E06B 3/7001* (2013.01); *F21V 23/0464* (2013.01); *F21V 23/0471* (2013.01); *F21V 29/70* (2015.01); *F21V 33/006* (2013.01); *G02B 6/001* (2013.01); *G07C 9/00563* (2013.01); *E05B 2047/0016* (2013.01); *E05B 2047/0036* (2013.01); *E05B 47/0046* (2013.01); *E05B 47/0047* (2013.01); *E05F 1/002* (2013.01); *E05F 1/1083* (2013.01); *E05F 15/73* (2015.01); *E05Y 2201/46* (2013.01); *E05Y 2201/462* (2013.01); *E05Y 2400/44* (2013.01); *E05Y 2400/45* (2013.01); *E05Y 2800/106* (2013.01); *E05Y 2900/132* (2013.01); *E06B 2003/7013* (2013.01); *E06B 2003/7051* (2013.01); *E06B 3/728* (2013.01); *E06B 5/16* (2013.01); *E06B 7/28* (2013.01); *F21S 4/28* (2016.01); *F21Y 2115/10* (2016.08)

(58) Field of Classification Search
CPC .. E06B 2003/7051; E06B 3/7015; E06B 3/70; E06B 3/7003; E06B 3/82; E06B 3/822; E06B 3/827; E06B 3/86; E06B 3/72
See application file for complete search history.

(56) References Cited

U.S. PATENT DOCUMENTS

| | | | |
|---|---|---|---|
| 978,300 A | 12/1910 | Johnson | |
| 1,570,427 A * | 1/1926 | Bie .................. A47B 96/16 | |
| | | | 52/27 |
| 1,771,304 A | 7/1930 | MacGruder | |
| 1,844,096 A | 2/1932 | Levene | |
| 2,159,530 A | 5/1939 | Murphy | |
| 2,451,396 A | 10/1948 | Macleod | |
| 3,004,641 A | 10/1961 | Johnson | |
| 3,867,621 A | 2/1975 | Gewfrtz et al. | |
| 4,014,149 A | 3/1977 | Yamamoto | |
| 4,270,326 A | 6/1981 | Holter et al. | |
| 4,387,545 A | 6/1983 | Kern | |
| RE31,536 E | 3/1984 | Holdiman et al. | |
| 4,707,204 A * | 11/1987 | Heeg .................. A47B 96/201 | |
| | | | 144/368 |
| 4,811,538 A | 3/1989 | Lehnert et al. | |
| 4,939,880 A * | 7/1990 | Wang .................. E06B 7/082 | |
| | | | 52/473 |
| 5,218,807 A * | 6/1993 | Fulford .................. B32B 5/32 | |
| | | | 49/501 |
| 5,285,608 A * | 2/1994 | Costello ............... E06B 3/7001 | |
| | | | 52/456 |
| 5,417,024 A | 5/1995 | San Paolo | |
| 5,704,182 A * | 1/1998 | Schiedegger ............ E06B 9/04 | |
| | | | 52/762 |
| 5,722,213 A | 3/1998 | Morency | |
| 5,737,890 A * | 4/1998 | Heyden .................. E06B 3/984 | |
| | | | 52/456 |
| 5,839,252 A | 11/1998 | Berghorn et al. | |
| 5,921,191 A | 7/1999 | Gabel | |
| 5,961,072 A | 10/1999 | Bodle | |
| 6,058,635 A | 5/2000 | Morris | |
| 6,231,213 B1 | 5/2001 | Schmidt et al. | |
| 6,378,769 B1 | 4/2002 | Wolgamot | |
| 6,484,531 B1 | 11/2002 | Hambleton et al. | |
| 6,499,421 B1 | 12/2002 | Honigsbaum | |
| 6,745,526 B1 * | 6/2004 | Autovino .................. E06B 5/16 | |
| | | | 52/456 |
| 6,869,202 B2 | 3/2005 | Tufte | |
| 7,125,136 B1 | 10/2006 | Dedie et al. | |
| 7,264,374 B1 | 9/2007 | Spika | |
| 7,387,151 B1 | 6/2008 | Payne | |
| 7,648,251 B2 | 1/2010 | Whitehouse et al. | |
| 7,766,536 B2 | 8/2010 | Peifer et al. | |
| D625,838 S | 10/2010 | Walsh et al. | |
| 7,862,195 B2 | 1/2011 | Stack et al. | |
| 8,029,174 B2 | 10/2011 | Murray et al. | |
| 8,083,367 B2 | 12/2011 | Anderson et al. | |
| 8,160,741 B1 | 4/2012 | Shoenfeld | |
| 8,388,214 B1 | 3/2013 | Toro et al. | |
| 8,425,075 B1 | 4/2013 | Falat et al. | |
| 8,627,630 B2 | 1/2014 | Oberbroeckling | |
| 8,641,229 B2 | 2/2014 | Li | |
| 8,646,756 B2 | 2/2014 | Mann | |
| D714,963 S | 10/2014 | Plummer et al. | |
| 8,881,494 B2 | 11/2014 | Daniels et al. | |
| 8,915,033 B2 * | 12/2014 | Daniels .................. C04B 28/14 | |
| | | | 52/232 |
| 8,991,125 B2 | 3/2015 | Bergevin et al. | |
| 9,022,604 B2 | 5/2015 | Harling et al. | |
| 9,080,763 B2 | 7/2015 | Yoder et al. | |
| 9,140,054 B2 | 9/2015 | Oberbroeckling | |
| 9,265,115 B1 | 2/2016 | Dunn et al. | |
| 10,029,710 B2 | 7/2018 | Horlendsberger | |
| 10,143,315 B2 | 12/2018 | Pyle | |
| 10,194,756 B2 | 2/2019 | Gierens et al. | |
| 10,247,874 B2 | 4/2019 | Eyme | |
| 10,294,711 B2 | 5/2019 | Ali et al. | |
| 10,422,518 B2 | 9/2019 | Myers et al. | |
| 2003/0047293 A1 * | 3/2003 | Lee .................. E06B 3/72 | |
| | | | 160/236 |
| 2003/0115817 A1 | 6/2003 | Blackwell et al. | |
| 2007/0039270 A1 * | 2/2007 | Hollman ................ B27D 5/006 | |
| | | | 52/456 |
| 2007/0177391 A1 | 8/2007 | Davis et al. | |
| 2007/0193220 A1 * | 8/2007 | Daniels .................. E06B 5/16 | |
| | | | 52/784.11 |
| 2008/0013303 A1 | 1/2008 | Guarino | |
| 2008/0168731 A1 * | 7/2008 | Dudley .................. E06B 3/5892 | |
| | | | 52/745.19 |
| 2010/0180615 A1 | 7/2010 | Linder et al. | |
| 2010/0300003 A1 * | 12/2010 | Goode .................. E06B 3/72 | |
| | | | 49/504 |
| 2011/0016807 A1 | 1/2011 | Amato | |
| 2011/0232192 A1 | 9/2011 | Miller | |
| 2011/0277411 A1 * | 11/2011 | Perron .................. E06B 3/72 | |
| | | | 52/458 |
| 2012/0131787 A1 * | 5/2012 | Bergevin .................. E06B 3/72 | |
| | | | 403/294 |
| 2012/0272601 A1 | 11/2012 | Mouskis | |
| 2015/0075731 A1 * | 3/2015 | Metz .................. E06B 3/80 | |
| | | | 160/229.1 |
| 2015/0184448 A1 * | 7/2015 | Medlen .................. B32B 21/08 | |
| | | | 160/215 |

(56) References Cited

U.S. PATENT DOCUMENTS

| | | | |
|---|---|---|---|
| 2016/0297170 A1* | 10/2016 | Prescott | B32B 3/30 |
| 2017/0152703 A1 | 6/2017 | Robinson et al. | |
| 2017/0175994 A1 | 6/2017 | Kowash et al. | |
| 2018/0066429 A1* | 3/2018 | Yau | E04C 2/523 |
| 2019/0177997 A1* | 6/2019 | Springborn | E06B 11/02 |
| 2019/0239661 A1 | 8/2019 | McGowan et al. | |
| 2019/0257142 A1* | 8/2019 | Koehl | E06B 3/72 |
| 2019/0320825 A1 | 10/2019 | Coyle, Jr. et al. | |
| 2020/0248499 A1* | 8/2020 | Gouge | B27N 3/04 |

FOREIGN PATENT DOCUMENTS

| | | |
|---|---|---|
| EP | 1190825 A2 | 3/2002 |
| GB | 190817763 A | 12/1908 |
| GB | 2562073 A | 7/2018 |
| KR | 101832383 | 2/2018 |
| WO | 2005066446 A1 | 7/2005 |

\* cited by examiner

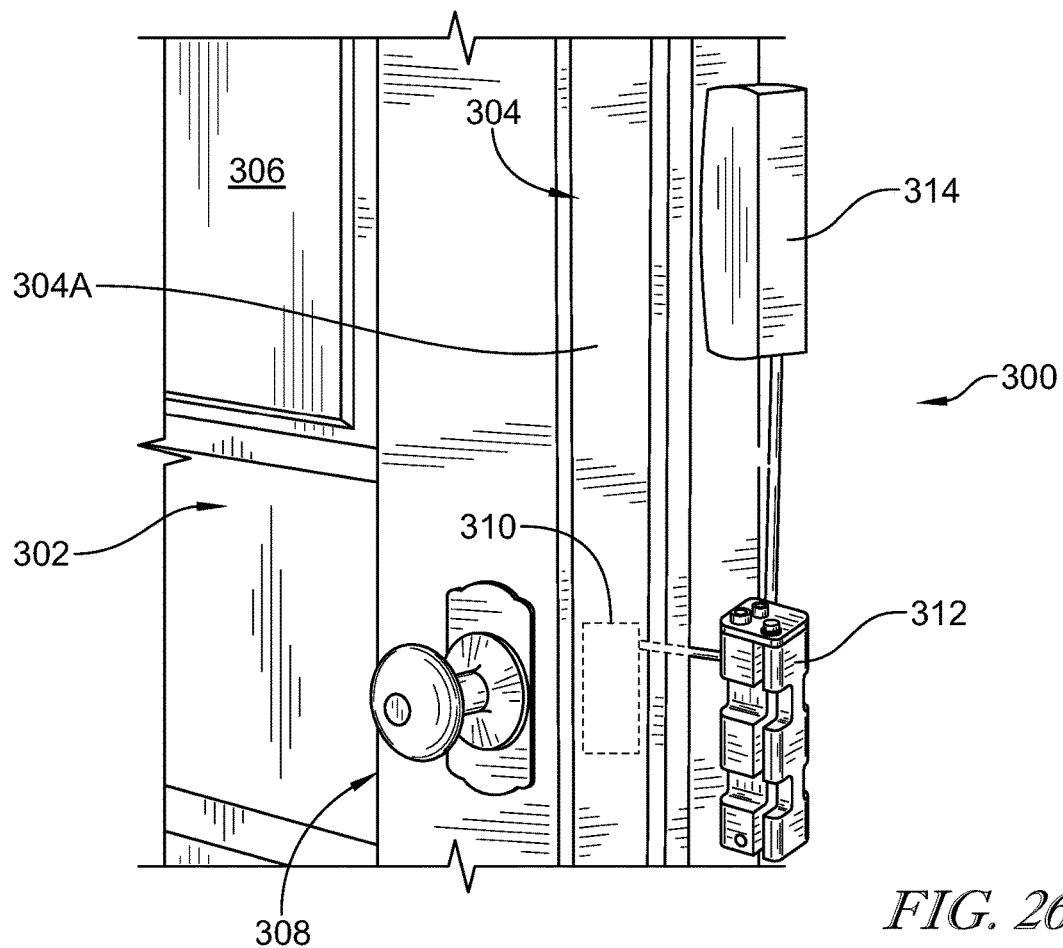
*FIG. 26*
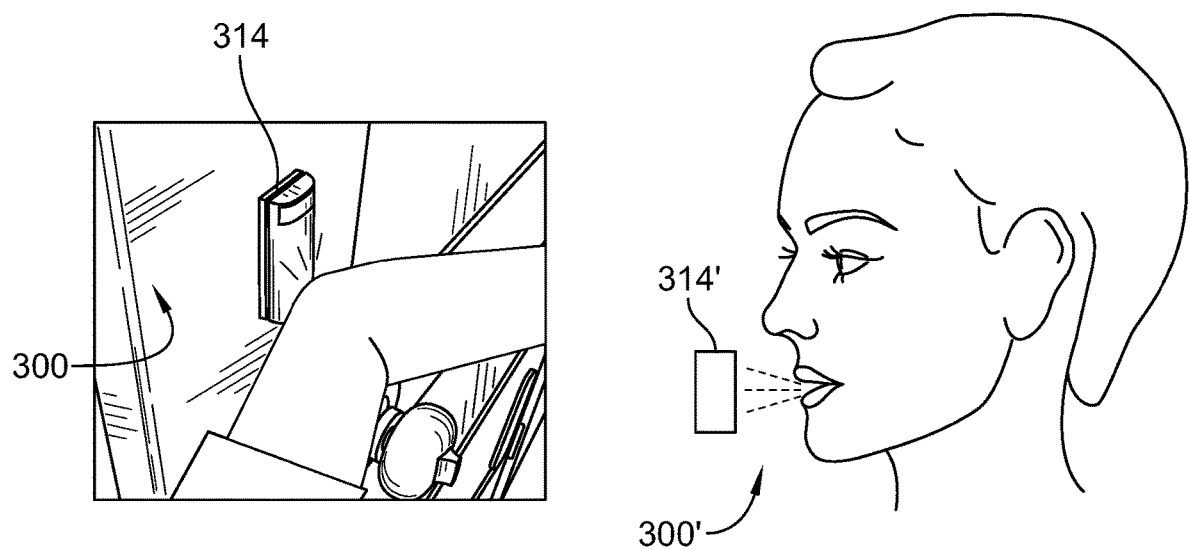
*FIG. 27A*
*FIG. 27B*

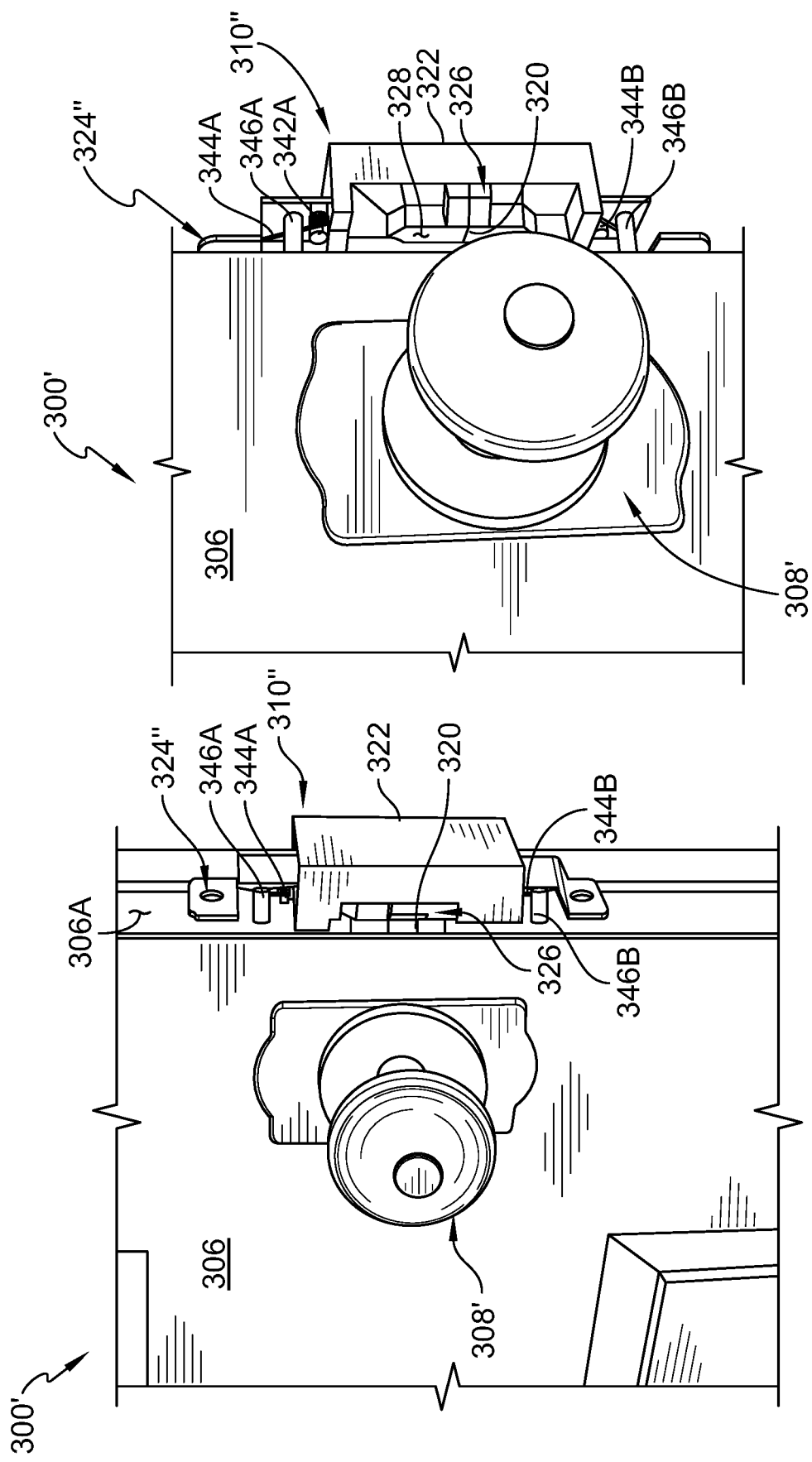

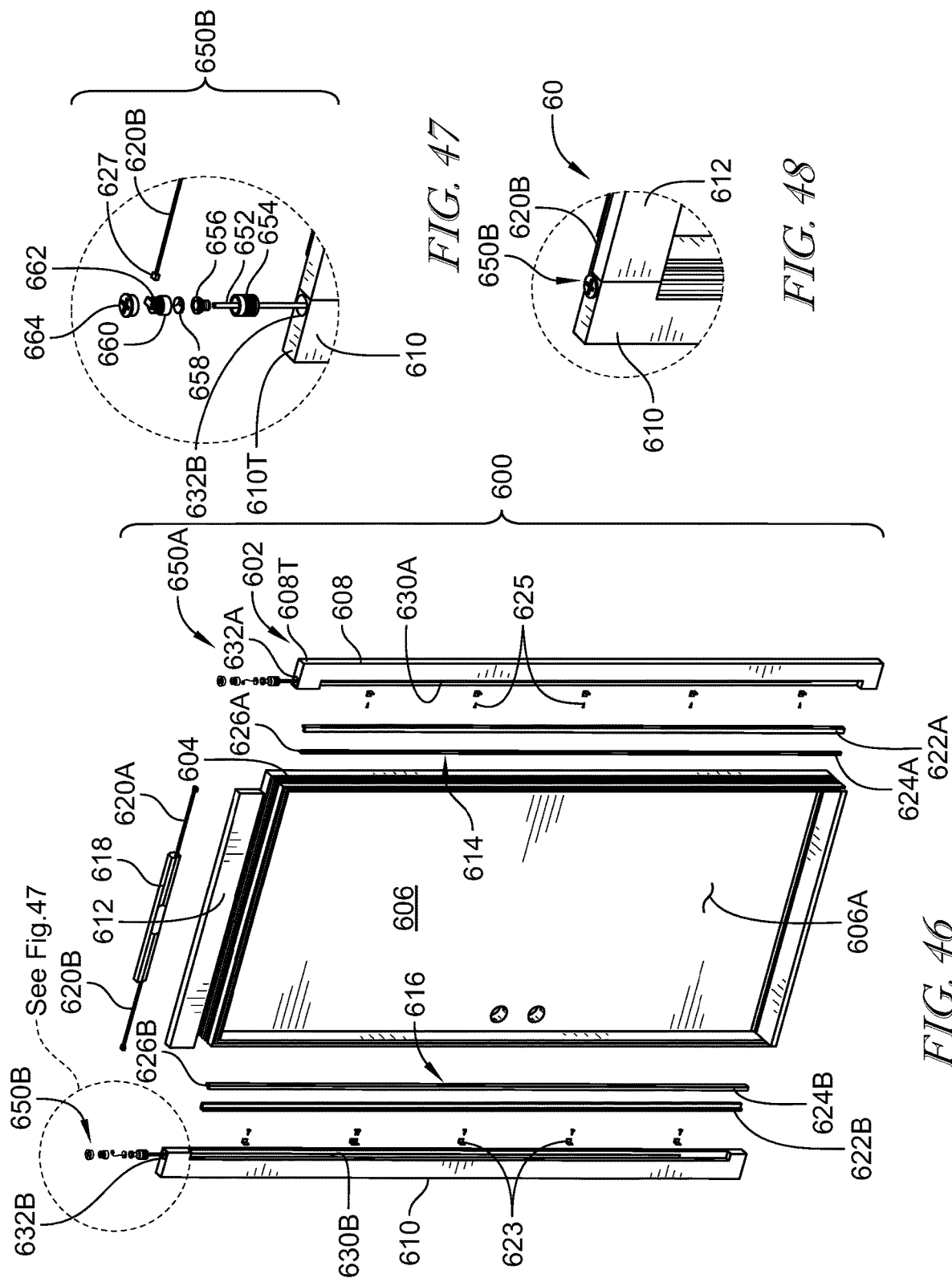

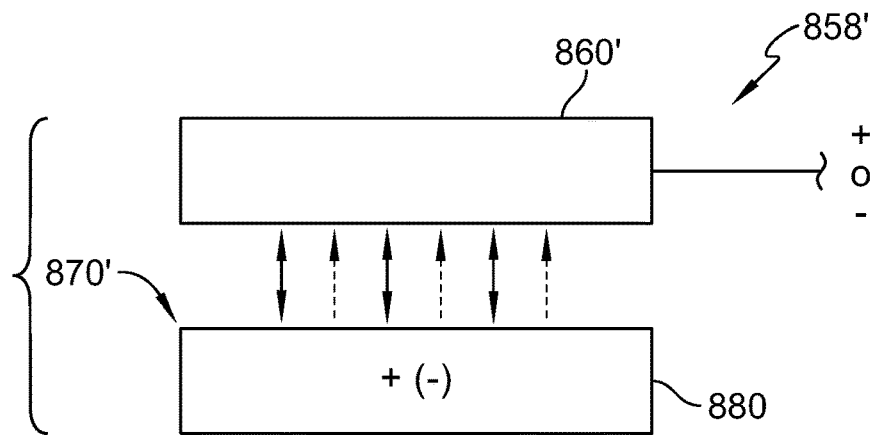
FIG. 60
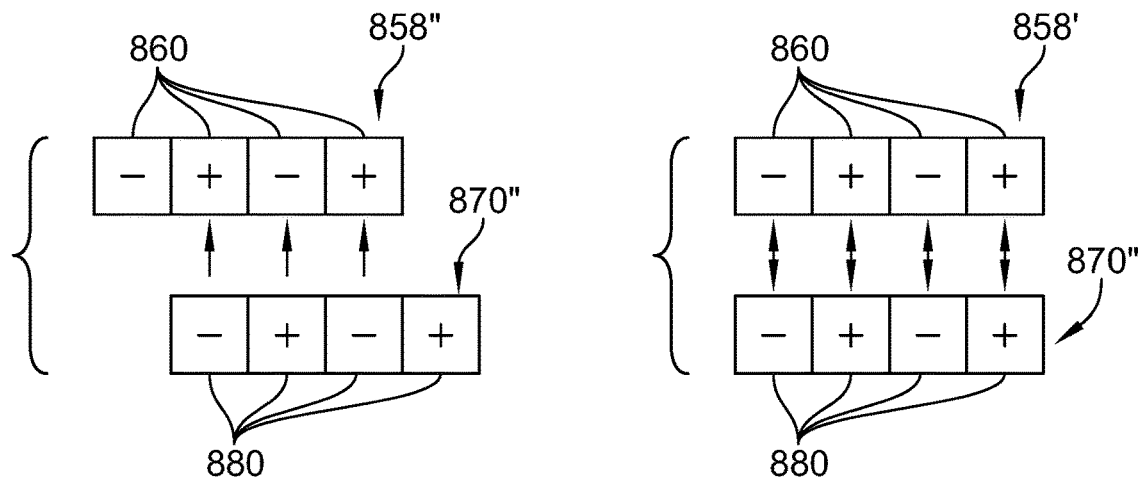
FIG. 61A  FIG. 61B
FIG. 62A  FIG. 62B

PANEL CONFIGURABLE ACCESS DOOR

CROSS-REFERENCE TO RELATED APPLICATION

This application claims the benefit of, and priority to, U.S. Provisional Patent Application Ser. No. 63/120,453, filed Dec. 2, 2020, U.S. Provisional Patent Application Ser. No. 63/209,080, filed Jun. 10, 2021 and U.S. Provisional Patent Application Ser. No. 63/270,692, filed Oct. 22, 2021, the disclosures of which are expressly incorporated herein by reference in their entireties.

TECHNICAL FIELD

The present disclosure relates generally to access doors operatively mounted in and to buildings of any type, and further to such doors and door assemblies with configurable exterior panels.

BACKGROUND

Door assemblies are conventionally used to provide selectably openable closures for entrance/exit ports of buildings and also to provide selectably openable closures for entrance/exit ports to various rooms, closets, pantries and the like within buildings. It may be desirable to design some such door assemblies to include one or more desirable features.

SUMMARY

The present disclosure may comprise one or more of the features recited in the attached claims, and/or one or more of the following features and combinations thereof. In a first aspect, a panel configurable access door for a building may comprise a core having first and second major faces opposite one another, first and second stiles defined along opposites sides respectively of the first major face such that the first major face between exterior surfaces of the first and second stiles defines a recessed pocket, each of the first and second stiles defining a channel therein extending longitudinally along an inwardly-facing edge thereof, a bottom elongated panel defining first tongue members at opposite sides thereof, the bottom elongated panel configured to be received transversely in the recessed pocket between the first and second stiles along bottom ends of the first and second stiles, the first tongue members configured to be received within the channels defined along the inwardly-facing edges of the first and second stiles to retain the bottom elongated panel in the recessed pocket, and a top elongated panel defining second tongue members at opposite sides thereof, the top elongated panel configured to be received transversely in the recessed pocket between the first and second stiles along top ends of the first and second stiles, the second tongue members configured to be received within the channels defined along the inwardly-facing edges of the first and second stiles to retain the top elongated panel in the recessed pocket, wherein, with the top and bottom elongated panels received in the recessed pocket, exterior faces of the first and second stiles, exterior faces of the top and bottom elongated panels, and an exposed surface of the recessed pocket between the top and bottom elongated panels define an exterior surface of one side of the door.

A second aspect may include the features of the first aspect, wherein the core and the first and second stiles are of uniform construction.

A third aspect may include the features of the first aspect, wherein the first and second stiles are separate from, and mounted to, the core.

A fourth aspect may include the features of the first aspect, wherein the first and second stiles each define a lip extending longitudinally along and transversely away from the inwardly-facing edge thereof adjacent to the exterior face thereof such that the channel extends along the inwardly-facing edge between the lip and the recessed pocket, the lip extending over the channel such that the channel is recessed into the inwardly-facing edge relative to the lip.

A fifth aspect may include the features of the fourth aspect, wherein the first tongue members extend from the opposite sides of the bottom elongated panel such that side edges of each of the opposite sides of the bottom elongated panel are defined between the first tongue members and the exterior surface of the bottom elongated panel, and wherein the bottom elongated panel is configured to be received transversely in the recessed pocket between the first and second stiles with the first tongue members extending into the respective channels and the with the side edges of the bottom elongated panel abutting the respective lips of the first and second stiles.

A sixth aspect may include the features of the fourth aspect, wherein the second tongue members extend from the opposite sides of the top elongated panel such that side edges of each of the opposite sides of the top elongated panel are defined between the second tongue members and the exterior surface of the top elongated panel, and wherein the top elongated panel is configured to be received transversely in the recessed pocket between the first and second stiles with the second tongue members extending into the respective channels and the with the side edges of the top elongated panel abutting the respective lips of the first and second stiles.

A seventh aspect may include the features of the first aspect, wherein the top and bottom panels are configured such that, with the top and bottom elongated panels received in the recessed pocket, the exterior faces of the first and second stiles and the exterior faces of the top and bottom elongated panels are all co-planar with one another.

An eighth aspect may include the features of the first aspect, wherein the bottom elongated panel defines a lateral channel extending along a top edge thereof, and wherein the panel configurable access door may further comprise a middle elongated panel defining a third tongue member at a bottom end thereof, the middle elongated panel configured to be received longitudinally in the recessed pocket between the first and second stiles and between the top and bottom elongated panels, the third tongue member configured to be received within the lateral channel defined along the top edge of the bottom elongated panel to retain the middle elongated panel in the recessed pocket, wherein, with the top, bottom and middle elongated panels received in the recessed pocket, the exterior faces of the first and second stiles, the exterior faces of the top and bottom elongated panels, an exterior face of the middle panel and exposed surfaces of the recessed pocket between the top, bottom and middle elongated panels define the exterior surface of the one side of the door.

A ninth aspect may include the features of the first aspect, wherein the top elongated panel defines a lateral channel extending along a bottom edge thereof, and wherein the panel configurable access door may further comprise a middle elongated panel defining a third tongue member at a bottom end thereof, the middle elongated panel configured to be received longitudinally in the recessed pocket between the first and second stiles and between the top and bottom elongated panels, the third tongue member configured to be received within the lateral channel defined along the top edge of the bottom elongated panel to retain the middle elongated panel in the recessed pocket, wherein, with the top, bottom and middle elongated panels received in the recessed pocket, the exterior faces of the first and second stiles, the exterior faces of the top and bottom elongated panels, an exterior face of the middle panel and exposed surfaces of the recessed pocket between the top, bottom and middle elongated panels define the exterior surface of the one side of the door.

A tenth aspect may include the features of the first aspect, and may further comprise a first middle elongated panel defining third tongue members at opposite ends thereof, the first middle elongated panel configured to be received transversely in the recessed pocket between the first and second stiles and between the top and bottom elongated panels, the third tongue members configured to be received within the channels defined along the inwardly-facing edges of the first and second stiles to retain the first middle elongated panel in the recessed pocket, wherein an exterior face of the first middle elongated panel further defines the exterior surface of the one side of the door.

An eleventh aspect may include the features of the tenth aspect, and may further comprise a second middle elongated panel configured to be received longitudinally in the recessed pocket between the first middle elongated panel and the top elongate panel or the bottom elongated panel, wherein an exterior face of the second middle elongated panel further defines the exterior surface of the one side of the door.

A twelfth aspect may include the features of the tenth aspect, wherein the top elongated panel defines a first lateral channel extending along a bottom edge thereof, and the first middle elongated panel defines a second lateral channel extending along a top edge thereof, and the panel configurable access door may further comprise a second middle elongated panel defining third tongue members at top and bottom ends thereof, the third middle elongated panel configured to be received longitudinally in the recessed pocket between the first and second stiles and between the top and first elongated panels, the third tongue members configured to be received within the first and second lateral channel respectively defined along the bottom edge of the top elongated panel and the top edge of the first middle elongated panel to retain the middle elongated panel in the recessed pocket, wherein, with the top, bottom, first and second middle elongated panels received in the recessed pocket, the exterior faces of the first and second stiles, the exterior faces of the top, bottom and first middle elongated panels, an exterior face of the second middle panel and exposed surfaces of the recessed pocket between the top, bottom, first middle and second middle elongated panels define the exterior surface of the one side of the door.

A thirteenth aspect may include the features of the tenth aspect, wherein the bottom elongated panel defines a first lateral channel extending along a top edge thereof, and the first middle elongated panel defines a second lateral channel extending along a bottom edge thereof, and wherein the panel configurable access door may further comprise a second middle elongated panel defining third tongue members at top and bottom ends thereof, the third middle elongated panel configured to be received longitudinally in the recessed pocket between the first and second stiles and between the bottom and first elongated panels, the third tongue members configured to be received within the first and second lateral channel respectively defined along the top edge of the top bottom panel and the bottom edge of the first middle elongated panel to retain the middle elongated panel in the recessed pocket, wherein, with the top, bottom, first and second middle elongated panels received in the recessed pocket, the exterior faces of the first and second stiles, the exterior faces of the top, bottom and first middle elongated panels, an exterior face of the second middle panel and exposed surfaces of the recessed pocket between the top, bottom, first middle and second middle elongated panels define the exterior surface of the one side of the door.

In a fourteenth aspect, a panel configurable access door for a building may comprise a core having first and second major faces opposite one another, first and second stiles defined along opposites sides respectively of the first major face such that the first major face between exterior surfaces of the first and second stiles defines a first recessed pocket, each of the first and second stiles defining a first channel therein extending longitudinally along an inwardly-facing edge thereof, third and fourth stiles defined along opposites sides respectively of the second major face such that the second major face between exterior surfaces of the third and fourth stiles defines a second recessed pocket, each of the third and fourth stiles defining a second channel therein extending longitudinally along an inwardly-facing edge thereof, a first bottom elongated panel defining first tongue members at opposite sides thereof, the first bottom elongated panel configured to be received transversely in the first recessed pocket between the first and second stiles with the first tongue members received within the first channels defined along the inwardly-facing edges of the first and second stiles to retain the first bottom elongated panel in the first recessed pocket, a first top elongated panel defining second tongue members at opposite sides thereof, the first top elongated panel configured to be received transversely in the first recessed pocket between the first and second stiles with the second tongue members received within the first channels defined along the inwardly-facing edges of the first and second stiles to retain the first top elongated panel in the first recessed pocket, a second bottom elongated panel defining third tongue members at opposite sides thereof, the second bottom elongated panel configured to be received transversely in the second recessed pocket between the third and fourth stiles with the third tongue members received within the second channels defined along the inwardly-facing edges of the third and fourth stiles to retain the second bottom elongated panel in the second recessed pocket, and a second top elongated panel defining fourth tongue members at opposite sides thereof, the second top elongated panel configured to be received transversely in the second recessed pocket between the third and fourth stiles with the fourth tongue members received within the second channels defined along the inwardly-facing edges of the third and fourth stiles to retain the second top elongated panel in the second recessed pocket, wherein, with the first top and first bottom elongated panels received in the first recessed pocket, exterior faces of the first and second stiles, exterior faces of the first top and first bottom elongated panels, and an exposed surface of the first recessed pocket between the first top and first bottom elongated panels define an exterior surface of one side of the door, and wherein, with the second top and second bottom elongated panels received in the second recessed pocket, exterior faces of the third and fourth stiles, exterior faces of the second top and second bottom elongated panels, and an exposed surface of the second recessed pocket between the second top and second bottom elongated panels define an exterior surface of an opposite side of the door.

A fifteenth aspect may include the features of the fourteenth aspect, and may further comprise at least one middle elongated panel defining third tongue members at opposite ends thereof, the at least one middle elongated panel configured to be received transversely in at least one of (i) the first recessed pocket between the first and second stiles and between the first top and first bottom elongated panels and (ii) the second recessed pocket between the second and third stiles and between the second top and second bottom elongated panels, the third tongue members configured to be received within at least one of (i) the first channels defined along the inwardly-facing edges of the first and second stiles to retain the at least one middle elongated panel in the first recessed pocket and (ii) the second channels defined along the inwardly-facing edges of the second and third stiles to retain the at least one middle elongated panel in the second recessed pocket.

In a sixteenth aspect, a method is provided for constructing a panel configurable access door for a building, wherein the panel configurable door includes a core having first and second major faces opposite one another, and first and second stiles defined along opposites sides respectively of the first major face such that the first major face between exterior surfaces of the first and second stiles defines a recessed pocket, wherein each of the first and second stiles defining a channel therein extending longitudinally along an inwardly-facing edge thereof. The method may comprise placing a bottom elongated panel, defining first tongue members at opposite sides thereof, transversely in the recessed pocket between the first and second stiles along bottom ends of the first and second stiles with the first tongue members are received within the channels defined along the inwardly-facing edges of the first and second stiles to retain the bottom elongated panel in the recessed pocket, and placing a top elongated panel, defining second tongue members at opposite sides thereof, transversely in the recessed pocket between the first and second stiles along top ends of the first and second stiles with the second tongue members received within the channels defined along the inwardly-facing edges of the first and second stiles to retain the top elongated panel in the recessed pocket, wherein exterior faces of the first and second stiles, exterior faces of the top and bottom elongated panels, and an exposed surface of the recessed pocket between the top and bottom elongated panels define an exterior surface of one side of the door.

A seventeenth aspect may include the features of the sixteenth aspect, and the method may further comprise, prior to placing at least one of the top elongated panel and the bottom elongated panel transversely in the recessed pocket between the first and second stiles, placing at least a first middle elongated panel, defining third tongue members at opposite ends thereof, transversely in the recessed pocket between the first and second stiles with the third tongue members received within the channels defined along the inwardly-facing edges of the first and second stiles to retain the at least a first middle elongated panel in the recessed pocket, wherein, with the top elongated panel and the bottom elongated panel placed transversely in the recessed pocket between the first and second stiles, the at least a first middle elongated panel is positioned in the recessed pocket between the top and bottom elongated panels, and wherein an exterior face of the at least a first middle elongated panel, the exterior faces of the top and bottom panels, the exterior faces of the first and second tiles and exposed surfaces of the recessed pocket between the first, second and at least one additional elongated panels together define the exterior surface of the one side of the door.

An eighteenth aspect may include the features of the seventeenth aspect, wherein the top elongated panel defines a first lateral channel extending along a bottom edge thereof, and the at least a first middle elongated panel defines a second lateral channel extending along a top edge thereof, and wherein the method may further comprise, prior to placing the top elongated panel transversely in the recessed pocket between the first and second stiles, placing a second middle elongated panel, defining fourth tongue members at top and bottom ends thereof, longitudinally in the recessed pocket between the first and second stiles with the fourth tongue member at the bottom end of the second middle elongated panel received within the second lateral channel defined along the top edge of the at least a first middle elongated panel, and placing the top elongated panel transversely in the recessed slot between the first and second stiles with the fourth tongue member at the top end of the second middle elongated panel received within the first lateral channel defined along the bottom edge of the top elongated panel, to retain the second middle elongated panel in the recessed pocket, wherein, with the top elongated panel, the bottom elongated panel, the at least a first additional elongated panel and the second middle elongated panel all received in the recessed pocket, the exterior faces of the first and second stiles, the exterior faces of the top, bottom and at least a first middle elongated panels, an exterior face of the second middle panel and exposed surfaces of the recessed pocket between the top, bottom, at least a first middle and the second middle elongated panels together defining the exterior surface of the one side of the door.

A nineteenth aspect may include the features of the seventeenth aspect, wherein the bottom elongated panel defines a first lateral channel extending along a top edge thereof, and the at least a first middle elongated panel defines a second lateral channel extending along a bottom edge thereof, and wherein the method may further comprise, prior to placing the at least a first middle elongated panel transversely in the recessed pocket between the first and second stiles, placing a second middle elongated panel, defining fourth tongue members at top and bottom ends thereof, longitudinally in the recessed pocket between the first and second stiles with the fourth tongue member at the bottom end of the second middle elongated panel received within the first lateral channel defined along the top edge of the bottom elongated panel, and placing the at least a first middle elongated panel transversely in the recessed slot between the first and second stiles with the fourth tongue member at the top end of the second middle elongated panel received within the second lateral channel defined along the bottom edge of the at least a first middle elongated panel, to retain the second middle elongated panel in the recessed pocket, wherein, with the top elongated panel, the bottom elongated panel, the at least a first additional elongated panel and the second middle elongated panel all received in the recessed pocket, the exterior faces of the first and second stiles, the exterior faces of the top, bottom and at least a first middle elongated panels, an exterior face of the second middle panel and exposed surfaces of the recessed pocket between the top, bottom, at least a first middle and the second middle elongated panels together defining the exterior surface of the one side of the door.

A twentieth aspect may include the features of the seventeenth aspect, wherein the at least a first middle elongated panel includes at least two middle elongated panels with a bottom one of the at least two middle elongated panels defining a first lateral channel extending along a top edge thereof, and with a top one of the at least two middle elongated panels defining the a second lateral channel extending along a bottom edge thereof, and wherein the method may further comprise, prior to placing the top one of the at least two middle elongated panels transversely in the recessed pocket between the first and second stiles, placing a second middle elongated panel, defining fourth tongue members at top and bottom ends thereof, longitudinally in the recessed pocket between the first and second stiles with the fourth tongue member at the bottom end of the second middle elongated panel received within the first lateral channel defined along the top edge of the bottom one of the at least two middle elongated panels, and placing the top one of the at least two middle elongated panels transversely in the recessed pocket between the first and second stiles with the fourth tongue member at the top end of the second middle elongated panel received within the second lateral channel defined along the bottom edge of the top one of the at least two middle elongated panels, to retain the second middle elongated panel in the recessed pocket, wherein, with the top elongated panel, the bottom elongated panel, the at least two middle elongated panels and the second middle elongated panel all received in the recessed pocket, the exterior faces of the first and second stiles, the exterior faces of the top, bottom and the at least two middle elongated panels, an exterior face of the second middle panel and exposed surfaces of the recessed pocket between the top, bottom, at least two middle and the second middle elongated panels together defining the exterior surface of the one side of the door.

BRIEF DESCRIPTION OF THE DRAWINGS

FIG. 26 is a perspective view of an embodiment of an electric lockset system for an access door.

FIG. 27A is an embodiment of the electric strike actuator illustrated in FIG. 26.

FIG. 27B is another embodiment of the electric strike actuator illustrated in FIG. 26.

FIG. 30B is a perspective view of the electric strike of FIG. 30A engaging structures of another embodiment of the handle set mounted to the door.

FIG. 30C is another perspective view similar to FIG. 30B and illustrating operation of the automatic door opening feature.

FIG. 46 is a front perspective, assembly view of another embodiment of an illumination kit including jamb casing assemblies, each having an illumination strip mounted thereto, and a header casing assembly having a power and control module mounted thereto, wherein the jamb casing assemblies and the header casing assembly are shown mountable to a door jamb surrounding a door and to which the door is operatively mounted.

FIG. 47 is an assembly view of an embodiment of the illumination device assembly mountable in the left door casing assembly and operatively connectable to the corresponding illumination strip and to the power and control module.

FIG. 48 is an assembled view of the components illustrated in FIG. 47.

FIG. 60 is a simplified diagram of an alternate embodiment of the magnet assemblies illustrated in FIGS. 58 and 59A-59B.

FIG. 61A is a simplified, top-plan view of another alternate embodiment of the magnet assemblies illustrated in FIGS. 58 and 59A-59B shown controlled to a door closed position in which the magnet assemblies are magnetically attracted to one another.

FIG. 61B is a simplified, top plan view similar to FIG. 61A with the magnet assemblies shown controlled to a door open position in which the magnet assemblies magnetically repel one another to force open the door.

FIG. 62A is a simplified diagram of yet another alternate embodiment of the magnet assemblies illustrated in FIGS. 58 and 59A-59B shown controlled to a door closed position in which the magnet assemblies are magnetically attracted to one another.

FIG. 62B is a simplified diagram similar to FIG. 62A with the magnet assemblies shown controlled to a door open position in which the magnet assemblies magnetically repel one another to force open the door.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to various features of door or door assembly mountable to a door jamb assembly of a building. The term "building," as used in the preceding sentence, should be understood broadly to mean any structure to which a door may be pivotably mounted (e.g., via one or more hinges) or otherwise mounted such that the door is movable between open and closed positions relative to the building. Examples of "buildings" intended to fall within the scope of this disclosure include, but are not limited to, residential buildings, e.g., residential homes, condominiums, duplexes, apartment buildings, etc., commercial buildings, government buildings (at any level of government), institutional buildings, e.g., medical or otherwise, educational buildings, and the like. In the following, it will be understood that whereas one or more of the features illustrated in the attached figures and/or described below may be particularly well suited for an exterior door application or for an interior door application in any such building, no such limitation is intended by this disclosure. Rather, any of the features illustrated in the attached figures and/or described below may be implemented in an exterior door application, an interior door application, a breezeway application, or any other application in which a door is operatively mounted to a building.

Figure 1:
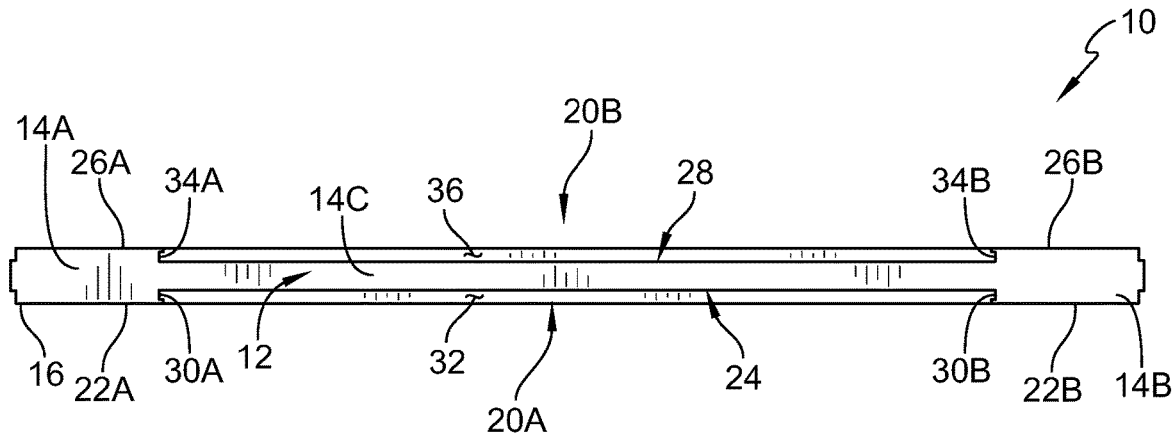
FIG. 1 is a top plan view of a configurable door for mounting to a door jamb assembly of a building.
Figure 2:
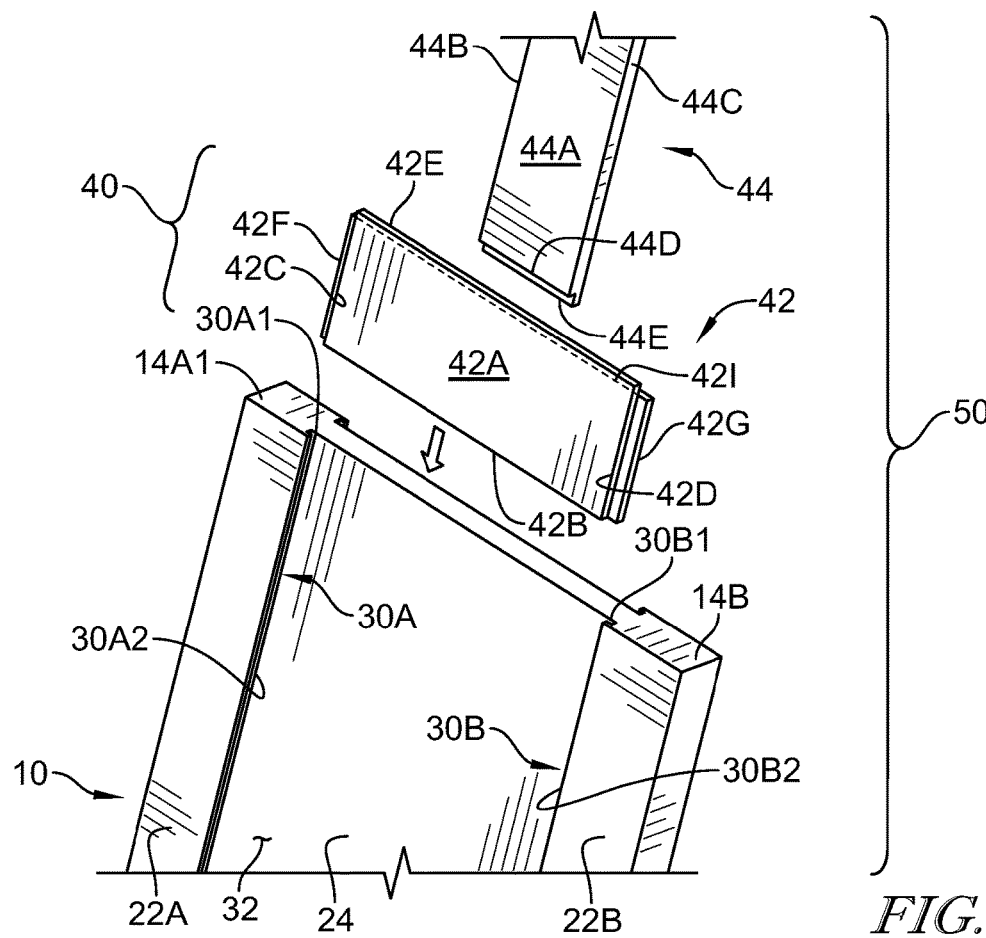
FIG. 2 is a front perspective view of a portion of the configurable door FIG. 1 illustrating a portion of an example panel assembly being slidably received between the door stiles.
Figure 3:
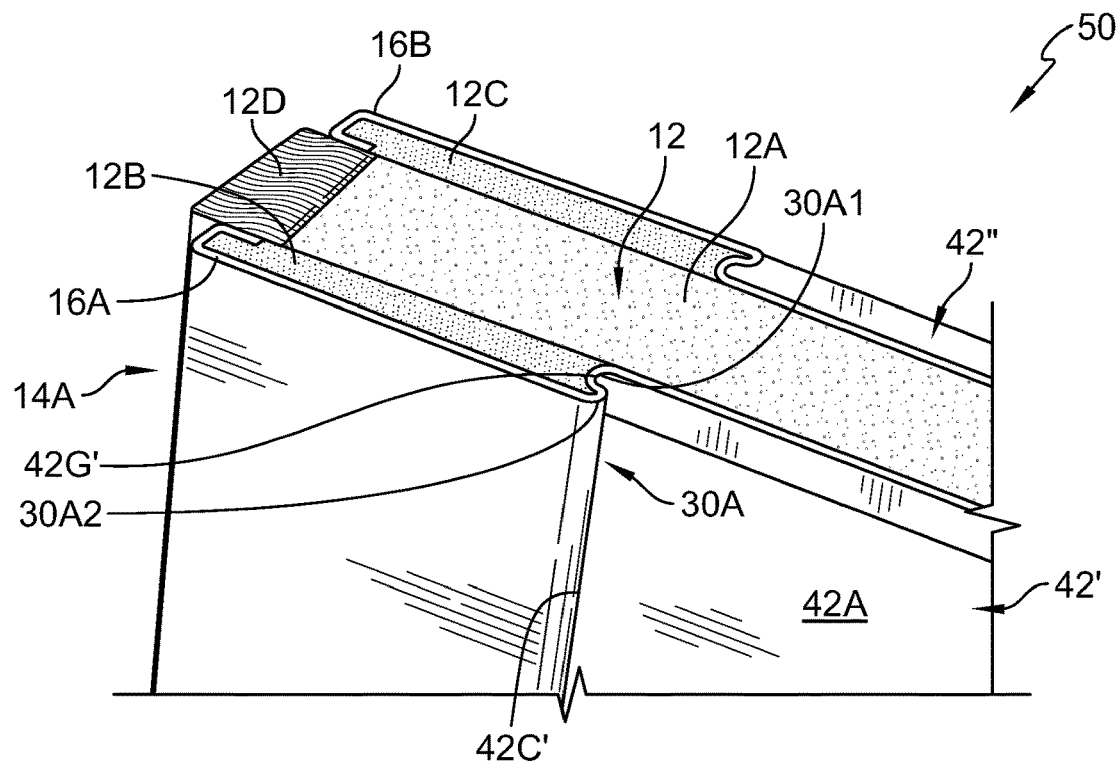
FIG. 3 is a top perspective view of a portion of the configurable door of FIGS. 1 and 2 illustrating example configurations of a channel formed in the inwardly-facing surface of one of the stiles and a corresponding end of a top panel received therein.

Referring now to FIGS. 1-3, an embodiment of a configurable door 10 is shown to which various combinations of panels 40 may be mounted to produce a resulting paneled door 50 having any of a plurality of different panel configurations. In the illustrated embodiment, the door 10 includes a core 12 which generally defines a shape of the door 10, e.g., rectangular, square or other shape. Vertically extending stiles 14A, 14B extend along opposite faces of the core 12 adjacent to opposite sides thereof, with a substantially panel 14C extending between the stiles 14A, 14B. Each stile 14A, 14B each illustratively extends along length of the core 12 from a bottom end to a top end of the core such that the panel 14C is bound on its sides by the stiles 14A, 14B and terminates at the top and bottom ends of the core 12, although in alternative embodiments either or both of the stiles 14A, 14B may stop short of the top and/or bottom of the core 12. In the illustrated embodiment, the panel 14C has planar surfaces, although in alternate embodiments the one or both of the faces of the panel 14C may define one or more non-planar features, regions or areas. In the illustrated embodiment, the stiles 14A, 14B are formed by affixing material strips to and along the opposed surfaces of the core 12 adjacent to the opposite sides thereof. This is illustrated by example in FIG. 3 in which two such strips 12B, 12C are shown affixed to opposite sides of a separate planar core member 12A to form of the stile 14A. The stile 14B may illustratively be similarly constructed. In alternate embodiments, the core member 12A and strips 12B, 12C forming the stiles 14A and/or 14B may be of uniform construction. In any case, the material used to form at least the core member 12A, and in some embodiments the entirety of the core 12, is a conventional fire-proof or fire-retardant material. In some embodiments in which the core member 12A is separate from the strips 12B, 12C, the strips 12B, 12C may be formed of any conventional material which may or may not be fire-proof or fire-retardant.

A door skin 16 is illustratively affixed to the core 12 to define the opposite faces of the door 10. In the illustrated embodiment, the door skin 16 provided in the form of two separate door skins 16A, 16B respective affixed to opposite faces of the core 12 as best seen in FIG. 3, although in alternate embodiments more or fewer skins may be used to provide the door skin 16. As one non-limiting example, the door skin 16A may include three separate sections; one mounted over and affixed to a central face 24 of the core 12, one mounted over and affixed to the stile strip 12B of the stile 14A and one mounted over and affixed to the stile strip of the stile 14B. The door skin 16B may, in such embodiments similarly include three such sections, or may instead include more or fewer sections. In some embodiments, one or both of the door skins 16A, 16B may be formed of a conventional steel, aluminum or other metal or metal composite, although in other embodiments either or both of the door skins 16A, 16B may be formed of one or a combination of other conventional door skin materials, examples of which may include, but are not limited to, fiberglass, fiber-reinforced plastic, polymer, ceramic, wood veneer, engineered wood, natural and/or synthetic laminate (high pressure or otherwise), high density fiberboard (HDF), medium density fiberboard (MDF), or the like. In any case, hardware-mounting strips 12D are illustratively mounted to and along the sides of the door 10, e.g., after the door skin 16 is applied. The hardware-mounting strips 12D (only one shown in FIG. 3) may, for example, be made of wood, although one or other materials to which door hinges and door-knobs/locksets can be mounted may alternatively be used.

In some embodiments, no door skin 16 is applied to the core 12, and in such embodiments the core 12 is formed of a material suitable for defining the exterior surface of the door 12. As such, as used hereinafter, the term "core" may illustratively refer to embodiments in which no door skin 16 is applied to the core 12 or to embodiments in which the a door skin 16 is applied to the core 12 as illustrated by example in FIG. 3.

As best illustrated in FIG. 1, the resulting configurable door 10 illustratively defines a first face 20A and a second face 20B opposite the first face 20A. The first face 20A illustratively includes substantially co-planar, or at least parallel, faces 22A, 22B of the stiles 14A, 14B respectively, and a central face 24 extending between the faces 22A, 22B of the stiles 14A, 14B and between top and bottom ends of the door 10, all defined by an outer (or outwardly-facing) surface of the door skin 16A. The central face 24 is illustratively recessed relative to the faces 22A, 22B of the stiles 14A, 14B so as to form a pocket 32 between the central face 24 and the two opposed, inwardly-facing edges 30A, 30B of the stiles 14A, 14B respectively. The second face 20B illustratively also includes substantially co-planar, or at least parallel, faces 26A, 26B of the stiles 14A, 14B respectively, and a central face 28 extending between the faces 26A, 26B of the stiles 14A, 14B and between top and bottom ends of the door 10, all defined by an outer (or outwardly-facing) surface of the door skin 16B. The central face 28 is illustratively recessed relative to the faces 26A, 26B of the stiles 14A, 14B so as to form a pocket 36 between the central face 28 and the two opposed, inwardly-facing edges 34A, 34B of the stiles 14A, 14B respectively. In some embodiments, the dimensions of the pockets 32, 36 are the same, although in other embodiments the dimensions of the pocket 32 may be different, e.g., in width, length and/or depth, than those of the pocket 36. In some alternate embodiments, only one of the faces 20A, 20B may be configured to form the respective pocket 32, 36, and the opposite face 20A, 20B may be configured in a conventional manner, e.g., as a conventional door blank or to include one or more panels secured thereto in a conventional manner.

In one embodiment, the inwardly-facing edges 30A, 30B, 34A, 34B each define recessed channels between the respective outer surface 22A, 22B, 26A, 26B of the respective stile 14A, 14B and the respective central face 24, 28 of the respective face 20A, 20B of the door 10. As best shown in FIG. 3, an embodiment of the inwardly-facing edge 30A of the stile 14A is shown which defines such a channel 30A1, adjacent to the central face 24. The channel 30A1 extends along the length of the edge 30A of the stile 14A and also extends inwardly into the stile 14A away from the edge 30A such that the remaining portion of the inner edge 30A of the stile 14A forms a flange or lip 30A2 which extends over the channel 30A1. The channel 30A1 is thus recessed into the inner edge 30A of the stile 14A and is at least partially hidden or covered by the flange 30A2. A similar or identical channel 30B1 is formed in the inwardly-facing edge 30B of the stile 14B, and a similar or identical flange or lip 30B2 formed by the remaining portion of the inner edge 30B of the stile 14B extends over the channel 30B as just described. In some embodiments, similar or identical channels and flanges may be formed in the inwardly-facing edges 34A, 34B of the stiles 14A, 14B.

The configurable door 10 illustrated in FIGS. 1-3 and described above is illustratively an integral structure; that is, the core 12, stiles 14A, 14B, and skin 16 are assembled together to form the configurable door 10 as a single unit. As illustrated by example in FIGS. 2-4 and described in detail below, various combinations of panels 40 may be received within the pocket 32 and positioned on the central face 24 of the door 12, and some such panels will be configured to be received within the opposing channels 30A1, 30B1. In some embodiments which include the pocket 36, various combinations of panels 40 may likewise be received within the pocket 36 and positioned on the central face 28 such that each face 20A, 20B of the door 10 may be selectively provided with any desired panel configuration.

Referring now specifically to FIGS. 2 and 3, one example combination of panels 40 is shown mountable to the configurable door 10 within the pocket 32 to produce a resulting paneled door 50, i.e., which is paneled on at least the face 20A of the configurable door 10. In the illustrated embodiment, the example combination of panels 40 includes 3 separate elongated panels; a bottom rail panel 42, a single, vertical disposed middle panel 44 and a top rail panel 42', wherein the middle panel 44 abuts the bottom rail panel 42 and the top rail panel 42' at opposite ends thereof. In the illustrated embodiment, the bottom rail panel 42 has a front face 42A which will be exposed and facing outwardly away from the face 24 of the door 10, and an opposite rear face which will be received against the central face 24. The front face 42A illustratively terminates at a bottom edge 42B, at opposed side edges 42C, 42D and at a top edge 42E opposite the bottom edge 42B. In the illustrated embodiment, the bottom edge 42B is illustratively planar so as to form, together with the bottom end of the door 10, a planar bottom end of the resulting paneled door 50, although in other embodiments the bottom edge 42B may have a piecewise planar or non-planar bottom edge 42B.

Tongue members 42F and 42G extend outwardly away from the respective side edges 42C, 42D of the front face 42A of the panel 42. The tongue members 42F, 42G illustratively extend along the lengths of the respective side edges 42C, 42D and have thicknesses sized to be received within the channels 30A1, 30B1 of the inwardly facing edges 30A, 30B of the stiles 14A, 14B respectively. The tongue members 42F, 42G illustratively extend perpendicularly away from the respective side edges 42C, 42D of the front face 42A of the panel 42 by a length approximately equal to, or slightly less than, the depth of the channels 30A1, 30B1 so that the side edges 42C, 42D abut the terminal ends of the flanges 30A2, 3062 as the tongue members 42F, 42G are received within the respective channels 30A1, 30B1. As such, the bottom rail panel 42 is illustratively mounted to the configurable door 10 within the pocket 32 by inserting the tongue members 42F, 42G of the panel 42 into the respective channels 30A1, 30B1 of the inwardly facing edges 30A, 30B of the stiles 14A, 14B respectively with the front face 42A facing away from the central face 24 of the door 10, and then sliding the panel 24 into place adjacent to the bottom end of the door 10, e.g., such that the bottom edge 42B of the panel 24 is flush with the bottom edge of the door 10. Illustratively, the panel 42 may be so mounted by inserting the panel 42 into the pocket 32 at the top end of the door 10 or at the bottom end of the door 10. In some embodiments, the thicknesses or widths of the tongue members 42F and 42G, the respective side edges 42C, 42D of the panel 42, the channels 30A1, 30B1 and the flanges 30A2, 30B2 of the stiles 14A, 14B respectively are all sized such that, with the panel 42 slid into engagement with the inwardly-facing edges 30A, 30B of the stiles 14A, 14B, the front face 42A of the panel 42 is flush, i.e., co-planar, with the front faces 20A, 20B of the stiles 14A, 14B respectively.

The middle panel 44 has a front face 44A which will be exposed and facing outwardly away from the face 24 of the door 10, and an opposite rear face which will be received against the central face 24. The front face 44A illustratively terminates a bottom edge 44D, at opposed side edges 44B, 42C and at a top edge (not shown) opposite the bottom edge 44D. In the illustrated embodiment, the side edges 44B, 44C are each illustratively planar, although in other embodiments either or both of the side edges 44B, 44C may be piecewise planar or non-planar.

In the illustrated embodiment, a tongue member 44E extends outwardly away from the bottom edge 44D of the front face 44A of the middle panel 44, and illustratively extends along the width of the bottom edge 44D. In this embodiment, the top edge 42E of the front face 42A of the panel 42 is notched so as to form a downwardly-stepped surface 421 which is illustratively parallel with the top edge 42E and which runs the length of the panel 42, such that the portion of the front surface 42A of the panel adjacent to the top edge 42E forms a flange and such that the panel 42 forms a channel between this flange and the central face 24 of the door 10 upon mounting of the panel 42 to the door. The tongue member 44E extending downwardly away from the bottom edge 44D of the middle panel 44 illustratively has a thicknesses sized to be received within the channel defined by the flange 42E and the central face 24 of the door 10 upon mounting of the panel 42 to the door. The tongue member 44E illustratively extends perpendicularly away from the bottom edge 44D of the front face 44A of the panel 44 by a length approximately equal to, or slightly less than, the depth of this channel so that the bottom edge 44D abuts the top edge 42E of the panel 42 as the tongue member 44E is received within this channel. As such, the middle panel 44 is illustratively mounted to the configurable door 10 within the pocket 32 by positioning the panel 44 against the central face 24 of the door 10, and then sliding the panel 44 toward and into engagement with the panel 42 to insert the tongue member 44E of the panel 44 into the channel defined by the flange 42E and the central face 24 of the door 10. The panel 44 may illustratively be positioned within the pocket 32 anywhere laterally along the panel 42, and in the illustrated embodiment the panel 44 is illustratively positioned midway along the panel 24 such that the side edges 44B, 44C of the panel 44 are approximately equally spaced apart from the inwardly-facing edges 30A, 30B of the respective stiles 14A, 14B of the configurable door 10. In some embodiments, the widths or thicknesses of the bottom surface of the panel 44 extending rearwardly from the edge 44D of the panel 44, the bottom surface of the tongue member 44E, the top surface of the panel 42 at the top edge 42E of the panel 42 and the downwardly-stepped surface 421 of the panel are all sized such that, with the panels 42, 44 slid into engagement with one another, the front faces 42A, 44A of the panels 42, 44 respectively are flush, i.e., co-planar, with one another.

In the illustrated embodiment, the top rail panel 42' is illustratively identical to the bottom rail panel 42, and the top edge of the middle panel 44 is identical to the bottom edge 44D, 44E of the middle panel 44 such. The top rail panel 42' is illustratively mounted to the door 10 by inverting the panel 42' relative to the orientation of the panel 42, and then inserting the panel 42' into the pocket 32 as described with respect to the panel 42 such that the tongue members of the panel 42' engage the channels 30A1, 30B1 as described above (and as illustrated with the tongue member 42G' of the panel 42' in FIG. 3), and such that the tongue member extending upwardly away from the top edge of the middle panel 44 engages the channel defined along the bottom edge of the panel 42' also as described above. In some alternate embodiments, either or both of the top and bottom edges of the middle panel 44 may be planar, and the respective mating edges of the bottom rail panel 42 and/or of the top rail panel 42' may likewise be planar. In some embodiments in which the face 20B of the configurable door 10 is configured similarly as the face 20A, a combination of panels 40 may be likewise mounted to the opposite face 28 as further depicted by the example top rail panel 42" in FIG. 3. In such embodiments, it will be understood that the combination of panels 40 mounted to the opposite face 28 may, but need not, be the same as the combination of panels 40 mounted to the face 24 of the door 10.

Figure 4:
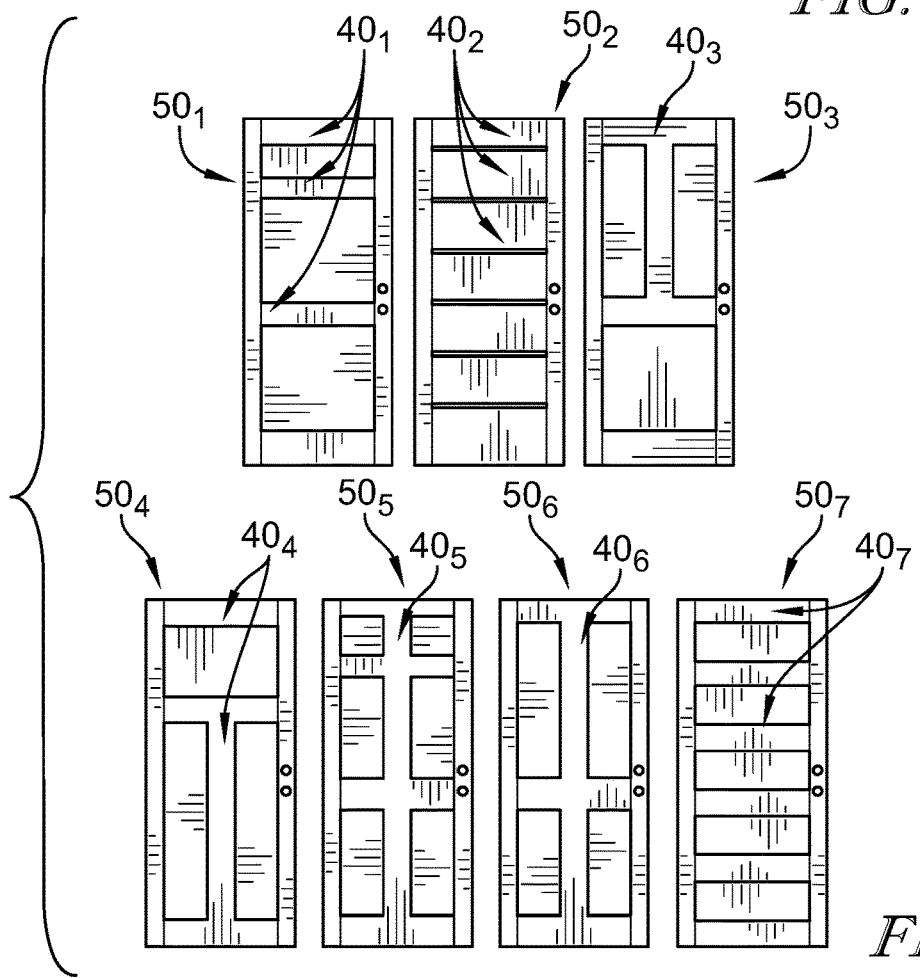
FIG. 4 includes front elevational views of several of the configurable doors of FIGS. 1-3 illustrating various different configurations of panel assemblies slidably received between the door stiles thereof.
Figure 5:
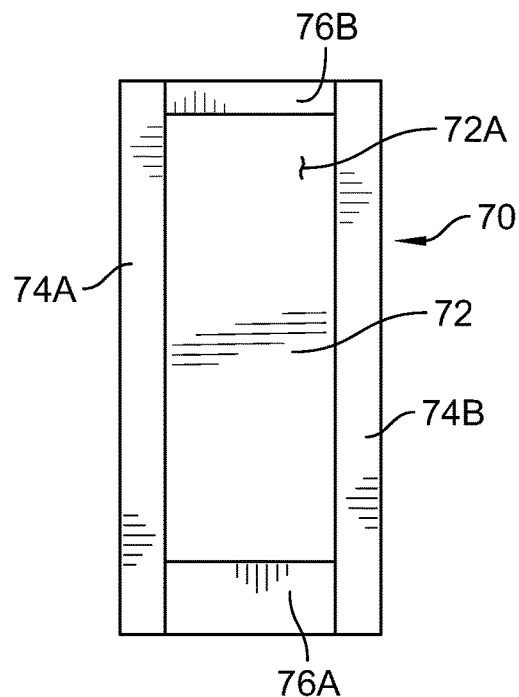
FIG. 5 is a front elevational view of a single-panel door bounded by opposed stiles and by top and bottom rails.

As briefly described above with respect to FIGS. 2 and 3, the particular combination of panels 40 shown mounted to the configurable door 10 represent only one example combination of panels 40 that may be mounted to either or both faces 24, 28 of the configurable door 10. Referring to FIG. 4, additional examples are shown of various different panel configurations. The paneled door $50_1$, for example, includes four vertically spaced-apart panels $40_1$ each extending between the stiles 14A, 14B. The paneled door $50_2$ includes seven vertically spaced-apart panels $40_2$ each extending between the stiles 14A, 14B. The paneled door $50_3$ includes four panels $40_3$ with three panels vertically spaced apart and extending between the stiles 14A, 14B, and a fourth panel extending vertically and centrally between the middle lateral panel and the top rail panel. The paneled door $50_4$ likewise includes four panels $40_4$ and represents a variant of the paneled door $50_3$ with the vertically-disposed panel extending between the middle lateral panel and the bottom rail panel. The paneled door $50_5$ includes 7 panels $40_5$ with four panels vertically spaced apart and extending between the stiles 14A, 14B, and panels extending vertically and centrally between each set of the lateral panels. The paneled door $50_6$ includes 5 panels $40_6$ with three panels vertically spaced apart and extending between the stiles 14A, 14B, and panels extending vertically and centrally between each set of the lateral panels. The paneled door $50_7$ is a variant of the paneled doors $50_1$, $50_2$ and includes six vertically spaced-apart panels $40_2$ each extending between the stiles 14A, 14B. Other panel combinations and configurations will occur to those skilled in the art, and it will be understood that any such other panel combinations and configurations are intended to fall within the scope of this disclosure. In any such configuration, the panels 40 may be formed of any conventional material including, for example, but not limited to natural wood, engineered wood, fiberglass, fiber-reinforced plastic, polymer, ceramic, natural and/or synthetic laminate (high pressure or otherwise), high density fiberboard (HDF), medium density fiberboard (MDF), or the like.

In each of the illustrated examples, it will be noted that portions of the central surface 24 (and/or 28) of the configurable door 10 define corresponding portions of the respective exposed face(s) of the resulting paneled door 50. In other words, the front faces of the combination of panels 40 mounted to the configurable door 10 make up only a portion of the respective exposed face(s) of the door 50 between the stiles 14A, 14B, and the remaining exposed portions of the central surface(s) 24 (and/or 28) make up the remaining portion(s) of the respective exposed face(s) of the door 50. In some embodiments, this is advantageous as additional panels or other coverings between the panels 40 and/or stiles 14A, 14B are not required. In other embodiments, one or more thin auxiliary panels, e.g., having the thickness of less than or equal to the width of the channels 30A1, 3061, may be inserted between various panels 40 and/or stiles 14A, 14B to cover one or more of the exposed portions of the central surface(s) 24 (and/or 28). In such embodiments, the auxiliary panel(s) may be formed of any of various materials and/or combinations thereof, examples of which include, but are not limited to, metal or metal composite, coated or uncoated glass or plexiglass, natural wood, engineered wood, fiberglass, fiber-reinforced plastic, polymer, ceramic, natural and/or synthetic laminate (high pressure or otherwise), high density fiberboard (HDF), medium density fiberboard (MDF), natural and/or synthetic textile, or the like.

Referring now to FIGS. 5-8, an embodiment of another configurable door 70 is shown to which various combinations of panels 80 may be mounted to produce a resulting paneled door 78 having any of a plurality of different panel configurations. In the illustrated embodiment, the door 70 includes a central panel 72 defining a central face 72A, stiles 74A, 74B extending upwardly along opposite respective sides of the panel 72, a bottom rail panel 76A extending between the stiles 74A, 74B along a bottom of the panel 72 and a top rail 76B extending between the stiles 74A, 74B along a top of the panel 72. In some embodiments, the door 70 is of unitary construction such that the panel 72, stiles 74A, 74B and rails 76A, 76B are together formed from a single member or single material, although in other embodiments some or all of the stile 74A, the stile 74B, the bottom rail 76A and the top rail 76B may be separate from the panel 72 and affixed thereto during manufacturing. In any case, the door 70 may be formed of any of the materials described above with respect to the door 10, 50 of FIGS. 1-4.

Figure 6:
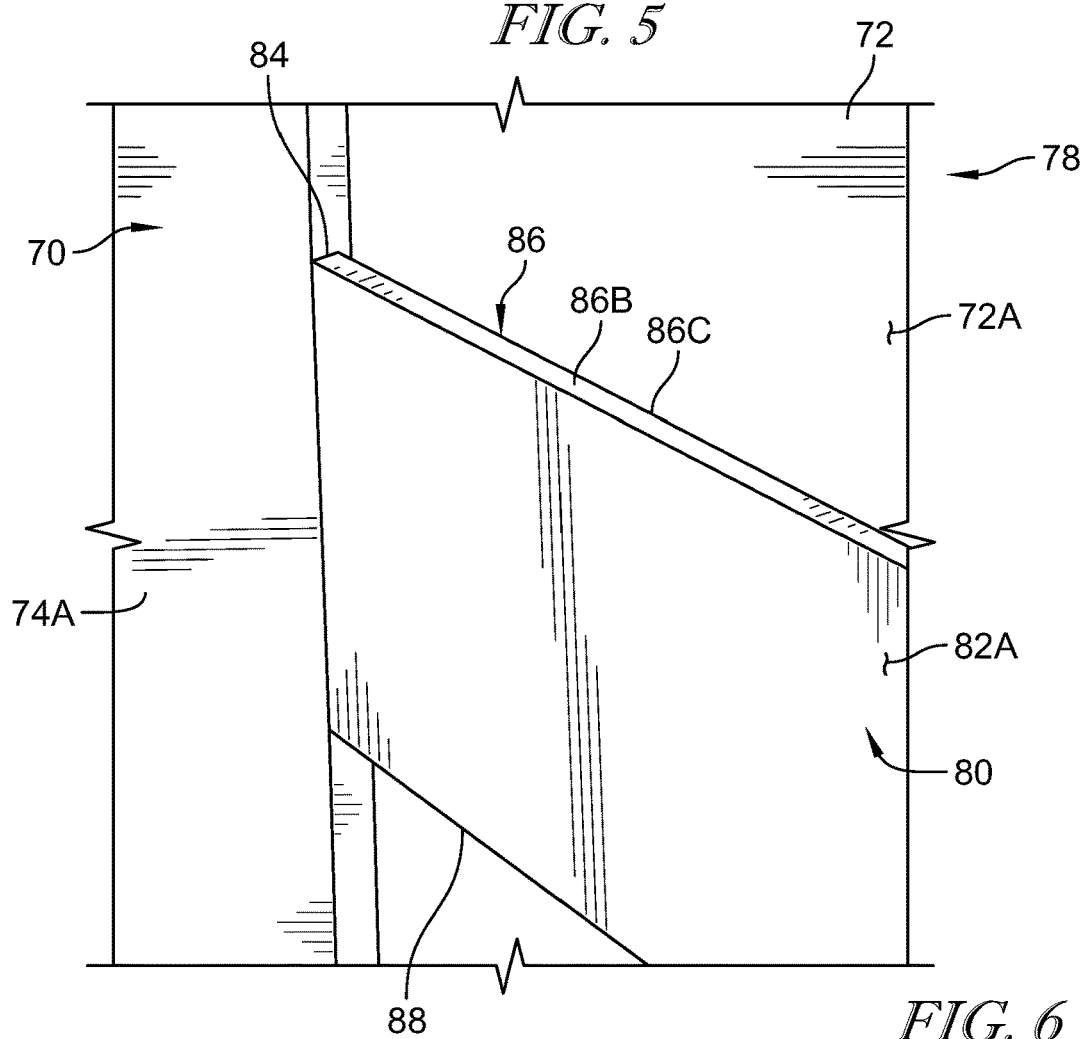
FIG. 6 is a front perspective view of the single-panel door of FIG. 5 showing a horizontal panel, defining an accessory rail along a top edge thereof, mounted between the stiles.

In the example illustrated in FIG. 6, a lateral panel 80 is shown affixed, e.g., via a conventional bonding medium and/or one or more mechanical fixation members, to the central panel 72 and/or to the stiles 74A, 74B. In any case, the lateral panel 80 is secured to the door 70 and extends between the stiles 74A, 74B as part of the paneled door 78. In the illustrated embodiment, the side edges 84 of the panel 80 are planar, as are the inwardly-facing edges of the stiles 74A, 74B, such that the side edges 84 of the panel 80 abut the inwardly-facing side edges of the stiles 74A, 74B upon mounting of the panel 80 to the door 70. In the illustrated embodiment, the bottom edge 88 of the lateral panel 80 is also planar, although in alternate embodiments the bottom edge 88 may instead be piece-wise planar and/or non-planar.

The top edge of the lateral panel 80 is illustratively configured as an accessory rail 86 to engage and support a complementarily configured accessory hanger. In this regard, the top edge of the front face 82A of the panel 80 is notched so as to form a downwardly-stepped surface 86A which is illustratively parallel with the remainder 86B of the top edge of the panel 80 and which illustratively runs the length of the panel 80, such that the exposed portion 86B of the top edge of the panel 80 adjacent to the front face 82A forms a flange 86B which extends over a channel 86C formed between the flange 86B and the central face 72 of the door 70 upon mounting of the panel 80 to the door with the downwardly-stepped surface 86A forming a terminal end or bottom of the channel 86C. In one embodiment, the channel 86C is illustratively formed by machining or otherwise modifying the panel 80. In some embodiments, the channel 86C is formed by rabbeting the top edge of the lateral panel 80. In some alternate embodiments, as depicted by example in FIG. 8, the panel 80 may be formed by affixing together opposed faces of a larger panel 801 and a smaller panel 802, and the channel 86C in this example is formed between the central face 72 of the door 70 and the two top edges of the panels 801 and 802 which are offset from one another due to their respective differences in dimension.

Figure 7:
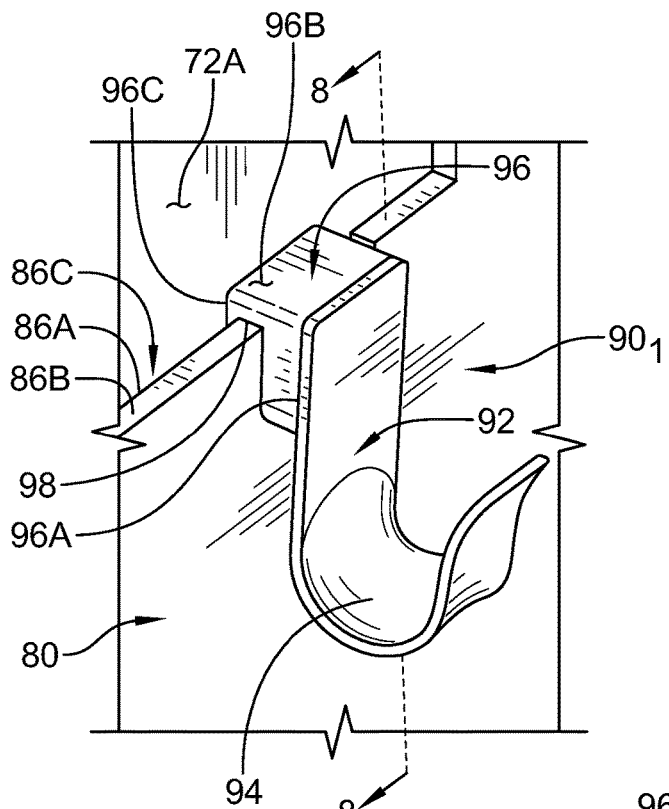
FIG. 7 is a perspective view of the door and panel of FIG. 6 showing an accessory hanger supported on and by the accessory rail.
Figure 8:
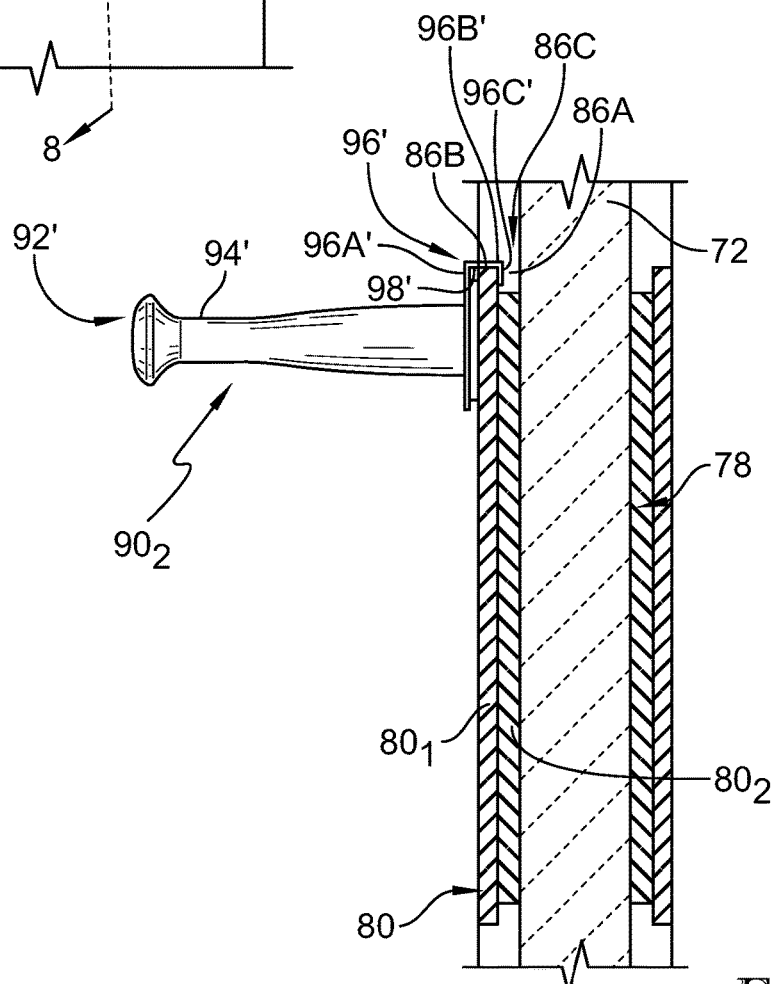
FIG. 8 is a cross-sectional view of the door and panel of FIGS. 6 and 7, as viewed along section lines 8-8 of FIG. 7, illustrating the accessory rail and another accessory a hanger supported thereon.

It will be noted that the accessory rail 86 illustrated in FIGS. 6-8 and described above, is identical to the configuration of the top edge of the panel 42 illustrated in FIG. 2 and described above. In this regard, it will be understood that any of the panels 40 disposed laterally in the pocket 32 and/or in the pocket 36 may be configured to include a top edge in the form of an accessory rail 86 as just described.

Referring now specifically to FIG. 7, an embodiment of an example accessory hanger 901 is shown which is configured to engage an accessory rail 86 such that the accessory hanger 901 is supported on and by the corresponding panel 80. The accessory hanger 901 has a hanger base 96 which engages the accessory rail 86, and the hanger base 96 is accordingly configured to be complementary to the accessory rail 86. In this regard, the hanger base 96 illustratively includes opposing, planar walls 96A, 96C joined at one end by a top wall 96B so as to define a channel 98 between the walls 96A, 96C which is bounded by the inner surfaces of the walls 96A, 96B and 96C. In the illustrated embodiment, the channel 98 is illustratively rectangular in shape to receive therein the correspondingly rectangular shape of the flange 86B defined at the top of the panel 80. In alternate embodiments in which the shape of the flange 86B is non-rectangular, the hanger base 96 will likewise be configured with a corresponding non-rectangular shape. The length of the wall 96C between the top wall 96B and the terminal end of the wall 96C is illustratively slightly less than or equal to the depth of the channel 86C, i.e., the distance between the top of the flange 86B and the top of the downwardly-stepped surface 86A, such that the terminal end of the wall 96C extends sufficiently into the channel 86C to secure the hanger base 96 to the accessory rail 86. Likewise the width of the channel 98 is sized to be only slightly greater than the width of the flange 86B such that the hanger base 96 fits snugly over the flange 86B yet is movable laterally along the accessory rail 86.

The accessory hanger 901 includes an accessory support member 92 affixed to the outer surface of the wall 96A of the hanger base 96. In the embodiment illustrated in FIG. 7, for example, the accessory support member 92 affixed to the wall 96A of the hanger base 96 is a hook-shaped member having an accessory support surface 94 defined by the curved, bottom portion of the hook. The accessory support member 92 is illustratively configured to engage and support on the accessory rail 86 various accessories, e.g., hats, coats, jackets, bags, etc.

Referring now to FIG. 8, an embodiment of another example accessory hanger 902 is shown which is configured to engage an accessory rail 86 such that the accessory hanger 902 is supported on and by the corresponding panel 80. The accessory hanger 902 has a hanger base 96' which engages the accessory rail 86, and the hanger base 96' is accordingly configured to be complementary to the accessory rail 86. In this regard, the hanger base 96' illustratively includes opposing, planar walls 96A', 96C' joined at one end by a top wall 96B' so as to define a channel 98' between the walls 96A', 96C' which is bounded by the inner surfaces of the walls 96A', 96B' and 96C'. In the illustrated embodiment, the channel 98 is illustratively rectangular in shape to receive therein the correspondingly rectangular shape of the flange 86B defined at the top of the panel 80. In alternate embodiments in which the shape of the flange 86B is non-rectangular, the hanger base 96' will likewise be configured with a corresponding non-rectangular shape. The length of the wall 96C' between the top wall 96B and the terminal end of the wall 96C' is illustratively less than the depth of the channel 86C, i.e., the distance between the top of the flange 86B and the top of the downwardly-stepped surface 86A, such that the terminal end of the wall 96C' extends sufficiently into the channel 86C to secure the hanger base 96 to the accessory rail 86. In alternate embodiments, the length of the wall 96C' may be greater or lesser than that illustrated in FIG. 8. In any case, the width of the channel 98 is sized to be only slightly greater than the width of the flange 86B such that the hanger base 96' fits snugly over the flange 86B yet is movable laterally along the accessory rail 86.

The accessory hanger 902 includes an accessory support member 92' affixed to the wall 96A' of the hanger base 96'. In the embodiment illustrated in FIG. 8, for example, the accessory support member 92' affixed to the wall 96A' of the hanger base 96' is a linearly-shaped member having an accessory support surface 94' defined by the top radial portion of the linear member. The accessory support member 92' is illustratively configured to engage and support on the accessory rail 86 various accessories, e.g., hats, coats, jackets, bags, etc. It will be understood, however, that the accessory support members 92, 92' depicted in FIGS. 7 and 8, are shown only by way of example, and that this disclosure contemplates other accessory support members that may be removably coupled to the accessory rail using one or more hanger bases 96, 96' or equivalents thereof.

Figure 9:
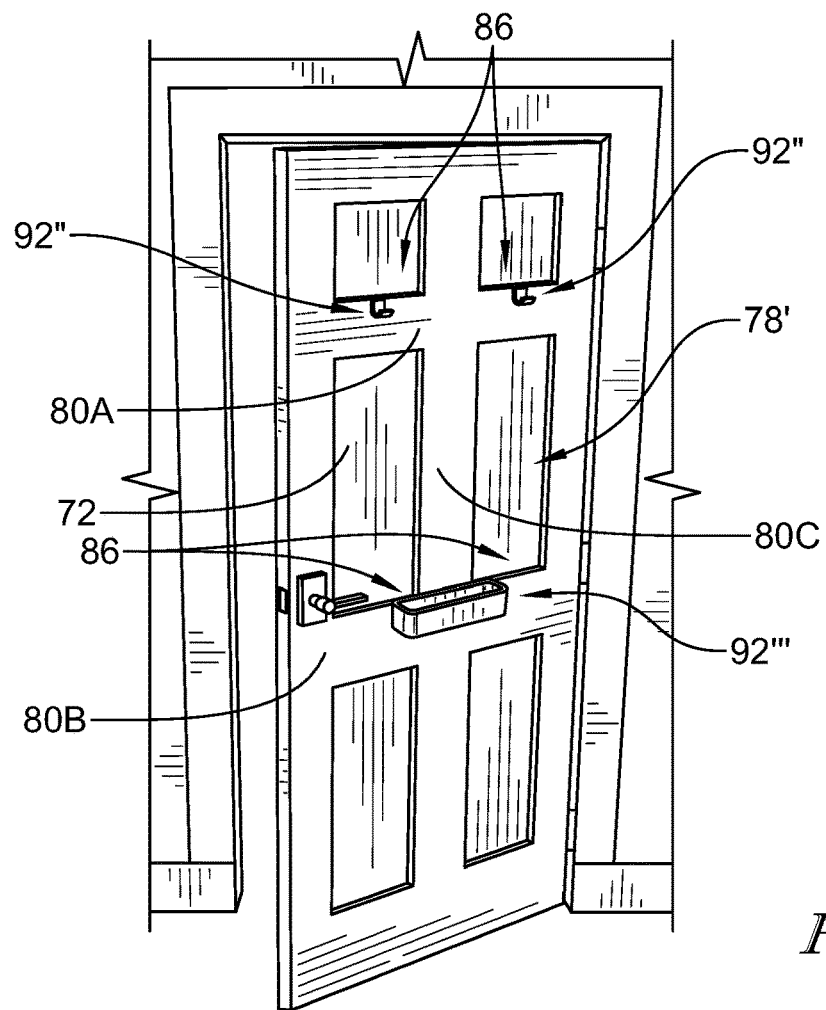
FIG. 9 is a perspective view of the door of FIG. 5 showing a number of panels mounted thereto with two such panels defining accessory rails supporting various accessory hangers and accessories.
Figure 10:
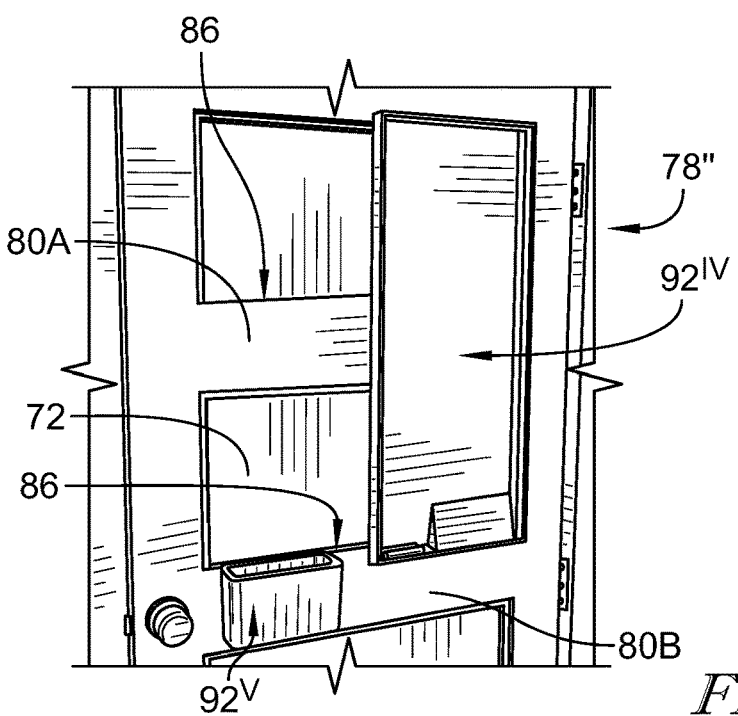
FIG. 10 is a perspective view of a portion of another door showing two panels each defining accessory rails supporting various accessories thereon.

Referring now to FIG. 9, a door 78' is shown having a number of different accessory support members 92", 92'" mounted thereto. The door 78' is similar to the door 78 illustrated in FIG. 6 but includes three panels 80A, 80B, 80C mounted thereto, wherein the lateral panels 80A and 80C each define accessory rails 86 as described above. In the illustrated embodiment, two accessory support members 92", each affixed to or integral with a different hanger base 96, are supported on either side of the panel 80B by the accessory rail 86 defined by the panel 80A, and the accessory support members 92" are illustratively provided in the form of hook-shaped members similar to the accessory support member 92 illustrated in FIG. 7. The accessory support member 92'", affixed to or integral with two (or more) spaced-apart hanger bases 96, is supported on either side of the panel 80B by the accessory support rail defined by the panel 80C, and the accessory support member 92'" is illustratively provided in the form of a basket or tray. Referring to FIG. 10, as another example, another door 78" is shown having a number of different accessory support members 92$^{IV}$, 92$^{V}$ mounted thereto. The door 78" is similar to the door 78 illustrated in FIG. 6 but includes two lateral panels 80A, 80B mounted thereto, wherein each of the lateral panels 80A and 80C define accessory rails 86 as described above. In the illustrated embodiment, the accessory support members 92$^{IV}$ is affixed to or integral with two (or more) different hanger bases 96, with at least one hanger base 96 supported by the accessory rail 86 defined by each panel 80A, 80B, and the accessory support member 92$^{IV}$ is illustratively provided in the form of a writing board (e.g., a so-called "white board", blackboard, chalkboard or the like). The accessory support member 92$^{V}$, affixed to or integral with two (or more) spaced-apart hanger bases 96, is supported by the accessory support rail defined by the panel 80B, and the accessory support member 92$^{V}$ is illustratively provided in the form of another basket or tray.

Referring now to FIGS. 11A-12B, another embodiment of an accessory rail 110 is shown. In the illustrated embodiment, the accessory rail 110 is mounted to a conventional solid, e.g., paneled, door 100, although it will be understood that the accessory rail 110 may alternatively be mounted to any door. The accessory rail 110 illustratively includes an elongated channel member 114 mounted within a slot 112 formed at least partially into a raised panel 102 on one face 100A of the door 100, and defining an elongated channel 116 laterally disposed along the face 100A of the door and configured to support an accessory hanger 118 slidably movable along the channel 116. In some embodiments, as illustrated by example in FIGS. 12A and 12B, the channel member 114 may include two channel members 114A, 114B each mounted back-to-back within a slot 112 formed through the door 100 such that the channel member 114A defines an elongated slot 116A laterally disposed along one face 100A of the door 100 and the channel member 114B defines another elongated slot 116B laterally disposed along the opposite face 110B of the door 100. In alternate embodiments, the channel member 114 may include only one of the channel members 114A, 114B and the slot 112 may be extend only partially through the door 100 so as to form a channel.

Figure 12A:
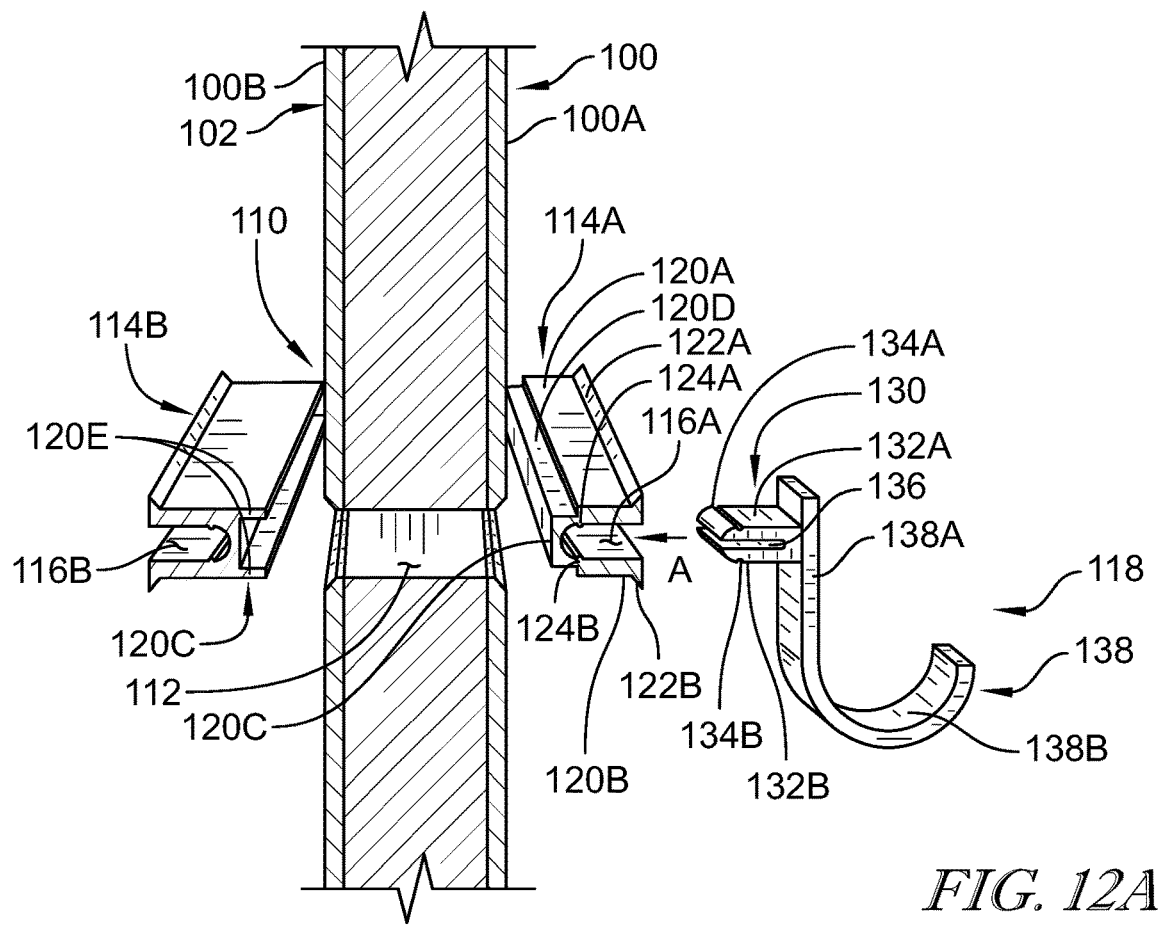
FIG. 12A is a cross-sectional and assembly view of the door of FIGS. 11A and 11B, as viewed along section lines 12-12 of FIG. 11A, illustrating an embodiment of the accessory rail and a corresponding accessory hanger.
Figure 12B:
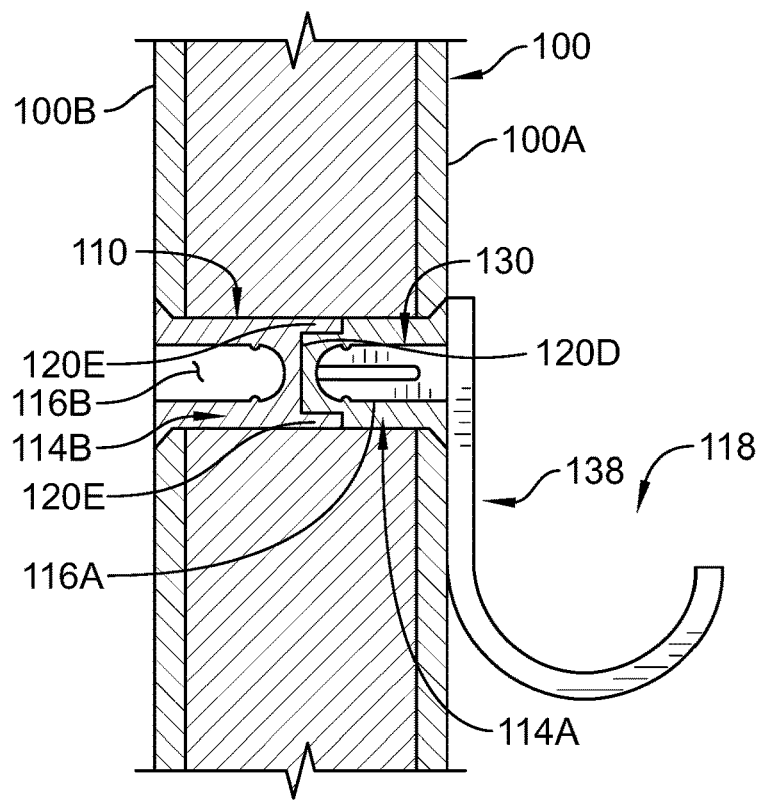
FIG. 12B is a cross-sectional view similar to FIG. 12A showing the accessory rail mounted to the door and showing the accessory hanger slidably mounted to the accessory rail.

Referring now specifically to FIGS. 12A and 12B, the example embodiment of the channel member 114 which includes two channel members 114A, 114B is shown. In the illustrated embodiment, the slot 112 is formed through the door 100, i.e., through each face 100A, 100B. In some embodiments, the slot 112 may be formed during manufacture of the door 100, and in other embodiments the slot 112 may be formed after manufacture of the door 100, e.g., by the door manufacturer or in the field. It will be understood that in the illustrated embodiment the channel member 114B is illustratively identical to the channel member 114A as described below. In alternate embodiments, the channel member 114B may differ in one or more respects to the channel member 114A. In still other embodiments, as described above, only one of the channel members 114A, 114B may be provided, and in such embodiments the slot 112 may or may not extend through the door 100. In embodiments which include both channel members 114A, 114B, as depicted by example in FIGS. 12A and 12B, the outer surfaces of the rear walls 120C may be complementarily configured so as to engage one another to secure the channel members 114A, 114B together within the slot 112 of the door 100. In the illustrated embodiment, for example, the outer surface of the rear wall 120C of the channel member 114A may be have a profiled surface 120D configured with a series of longitudinal ribs 120D on top and bottom surfaces thereof, and the outer surface of the rear wall 120C of the channel member 114B may include opposed flanges 120E configured to engage the profiled surface 120D and having inner surfaces likewise configured with a series of longitudinal ribs. As the channel members 114A, 114B are inserted, back-to-back, within the slot 112, the ribs of the profiled surface 120D engage those of the flanges 120E to thereby secure the channel members 114A, 114B to one another as illustrated by example in FIG. 12B. In alternate embodiments, the channel members 114A, 114B may be secured together using one or more conventional structures, bonding media, or the like.

The channel member 114A illustratively includes opposing, planar walls 120A, 120B joined at one end by an arcuate rear wall 120C so as to define a channel 116A between the walls 120A, 120B, 120C which is bounded by the inner surfaces thereof. In the illustrated embodiment, the channel 116A is illustratively U-shaped (in cross-section) to receive therein a correspondingly shaped hanger base 130 of the accessory hanger 118, although in alternate embodiments the channel 116A may have other cross-sectional shapes. In some embodiments, as illustrated by example in FIGS. 12A and 12B, flanges 122A, 122B may extend away, e.g., perpendicularly away, from the outer surfaces of the walls 120A, 120B respectively at or adjacent to their terminal ends. In embodiments which include them, the flanges 122A, 122B illustratively act to cover the slot 112, and in such embodiments the slot 112 is illustratively formed such that the flanges 122A, 122B extend over the respective edges of the slot 112 to hide them from view as illustrated by example in FIG. 12B. In any case, the inner surfaces of the walls 120A, 120B define opposed ribs 124A, 124B respectively. The ribs 124A, 124B illustratively extend perpendicularly away from the inner surfaces of the respective side 120A, 120B, are juxtaposed with one another and run the length of the channel 116A.

The hanger base 130 of the accessory hanger 118 illustratively includes substantially parallel walls 132A, 132B extending perpendicularly away from a wall 138A of an accessory support member 138. The walls 132A, 132B are joined at one end to the wall 138A and are spaced apart from one another at their opposite ends to as to form an open channel 136 therebetween. The outer surfaces of the walls 132A, 132B define grooves 134A, 134B respectively. The grooves 134A, 134B are illustratively juxtaposed with one another and run the lengths of the walls 132A, 132B. The accessory support member 138 further illustratively defines an accessory support surface 138B which, in the illustrated embodiment, is in the form of an arcuate hook-shaped member, although in alternate embodiments the accessory support surface 138B may have any desired shape. In one embodiment, the accessory hanger 118 is of unitary construction, although in alternate embodiments the hanger base 130 may be separate from, but attached to, the accessory support member 138, and in some alternate embodiments the hanger base 130 and/or the accessory support member 138 may be or include multiple separate parts.

The walls 132A, 132B of the hanger base 130 are illustratively resilient relative to one another and relative to the wall 138A of the accessory support member 138, and the hanger base 130 is illustratively sized such that the thickness of the hanger base 130, between the outer surfaces of the walls 132A, 132B is slightly greater than the width of the channel 116A of the channel member 114A. Pressure applied to the outer surfaces of the walls 132A, 132B forces the open terminal ends of the walls 132A, 132B toward one another so as to reduce the thickness of the hanger base 130 adjacent to the terminal ends of the walls 132A, 132B to allow the hanger base 130 to enter the channel 116A in the perpendicular directly as depicted by the arrow A in FIG. 12A. In some embodiments, the outer surfaces of the walls 132A, 132B may be tapered or sloped downwardly toward the terminal ends thereof, as depicted by example in FIGS. 12A and 12B, to facilitate insertion of the hanger base 130 into the channel 116A of the channel member 114A. In such embodiments, the inner surfaces of the walls 120A, 120B adjacent to the opening of the channel 116A act on the tapered or sloped portions of the walls 132A, 132B to force the open terminal ends of the walls 132A, 132B toward one another so as to reduce the thickness of the hanger base 130 adjacent to the terminal ends of the walls 132A, 132B as the hanger base 130 is inserted into the channel 116A. In alternate embodiments, the outer surfaces of the walls 132A, 132B may be configured at or near the terminal ends thereof in any manner which will facilitate insertion of the hanger base 130 into the channel 116A of the channel member 114A.

As the hanger base 130 is inserted into the channel 116A as just described, the resilient walls 132A, 132B move away from one another adjacent to the terminal ends thereof as the grooves 134A, 134B come into alignment with the ribs 124A, 124B defined in the channel 116A, thus causing the grooves 134A, 134B to receive the ribs 124A, 124B respectively therein. The ribs 124A, 124B illustratively form engagement structures which engage the correspondingly configured grooves 134A, 134B defined by the hanger base 130, as illustrated by example in FIG. 12B, to resist decoupling of the hanger base 130 perpendicularly away from the channel 116A while allowing the hanger base 130 to be moved longitudinally along the channel 116A, e.g., along the direction(s) of the arrow L depicted in FIG. 11B. The hanger base 130, and thus the accessory hanger 118, may illustratively be disengaged from the channel 116A by twisting the hanger base 130 while pulling the accessory hanger 118 outwardly away from the channel 116A, which causes the ribs 124A, 124B to disengage from the grooves 134A, 134B.

It will be understood that the walls 132A, 132B, the ribs 124A, 124B and grooves 134A, 134B represent only one example set of structures for securing the hanger base 130 to and within the channel 116A of the channel member 114A, and that other structures for accomplishing this feature are contemplated by this disclosure. Some such structures may illustratively allow the hanger base 130 to be manually moved longitudinally along the channel 116A, whereas other such structures may not allow such movement or may allow only restricted movement of the hanger base 130 along the channel 116A.

Figure 11A:
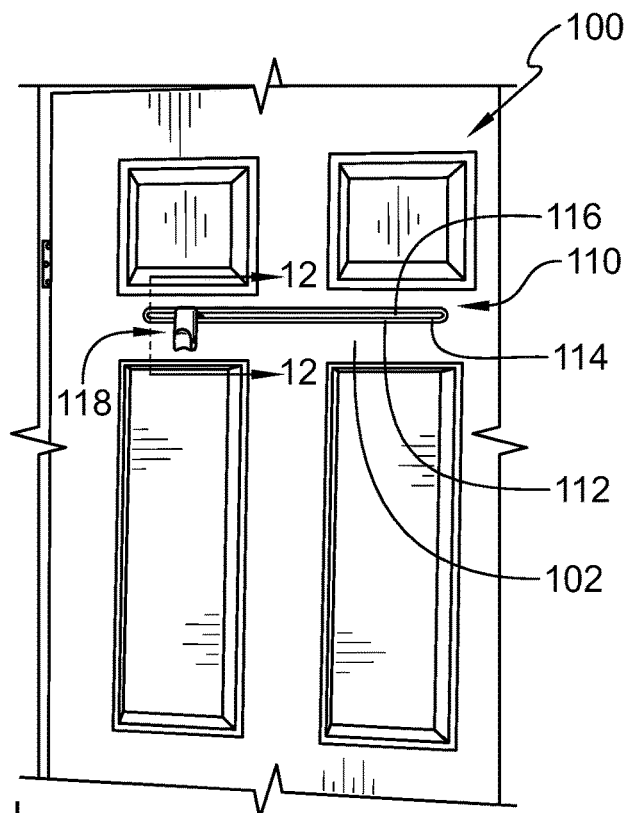
FIG. 11A is a front perspective view of a door having another embodiment of an accessory rail mounted thereto.
Figure 13:
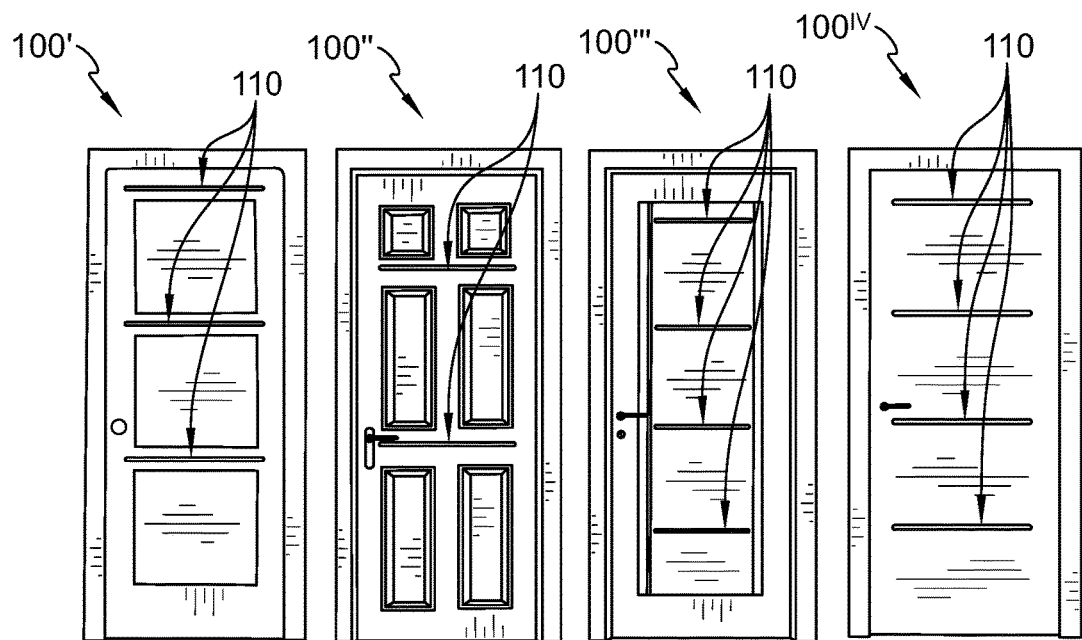
FIG. 13 includes front elevational views of several of different door configurations illustrating various numbers and placement locations of the accessory rails of FIGS. 11A-12 mounted thereto.

The particular example of the door 100 and of the single accessory rail 110 mounted thereto as shown in FIGS. 11A-12 represents only one example door and one example door and accessory rail combination. It will be understood that other types of doors and/or other configurations of any such door and one or more of the accessory rails 110 mounted thereto are contemplated by this disclosure. Referring to FIG. 13, additional examples are shown of various different doors and door/accessory rail combinations. The paneled door 100', for example, includes four vertically spaced-apart, horizontally-disposed panels each extending between stiles defined along opposite sides of the door 100', and three accessory rails 110 mounted in slots formed in each of the three uppermost, horizontally-disposed panels. The paneled door 100" includes four vertically spaced-apart, horizontally-disposed panels each extending between stiles defined along opposite sides of the door 100", vertical panels bisecting each opposed pair of horizontally-disposed panels, and two accessory rails 110 mounted in slots formed in each of the two middle, horizontally-disposed panels. The paneled door 100''' includes top and bottom horizontally-disposed panels each extending between stiles defined along opposite sides of the door 100''', a single central panel spaced slightly apart at opposite sides from a respective stile and slightly apart at top and bottom ends by the top and bottom horizontally-disposed panels respectively, and four accessory rails 110 mounted in respective horizontal, spaced apart slots formed in the single central panel. The door 100$^{IV}$ is a single panel, and four accessory rails 110 are mounted in respective horizontal, spaced apart slots formed in the single panel. Other door and/or panel combinations and configurations will occur to those skilled in the art, as will other combinations of any such door and one or more accessory rails 110, and it will be understood that any such other configurations and/or combinations are intended to fall within the scope of this disclosure.

Figure 11B:
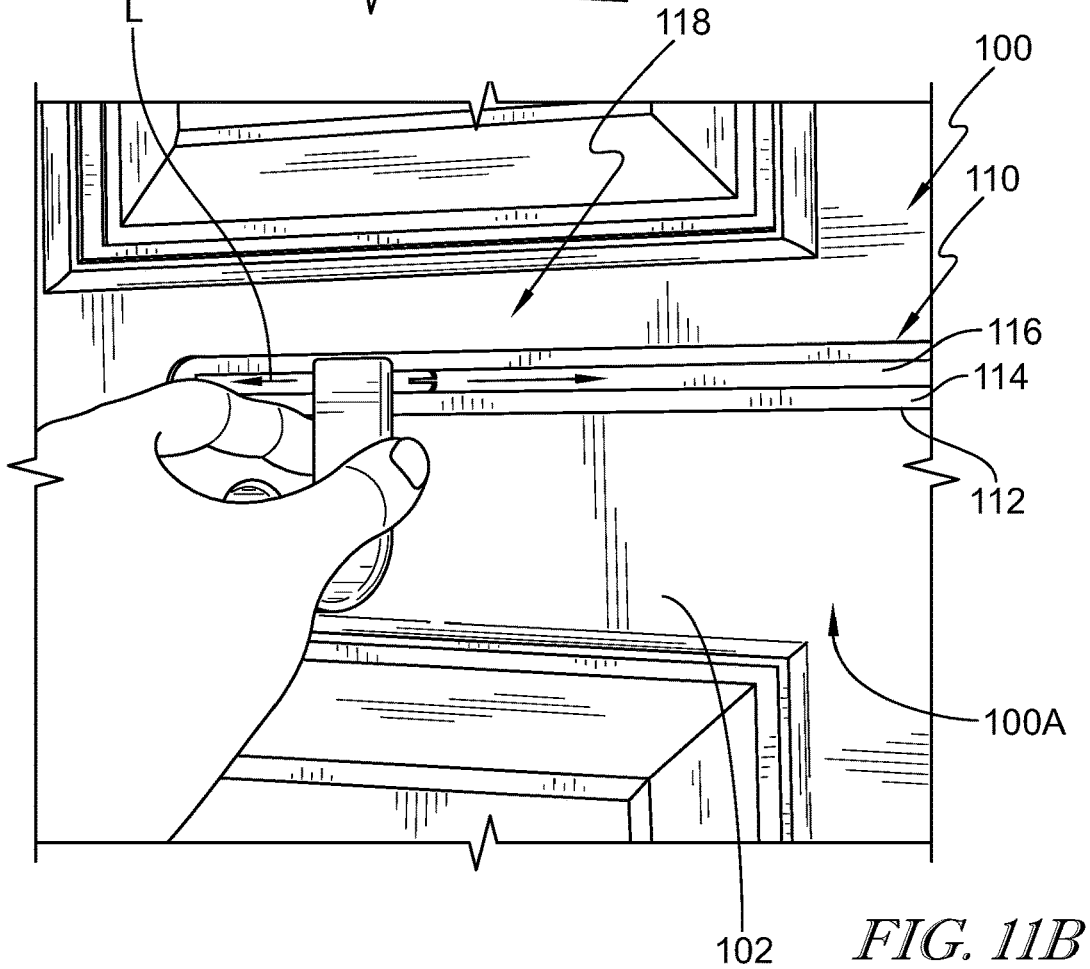
FIG. 11B is a magnified view of the accessory rail of FIG. 11A further illustrating an embodiment of an accessory hanger slidably positionable along the accessory rail.
Figure 14:
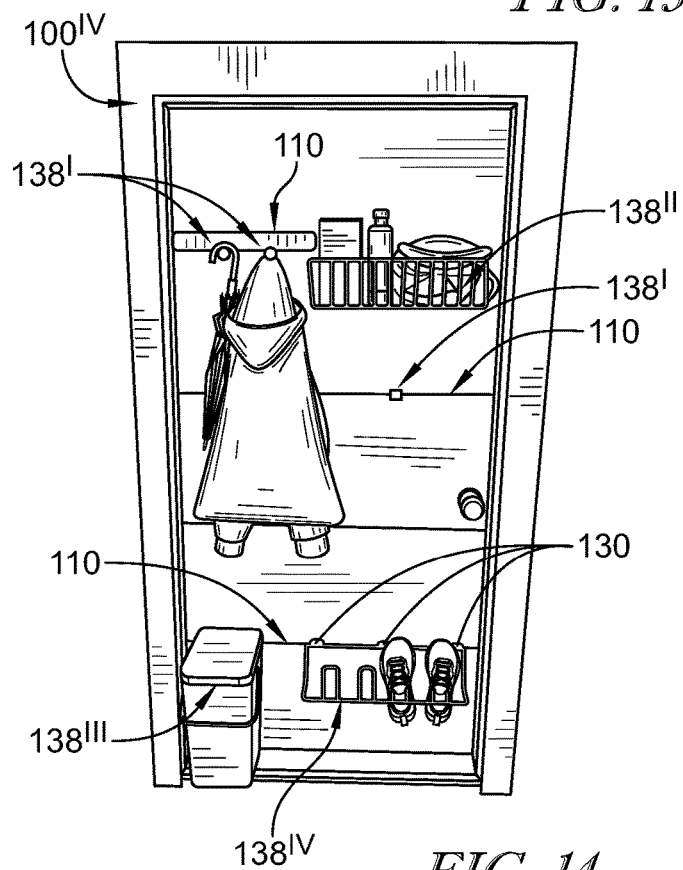
FIG. 14 is a perspective view of one of the example doors illustrated in FIG. 13 showing different accessory hangers and accessories mounted to the various accessory rails.

Like the accessory support members 92, 92' illustrated in FIGS. 7 and 8 and described above, the accessory support member 138 illustrated in FIGS. 11B and 12 is configured to engage and support on the accessory rail 110 various different accessories, e.g., hats, coats, jackets, bags, etc. It will be understood, however, that the accessory support members 138 depicted in FIGS. 11B and 12 is shown only by way of example, and that this disclosure contemplates other accessory support members that may be removably coupled to the accessory rail 110 using one or more hanger bases 130 or equivalents thereof. Referring to FIG. 14, for example, the door 100$^{IV}$ illustrated by example in FIG. 13 is shown having a number of different accessory support members 138'-138$^{IV}$ mounted to three of the four accessory rails 110 via one or more hanger bases 130 or equivalents thereof. In the illustrated example, three accessory support members 138' are affixed to or integral with a respective hanger base 130 (not shown in FIG. 14), and are supported on and by the upper two accessory rails 110. The accessory support members 138' are illustratively provided in the form of a linear support member, e.g., a peg or post, with the top two support members 138' supporting an umbrella and a jacket respectively. Another accessory support member 138" is supported on and by the top accessory rail 110 by two (or more) hanger bases 130 (not shown in FIG. 14), and in the illustrated example the accessory support member 138" is provided in the form of a wire basket containing a number of different items including a box, a bottle of window cleaner and various items of loose clothing. Yet another accessory support member 138''' is supported on and by the bottom accessory rail 110 by two (or more) hanger bases (not shown in FIG. 14), and in the illustrated example the accessory support member 138''' is provided in the form of a basket or pail with a handle and an access lid. Still another accessory support member 138$^{IV}$ is supported on and by the bottom accessory rail 110 by three different hanger bases 130 spaced apart along and engaging the accessory rail 110, and in the illustrated example the accessory support member 138$^{IV}$ is provided in the form of a wire shoe rack support a pair of shoes.

Figure 15:
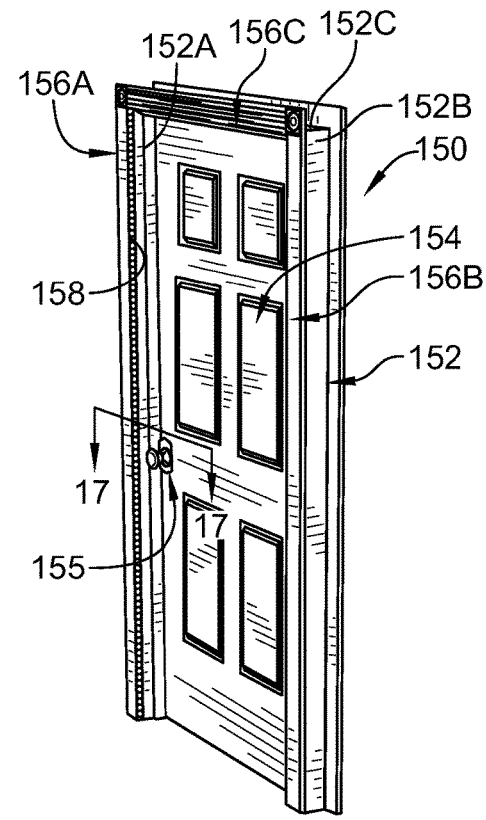
FIG. 15 is a perspective view of a door mounted to a door jamb assembly, including an illumination strip mounted to a jamb casing and extending along one side of the door so as to selectively illuminate at least a portion of the doorway and/or door surface.
Figure 16:
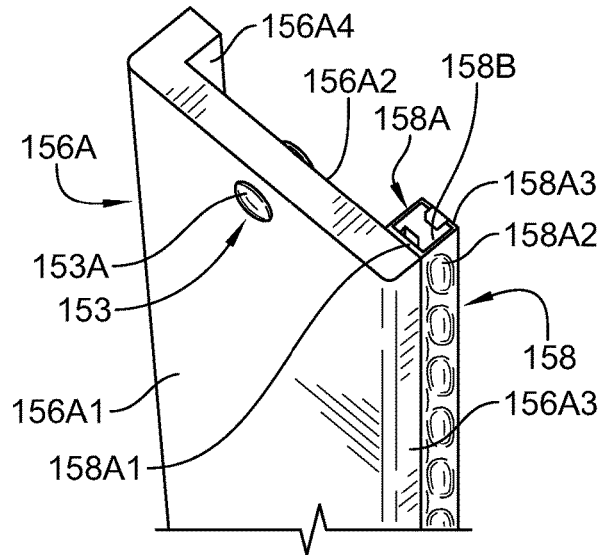
FIG. 16 is a perspective view of the jamb casing with the illumination strip mounted thereto.
Figure 17:
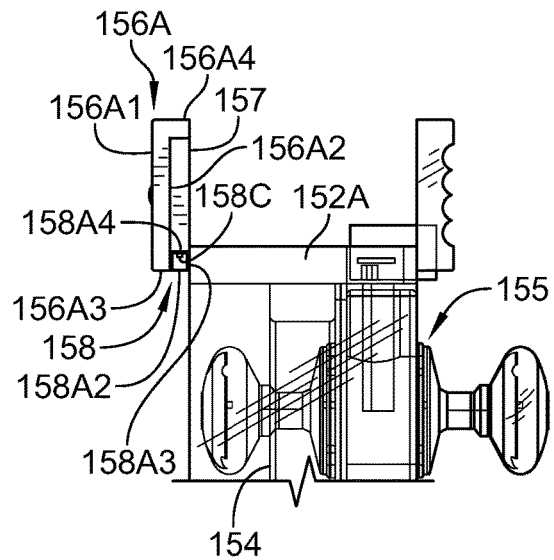
FIG. 17 is a cross-sectional view of a portion of the door assembly of FIG. 15 as viewed along section lines 17-17 thereof.

Referring now to FIGS. 15-17, an embodiment of a door assembly 150 is shown which includes a conventional door jamb assembly 152 mounted to, or integral with, a building, and a conventional door 154 operatively mounted to the door jamb assembly 152 in a conventional manner, e.g., via one or more conventional hinges (not shown) and a conventional lock set 155. The door jamb assembly 152 illustratively includes jambs 152A, 152B positioned on opposite sides of the door 154 and secured to corresponding sides of a door frame assembly of the building, and a header 152C coupled to and between top ends of the jambs 152A, 152B. Jamb casings 156A, 156B are mounted to and at least partially over the exposed faces of the jambs 152A, 152B and a header casing 156C is mounted to and at least partially over the header 152C respectively and/or to respective portions of the wall adjacent to the jambs 152A, 152B and the header 152C on both sides of the jamb assembly 152 as is conventional. On at least one side of the jamb assembly 152 an illumination member 158 is mounted to at least one of the jamb casings 156A, 156B such that, when the jamb casing(s) 156A, 156B is/are mounted to the respective jamb(s) 152A, 152B, the illumination member 158 is positioned adjacent to or, as illustrated by example in FIG. 17, in contact with at least a portion of the exposed face(s) of the jamb(s) 152A, 152B. In some embodiments, the illumination member 158 may be mounted only to one of the jamb casings 156A, 156B. In other embodiments, an illumination member 158 may be mounted to the jamb casing 156A and another illumination member 158 may be mounted to the jamb casing 156B such that illumination members 158 are positioned on either side of the door 154. In either case, yet another illumination member 158 may or may not be mounted to the header casing 156C.

The following detailed description of an embodiment of one of the jamb casings 156A, mounting thereto of the illumination member 158 and mounting of the combination of the jamb casing 156A and illumination member 158 to the jamb 152A will refer specifically to FIGS. 16 and 17. It will be understood that this description applies equally to embodiments in which an illumination member 158 is alternatively or additionally mounted to the jamb casing 156B and/or in which an illumination member 158 is alternatively or additionally mounted to the header casing 156C.

The jamb casing 156A is illustratively an elongated L-shaped member having a planar front face 156A1, a planar rear face 156A2 opposite the front face 156A1, a side face or edge 156A3 defined between the front and rear face 156A1, 156A2 along one side of the casing 156A, and an L-shaped flange 156A4 defined along the opposite side of the casing 156A. The illumination member 158 is illustratively mounted to the rear face 156A2 at or adjacent to the side face or edge 156A3.

In the illustrated embodiment, the illumination member 158 is provided in the form of an elongated illumination strip carrying one or more illumination devices within an elongated, light transmissive (transparent or translucent) housing 158A. In one embodiment, the elongated housing 158A extends along the full length of the jamb casing 156A, although in alternate embodiments the elongated housing 158A may extend only partially along the length of the jamb casing 156A and be positioned anywhere along the jamb casing 156A. The housing 158A is illustratively square or rectangular in cross-section, having four planar faces 158A1-158A4, and is illustratively affixed to the rear face 156A2 of the jamb casing 156A adjacent to the side face or edge 156A3 such that the planar face 158A1 is in contact with the rear face 156A2 and the adjacent planar face 158A2 is co-planar with a plane formed by the planar surface of the side face or edge 156A3. With the jamb casing 156A mounted to the wall adjacent to the jamb 152A, the planar face 158A3 of the housing 158 illustratively abuts the exposed face of the jamb 152A as illustrated by example in FIG. 17. In some alternate embodiments, the planar face 158A3 of the housing 158A may instead be spaced apart from the exposed face of the jamb 152A. In any case, the width of the inner face of the flange 156A4 is illustratively sized such that the distance between the front face 156A1 of the jamb casing 156A and the rear edge of the flange 156A4 is approximately the same as the distance between the front face 156A1 of the jamb casing 156A and the planar face 156A2 of the housing 158A with the housing 158A mounted to the inner face 156A2 of the jamb casing 156A as illustrated by example in FIG. 16. In this embodiment, a spacing member 157 is inserted between the inner face of the flange 156A4 and the planar face 158A4 of the housing 158A, wherein the spacing member 157 has approximately the same thickness as that of the planar face 158A4 (and the planar face 158A2) of the housing 158A so as to facilitate mounting of the jamb casing 156A to the wall of the building adjacent to the jamb 152A with the housing 158A overlapping at least a portion of the exposed face of the jamb 152A as illustrated by example in FIG. 17. It will be understood that the square or rectangular cross-sectional shape of the light-transmissive housing 158A is shown only by way of example, and that in alternate embodiments the housing 158A may have other cross-sectional shapes.

Further in the illustrated embodiment, the one or more illumination devices carried within the housing 158A is/are provided in the form of an elongated strip 158B, mounted within the housing 158A, to which one or more illumination devices 158C is/are mounted. In one embodiment, the elongated strip 158B extends along the full length of the housing 158A, although in alternate embodiments the elongated strip 158B may extend only partially along the length of the housing 158A and be positioned anywhere along the housing 158A. In one embodiment, the one or more illumination devices 158C mounted to the strip 158B includes a plurality of illumination devices 158C spaced apart along the strip 158B, although in alternate embodiments more or fewer illumination devices 158C may be carried by the strip 158B and may be positioned anywhere on or along the strip 158B. In any case, the one or more illumination devices 158C is/are illustratively provided in the form of one or more conventional light emitting diodes (LEDs) of any color, or of multiple different colors, without limitation, although in alternate embodiments the one or more illumination devices 158C may be or include one or more other conventional (i.e., non-LED) illumination devices. In any case, with electrical power applied thereto, the illumination member 158 is illustratively operable to produce visible light which, in the illustrated embodiment, is cast primarily along a plane that is parallel with, but spaced apart from, a plane defined by the corresponding exposed surface of the door 154. Depending upon the choice of illumination device(s) 158C, the visible light produced by the illumination member 158 may also be cast, on at least a portion of the door 154 and/or into an area of the environment forward of the door 154.

Figure 18A:
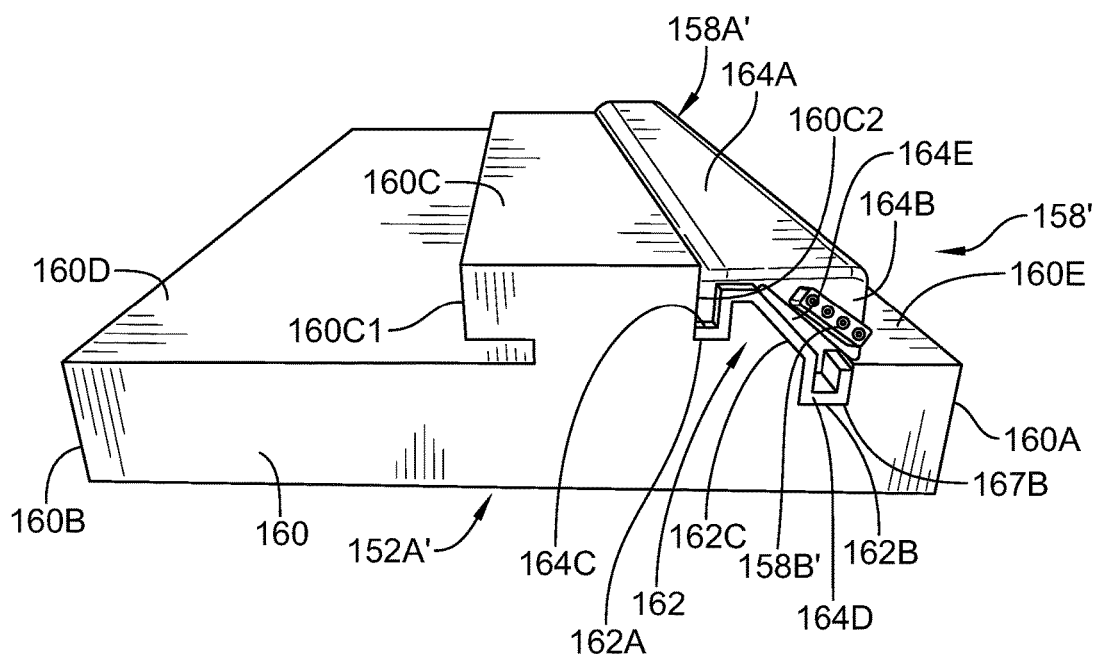
FIG. 18A is a perspective view of an alternate embodiment of a jamb of the door assembly of FIG. 15 also illustrating an alternate embodiment of an illumination strip mounted thereto.

In alternate embodiments, the direction(s) in which visible light generated by the illumination member 158 is cast may be different from that just described, and will generally depend on a number of different factors, examples of which include, but are not limited to, choice and/or design of the illumination device(s) 158C, the cross-sectional shape of the light transmissive housing 158A, the mounting orientation of the illumination device(s) 158C within the housing 158A and/or the mounting of the orientation of the housing 158A relative to the jamb 156A and/or relative to the door 154. In one such alternate embodiment, as illustrated by example in FIG. 18A, a jamb 152A' is shown modified to receive and have a modified illumination member 158' mounted thereto. In the embodiment illustrated in FIG. 18A, the jamb 152A' includes an elongated body 160, e.g., in the form of a rectangular member, having a front side or surface 160A which faces outwardly from the door 154, an opposite rear side or surface 160B opposite the front side or surface 160A and a door stop 160C extending away from an inwardly-facing surface 160D of the body 160. In the context of FIG. 15, a portion of the door 154 will contact a door stop surface 160C1 of the door stop 160C, and an opposite surface 160C2 faces opposite the door 154 in its closed position, i.e., faces the environment forwardly of the door 154. A remaining portion 160E of the inwardly-facing surface 160D extends forwardly of the surface 160C2 of the door stop 160.

In the illustrated embodiment, the jamb 152A' defines an illumination member mounting structure 162 between the forwardly-facing surface 160C2 of the door stop 160 and the inwardly-facing surface 160E, wherein the illumination member mounting structure 162 is configured to receive and have mounted thereto the illumination member 158'. The mounting structure 162 illustratively includes a notch or channel 162A adjacent to and co-planar with the forwardly-facing surface 160C2 of the door stop 160, another notch or channel 162B formed into the surface 160E and forwardly spaced apart from the notch or channel 162A, and an angled surface 162C which slopes downwardly from the notch or channel 162A toward and to the notch or channel 162B. The illumination member 158' illustratively includes a two-part housing 158A' having a light transmissive portion formed by two generally planar sides 164A, 164B which are illustratively disposed normal to one another to form an "L" shape, and a mounting portion coupled to the light transmissive portion. The mounting portion of the illumination member 158' illustratively includes protrusions 164C, 164D joined by an angled portion 164E which slopes downwardly from the protrusion 164C toward and to the protrusion 164D. As illustrated by example in FIG. 18A, the protrusions 164C, 164D and the angled portion 164E of the mounting portion of the housing 158A' are configured complementarily to the channels 162A, 162B and angled portion 162C respectively of the mounting structure 162 of the jamb 152A' such that the protrusions 164C, 164D are received with the respective channels 162A, 162B and the angled portion 164E is received against the angled portion 162C.

The one or more illumination devices carried within the housing 158A' is/are illustratively provided in the form of an elongated strip 158B', mounted within the housing 158A', to which one or more illumination devices 158C is/are mounted all as described above with respect to the embodiment illustrated in FIGS. 15-17. In the embodiment illustrated in FIG. 18A, the elongated strip 158B' is mounted to and against the angled portion 164E of the mounting portion of the housing 158A' such that visible light produced by the one or more illumination devices is directed outwardly away from the strip 158B' toward the light transmissive portions 164A, 164B of the housing 158A'. The planar side 164A of the light transmissive portion illustratively directs the visible light produced by the one or more illumination devices 158C over, e.g., parallel with, the door 154, and the planar side 164B of the light transmissive portion illustratively directs the visible light produced by the one or more illumination devices 158C outwardly away from the door 154, e.g., perpendicularly away from the door 154. In one embodiment, the angled portions 162C, 164E form approximately a 45 degree angle between the surface 160C2 of the door stop 160 and the inwardly facing surface 160E of the jamb body 160, although in alternate embodiments this angle may be greater or less than 45 degrees.

Figure 18B:
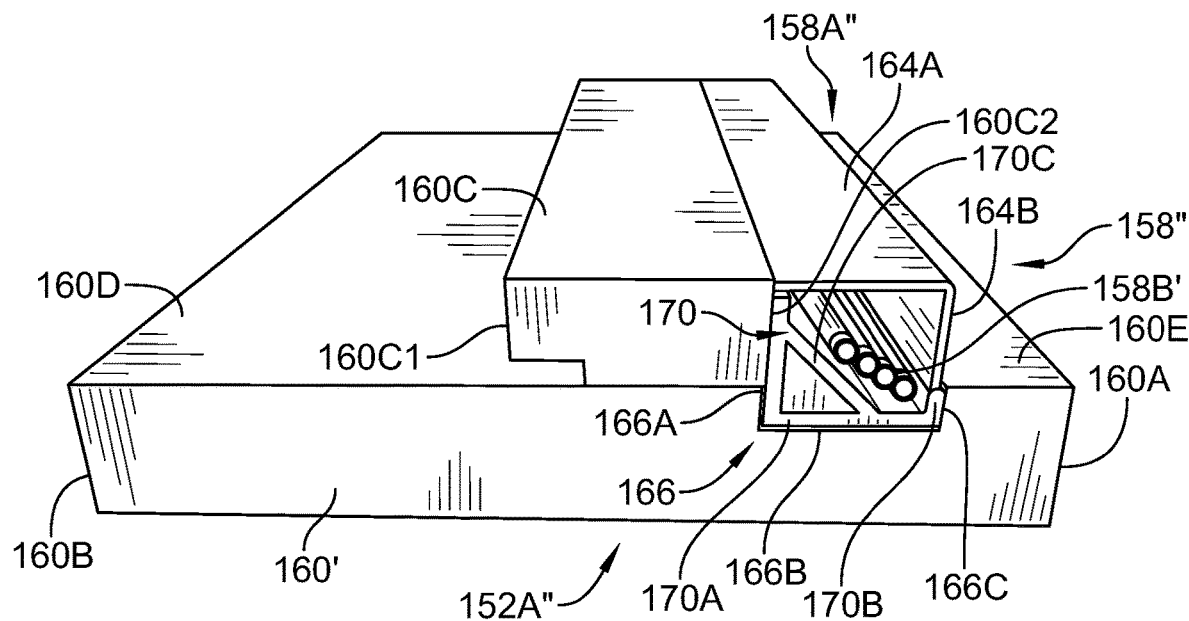
FIG. 18B is a perspective view of another alternate embodiment of a jamb of the door assembly of FIG. 15 also illustrating another alternate embodiment of an illumination strip mounted thereto.

Referring now to FIG. 18B, another alternate embodiment is shown of a jamb 152A" modified to receive and have another modified illumination member 158" mounted thereto. In the embodiment illustrated in FIG. 18B, the jamb 152A" is in many respects identical to the jamb 152A' illustrated in FIG. 18A and described above, and like numbers are therefore used to identify common components. In the embodiment illustrated in FIG. 18B, the illumination member mounting structure 162 is replaced with a single notch or channel 166 formed between the forwardly facing surface 160C2 of the door stop 160C and the inwardly facing surface 160E of the jamb body 160'. The notch or channel 166 is illustratively bound by a wall 166A formed co-planar with the forwardly facing surface 160C2 of the door stop 160C, a wall 166B generally normal to the wall 166B, and a further wall 166C formed generally parallel with the wall 166A and normal to the wall 166B. The illumination member 15'8' illustratively includes a two-part housing 158A" having a light transmissive portion formed by two generally planar sides 164A, 164B as described above, and a mounting portion 170 coupled to the light transmissive portion. The mounting portion 170 of the housing 150A" illustratively includes walls 170A disposed normal to one another to form an "L" shape, a forward lip 170B and an angle portion 170C joining by an angled walls 170A which slopes downwardly from the door stop 160C toward the surface 160E of the jamb body 160. As illustrated by example in FIG. 18B, the walls 170A and the lip 170B of the mounting portion 170 of the housing 158A" are configured complementarily to the corresponding walls 166A-166C of the channel 166 formed in the jamb body 160 such that the mounting portion 170 is received within and mounted to the channel 166. In this embodiment, the angled wall against and to which the elongated illumination strip 158B' is mounted is the angled wall 170C formed by the mounting portion 170. Otherwise, the embodiment illustrated in FIG. 18B is as described with respect to the embodiment illustrated in FIG. 18A. Those skilled in the art will recognize other structures and/or techniques for mounting one or more illumination devices to and at least partially along one or more of the jambs and/or head of the jamb assembly, and/or to and at least partially along one or more of the jamb casings, and it will be understood that any such other structures and/or techniques are intended to fall within the scope of this disclosure.

Referring again to FIG. 16, a sensor 153 is illustratively mounted to the jamb casing 156A such that a sensing face or surface 153A of the sensor 153 protrudes from, is flush with or is recessed relative to the front face 156A1 of the jamb casing 156A, i.e., such that the sensing face or surface 153A is exposed to the environment forwardly of the jamb casing 156A. The sensor 160 is operatively coupled to control electronics (not shown) for controlling and powering the one or more illumination devices 158C of the illumination member 158. In one embodiment, the sensor 153 is a conventional light sensor configured to produce a signal corresponding to an amount of environmental light sensed thereby. In such embodiments, the control electronics is operable to control the illumination member 158, e.g., by applying electrical power thereto, to cause the illumination member 158 to emit visible light on or across (i.e., in front of) at least a portion of the door 154 in response to the signal produced by the sensor 153 corresponding to sensed light less than or equal to a threshold amount, e.g., below a specified light detection threshold. In some alternate embodiments, the sensor 160 is a conventional motion sensor configured to produce a signal corresponding to detection or absence of motion within its sensing range. In such embodiments, the control electronics is operable to control the illumination member 158, e.g., by applying electrical power thereto, to cause the illumination member 158 to emit visible light on or across (i.e., in front of) at least a portion of the door 154 in response to the signal produced by the sensor 160 corresponding to sensed motion equal to or above a threshold amount, e.g., above a specified motion detection threshold.

In some alternate embodiments, the sensor 153 may be or include a conventional light and motion sensor. In some such embodiments, the control electronics may be operable to control the illumination member 158, e.g., by applying electrical power thereto, to cause the illumination member 158 to emit visible light on or across (i.e., in front of) at least a portion of the door 154 in response to the signal produced by the sensor 153 corresponding to sensed light less than a light detection threshold and/or in response to the signal produced by the sensor 153 corresponding to sensed motion above a motion detection threshold. In other such embodiments, the control electronics may be operable to control the illumination member 158, e.g., by applying electrical power thereto, to cause the illumination member 158 to emit visible light on or across (i.e., in front of) at least a portion of the door 154 in response to the signal produced by the sensor 153 corresponding to sensed motion above a motion detection threshold only if and when the sensed light is less than a light detection threshold.

Figure 19:
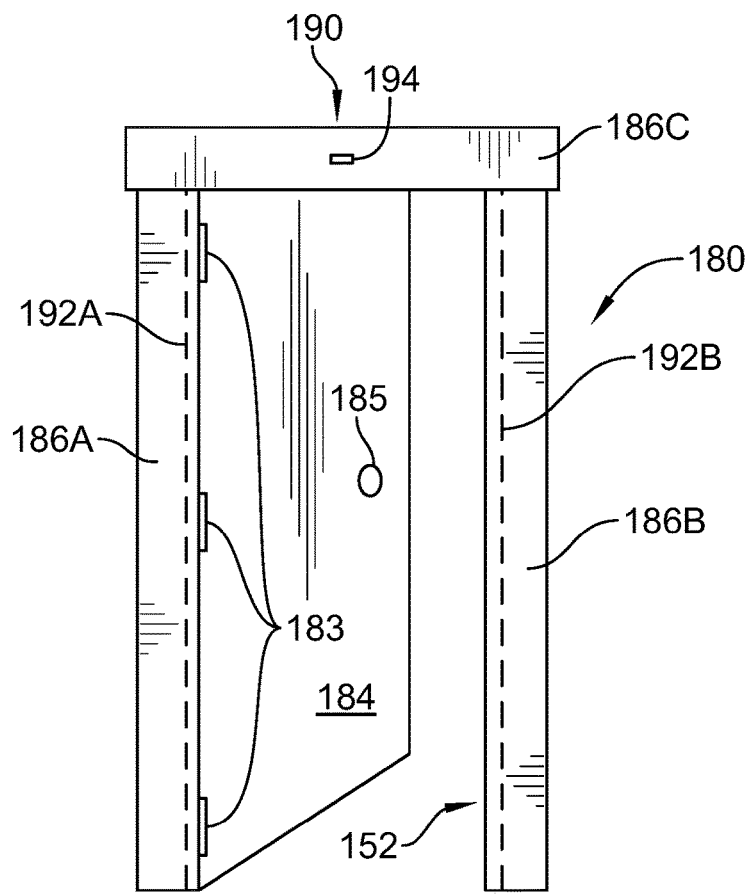
FIG. 19 is a front elevational view of a door assembly including illumination strips mounted to the jambs on opposite sides of the door and also including an illumination control system.
Figure 20:
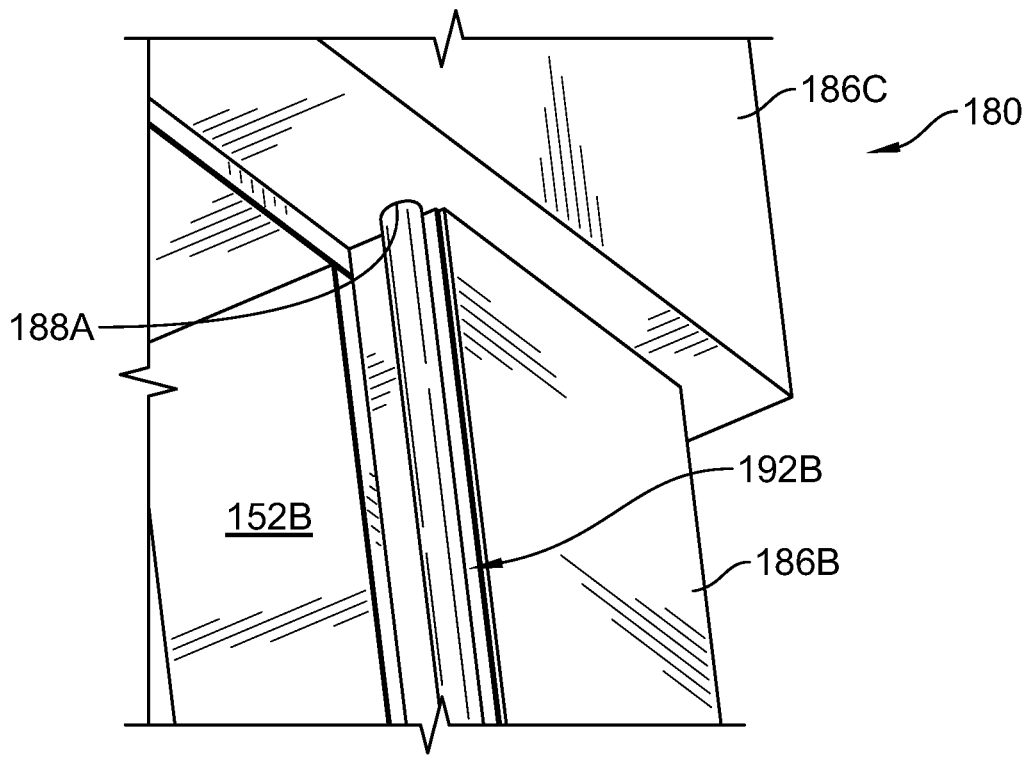
FIG. 20 is a perspective view of a portion of the door assembly of FIG. 19 illustrating mounting thereto of one embodiment of an illumination strip.

Referring now to FIG. 19, another embodiment is shown of a door assembly 180 which includes a conventional door jamb assembly 152, e.g., as described above with respect to any of FIGS. 15-18B, mounted to, or integral with, a building, and a conventional door 184 operatively mounted to the door jamb assembly in a conventional manner, e.g., via one or more conventional hinges 183 and a conventional lock set 185. Jamb casings 186A, 186B are mounted to and at least partially over the exposed faces of the jambs 152A, 152B and a header casing 186C is mounted to and at least partially over the exposed face of the header 152C of the jamb assembly 152 and/or to respective portions of the wall adjacent to the jambs and the header on both sides of the jamb assembly as is conventional. The embodiment illustrated in FIG. 19 further includes another embodiment of an illumination system 190 mounted to, or integral with, various components of the door assembly 180. In one embodiment, the illumination system 190 includes at least one sensor 194 mounted to the header casing 186C so as to be exposed to the environment forward of the door assembly 180. In some alternate embodiments, the sensor 194 may instead be mounted to one of the jamb casings 186A, 186B or to a portion of the building adjacent to the door assembly 180, and in some alternate embodiments multiple sensors 194 may be mounted to the header casing 186, to either or both of the jamb casings 186A, 186B and/or to one or more portions of the building adjacent to the door assembly 180. As described above with respect to FIGS. 15-18B, an illumination member is mounted to at least one of the jambs and/or jamb casings 186A, 186B and in the example embodiment illustrated in FIG. 19 two elongated illumination members 192A, 192B are mounted to the jambs and/or jamb casings 186A, 186B respectively so as to line the opposed sides of the door 184.

Referring now to FIGS. 20-25, an embodiment is shown of the illumination system 190 mounted to the door assembly 180. As illustrated by example in FIGS. 20 and 21, the illumination member 192B is illustratively mounted to and along the jamb 152B and/or to the jamb casing 186B. The illumination member 192B illustratively includes a housing 196 having L-shaped sides 196A, 196B and defining flanges 196C, 196D at the free ends of the sides 196A, 196B respectively. The flange 196C illustratively extends approximately normally away from the free end of the side 196A, and the flange 196D likewise extends approximately normally away from the free end of the side 196B of the housing 196 so as to create a gap or space 196E between the free ends of the flanges 196C, 196D. The housing 196 is mounted to the door assembly 180 with the side 196B attached to or otherwise abutting the inwardly-facing edge of the jamb casing 186B and with the side 196A attached to or otherwise abutting the outwardly-facing edge of the jamb 152B. As described above with respect to the embodiment illustrated in FIGS. 15-18B, the housing 196 may illustrative extend the length of the jamb 152B as illustrated by example in FIG. 19, although in alternate embodiments the housing 196 may be extend only partially along the length of the jamb 152B and at any position along the jamb 152B.

A light transmissive cover 198 is received within the gap 196E and is slidably mounted to and along the free ends of the flanges 196C, 196D. An illumination strip mount 196F is illustratively received or defined within the housing 196 and extends along a length of the housing 196. A cap may 197 may be provided to cover at least one end of the housing 196. The strip mount 196F illustratively includes a substantially planar, elongated surface 196G disposed at an angle relative to the planes formed by the walls 196A, 196B. In the illustrated embodiment, the angle of the planar surface 196G relative to the planes formed by the walls 196A, 196B is approximately 45 degrees such that the elongated surface is substantially juxtaposed with the light transmissive cover 198. In the illustrated embodiment, elongated light pipes 200A, 200B extend into respective housings 196 on either side of the door 184, wherein each elongated light pipe 200A, 200B is disposed between the surface 196G and the light transmissive cover 198 such that visible light entering the light pipes 200A, 200B is directed outwardly through the light transmissive cover 198. In some embodiments, the surface 196G may be reflective so as to reflect light emitted by the light pipe 200A, 200B outwardly through the light transmissive cover 198, although in other embodiments the surface 198G may be only partially reflective or non-reflective. In alternate embodiments, the illumination source(s) may be provided by illumination strips and/or individual illumination sources such as, for example, light emitting diode (LED) strips or at least one individual LED source and/or one or more other conventional illumination sources. In any case, the light transmissive cover 198 may illustratively be transparent or translucent, e.g., frosted, milky or the like.

Figure 22:
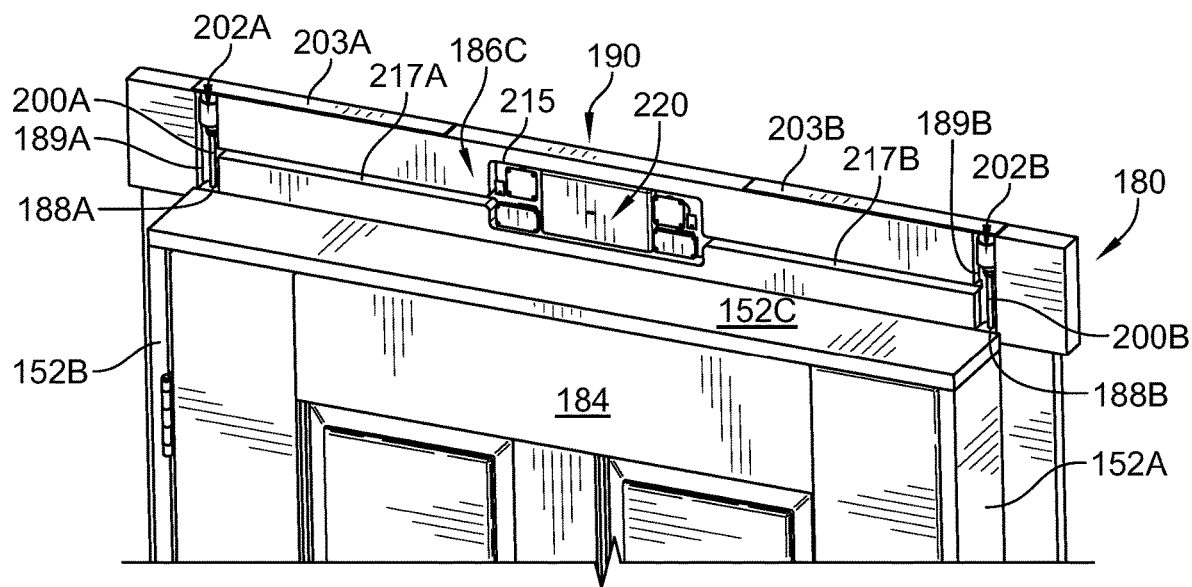
FIG. 22 is a rear perspective view of a portion of the door assembly of FIGS. 19 and 20.

Referring now specifically to FIG. 22, a rear perspective view of the door assembly 180 is shown to illustrate additional components of the illumination system 190 and mounting thereof to the door assembly 180. As best shown in FIG. 22, the light pipes 200A, 200B, extending into the elongated illumination housings 196 mounted to the jambs 152A, 152B and/or jamb casings 186A, 186B on the opposite side of the door assembly 180, extend upwardly through respective openings 188A, 188B in the header casing 186C and into operative engagement with respective illumination device assemblies 202A, 202B positioned within respective channels 189A, 189B defined into the rear face of the header casing 186C. In some alternate embodiments, the illumination device assembly 202A may instead be positioned within respective channels defined into the jamb casing 186B, defined into the jamb casing on an interior side of the door assembly 180 and/or defined into the jamb 152B, and in such embodiments the light pipe 200A will not extend into the header casing 186C as described above but will extend into the illumination device assembly 202B positioned as just described. In some alternate embodiments, the illumination device assembly 202B may be likewise alternatively positioned and mounted. In other alternate embodiments, the illumination device assembly 202A and/or the illumination device assembly 202B may reside outside of the jambs, 152A, 152B, jamb casings 186A, 186B and header casing 186C, and in such embodiments the illumination device assembly 202A and/or the illumination device assembly 202B may be suitably mounted to the door assembly 180 and/or to the interior and/or exterior of the building adjacent to the door assembly 180.

Figure 23:
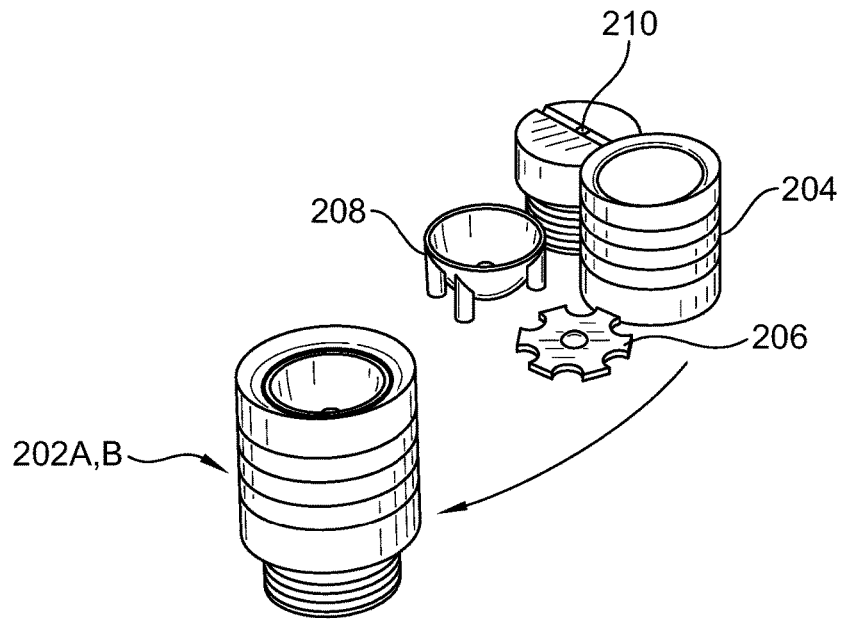
FIG. 23 is an assembly and assembled view of an embodiment of one of the illumination device assemblies illustrated in FIG. 22.

An embodiment of the illumination device assemblies 202A, 202B is illustrated by example in FIG. 23 in which the illumination device(s) is/are provided in the form of one or more light emitting diodes (LEDs) arranged on an LED substrate 206. An electrical connector 208 is operatively coupled to the LED substrate 206, and the combination of the LED substrate 206 and the electrical connector are inserted into a housing 204. A coupling member 210 is coupled to an underside of the housing 204 and is configured to also operatively couple to the respective light pipe 200A, 200B. The coupling member 210 illustratively operates to align the LED source(s) on the LED substrate with the light pipe 200A, 200B such that light emitted by the LED source(s) is transmitted to and along the respective light pipe 200A, 200B. Illustratively, the housing 204 and the coupling member 210 are both formed of metal or other material with high thermal conductivity so as to operate as a heat sink to dissipate heat generated by the LED source(s). In some embodiments in which the illumination device assemblies 202A, 202B are mounted within the header casing 186C as illustrated in FIG. 22, thermally conductive strips 203A, 203B (or a single such strip), e.g., aluminum or other material with high thermal conductivity, may be mounted to and along the top surface of the header casing 186C over the respective channels 189A, 189B and in physical contact with the housings 204 of the respective illumination device assemblies 202A, 202B, as further illustrated by example in FIG. 22, to further dissipate heat transferred by the operating LED source(s) to the housing 204.

As further depicted by example in FIG. 22, a pocket 215 is illustratively formed into the rear surface of the header casing 186C, and is sized to receive therein a power and control circuit 220 for operating the illumination members 192A, 192B. Channels 217A, 217B illustratively extend from the pocket 215 to the channels 189A, 189B respectively for housing wiring (not shown) connected between the circuit 220 and the respective illumination device assemblies 202A, 202B. In some alternate embodiments, the power and control circuit 220, or at least some portion(s) thereof, may instead be positioned within a pocket defined into the jamb casing 186A and/or 186B, defined into either or both of the jamb casings on an interior side of the door assembly 180 and/or defined into the jamb 152A and/or 152B. In other alternate embodiments, the power and control circuit 220, or at least some portion(s) thereof, may reside outside of the jambs, 152A, 152B, jamb casings 186A, 186B and header casing 186C, and in such embodiments the power and control circuit 220, or at least some portion(s) thereof, may be suitably mounted to the door assembly 180 and/or to the interior and/or exterior of the building adjacent to the door assembly 180.

Figure 24:
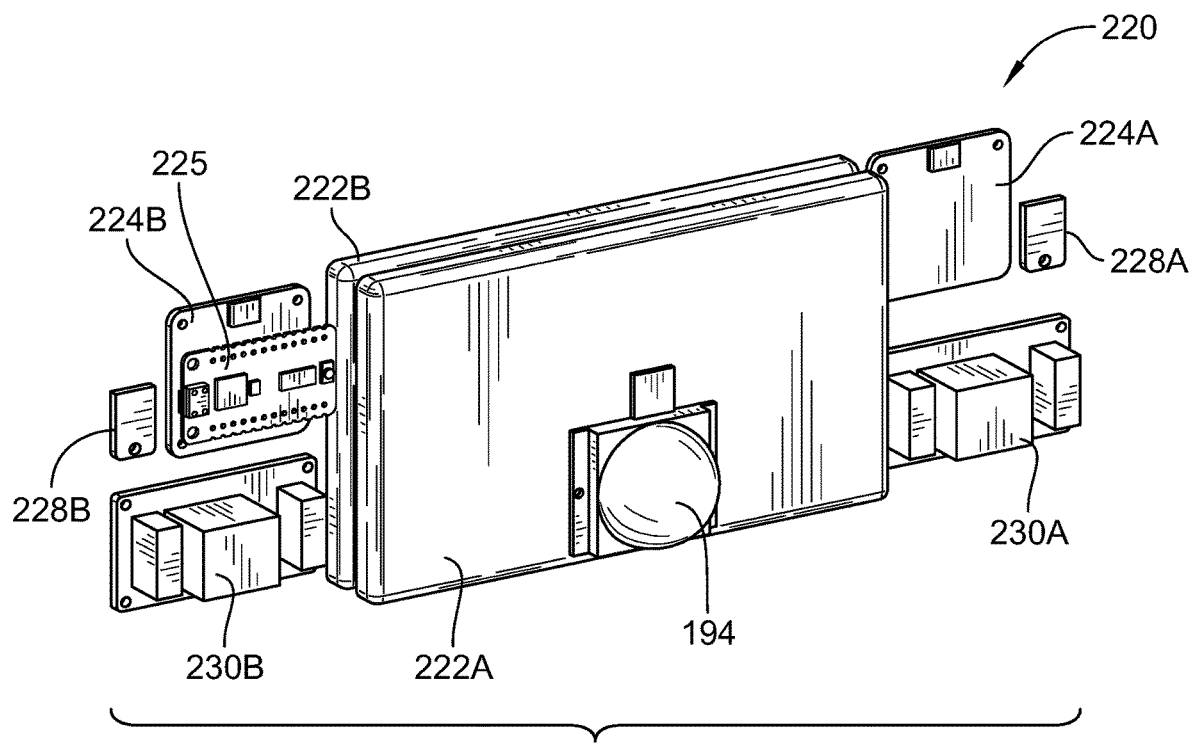
FIG. 24 is an assembly view of some of the components of an embodiment of the control circuit shown mounted to the door assembly in FIG. 22.
Figure 25:
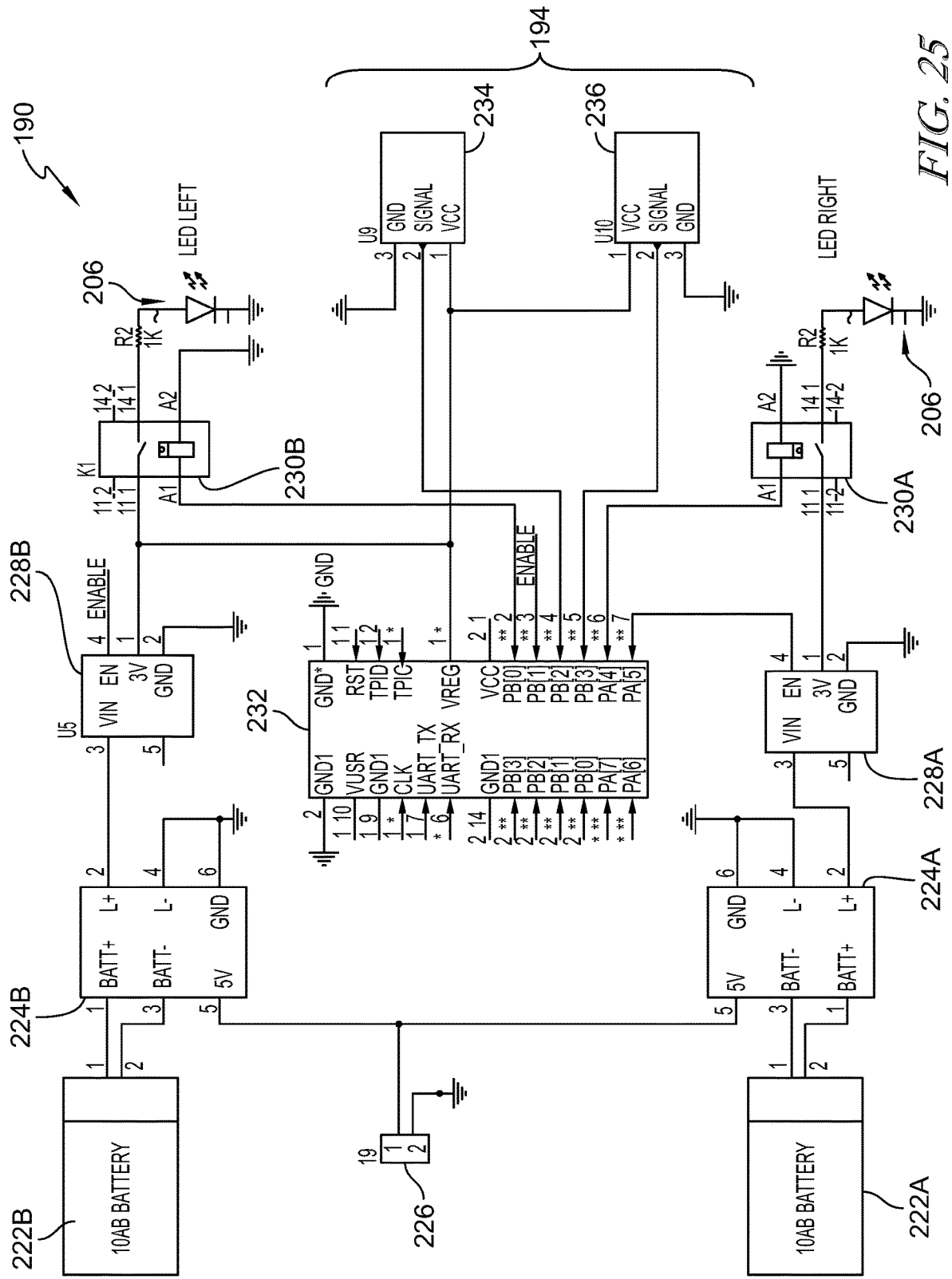
FIG. 25 is a schematic diagram of the illumination control system of the door assembly illustrated in FIGS. 19-24.

Referring now to FIGS. 24 and 25, an embodiment is shown of the power and control circuit 220 illustrated in FIG. 22. The circuit 220 illustratively includes two batteries 222A, 222B (or two sets of batteries) each dedicated to providing power to a different one of the illumination members 192A, 192B, e.g., the battery 222A is dedicated to providing electrical power only to the illumination device assembly 202A, and the battery 222B is dedicated to providing electrical power only to the illumination device assembly 202B. In some embodiments, one or both of the batteries 222A, 222B is/are rechargeable, although in other embodiments either or both of the batteries 222A, 222B may be non-rechargeable. In the illustrated embodiment, both batteries 222A, 222B are rechargeable and the circuit 220 further includes battery charging circuits 224A, 224B each electrically connected to a respective one of the batteries 222A, 222B. A conventional battery charging interface 226 is electrically connected to each charging circuit 224A, 224B, although in alternate embodiments separate charging interfaces may be provided for each battery 222A, 222B. The interface 226 is configured to connect to an external source of electrical power for charging the batteries 222A, 222B. In one embodiment, the interface 226 is a conventional Universal Serial Bus (USB) interface, although in alternate embodiments the interface 226 may be or include one or more other conventional connection interfaces. In some embodiments, the batteries 222A, 222B are received within the pocket 215 formed into the rear surface of the header casing 186C as illustrated by example in FIG. 22, although in alternate embodiments the battery 222A may instead be mounted to or within one of the jamb assemblies, or to a portion of the building adjacent to the door assembly 180. In some alternate embodiments, the battery 222B may likewise be alternatively mounted. In some alternate embodiments, the power and control circuit 220 may include only a single battery or a single set of batteries to provide electrical power to both of the illumination device assemblies 202A, 202B.

The battery charging circuits 224A, 224B are also electrically connected to respective power converter circuits 228A, 228B, e.g., in the form of conventional buck converter circuits configured to step down the voltage (and step up the current) from the batteries 222A, 222B. Outputs of the power converter circuits 228A, 228B are electrically connected to conventional electronically controllable relay circuits 230A, 230B, and outputs of the relay circuits 230A, 230B are electrically connected to the electrical connectors 208 of the respective illumination device assemblies 202A, 202B. Control inputs of the relay circuits 230A, 230B are electrically connected to control outputs of a conventional processor or controller circuit 232.

In the illustrated embodiment, the at least one sensor 194 illustrated by example in FIG. 19 is provided in the form of two sensors 234, 236 each having a sensor output electrically connected to a respective sensor input of the processor or controller circuit 232. Electrical power is illustratively provided to the processor or controller circuit 232 and to each of the sensors 234, 236 by the power converter circuit 228B, although in alternate embodiments electrical power may be provided to the processor or controller circuit 232 and/or to either or both of the sensors 234, 236 by the power converter circuit 228A. In still other embodiments, the control circuit 220 may include conventional circuitry for switching electrical power to the processor or controller circuit 232 and/or to either or both of the sensors 234, 236 from the converter circuit 228A or from the converter circuit 228B depending upon the amount of charge on the batteries 222A, 222B. In any case, the sensor 234 is illustratively a light sensor and the sensor 236 is illustratively a motion sensor, both as described above with respect to FIG. 16. The processor or controller 232 illustratively includes a memory having instructions stored therein which are executable by the processor or controller 232 to control the relays 230A, 230B, based on the signals produced by the sensors 234, 236, to selectively provide electrical power to the illumination members 192A, 192B according to any of the control strategies described above with respect to FIG. 16. In some alternate embodiments, the sensor 194 may include only one of the sensors 234, 236, and in other alternate embodiments the sensor 194 may include one or more additional sensors configured to produce one or more sensor signals processable by the processor or controller 232 to control operation of the illumination members 192A, 192B. Examples of such one or more additional sensors may be or include, but are not limited to, one or more conventional temperature sensors, one or more conventional moisture sensors, one or more humidity sensors, or the like.

Referring now to FIGS. 26-27B, an embodiment is shown of an electric lockset system 300 for a door assembly 302. The door assembly 302 illustratively includes a conventional door jamb assembly 304 to which a conventional access door 306 is operatively mounted, e.g., via one or more hinges. The door assembly 302 further includes a handle set 308 which may be manually actuated in a conventional manner to cause a latch coupled thereto to disengage and engage a striker to thereby allow for opening the door 306 and maintaining the door 306 is a closed position respectively. The lockset system 300 further illustratively includes an electric strike 310 mounted to one jamb 304A of the jamb assembly 304 and electrically coupled to a conventional source 312 of electrical power which is, in turn, electrically connected to an electrical actuator 314. In some embodiments, the source 312 is or includes one or more conventional batteries, which may be rechargeable or non-rechargeable but replaceable, although in other embodiments the source 312 may be or include any conventional source of electrical power and/or any conventional interface for electrically coupling the system 300 to a conventional source of electrical power.

The electric strike 310 is illustratively actuatable between a latch engage position and a latch disengage position. In the latch engage position, a latch of the handle set 308 captured by the strike 310 is prevented from being released therefrom, and in the latch release position the latch of the handle set 308 may be drawn out of the strike 310 by forcing the latch, e.g., by manually pivoting the door 306, away from the strike 310. In some embodiments, the electric strike 310 is configured such that the latch of the handle set 308 can be recaptured thereby in the latch engage position. An example, non-limiting embodiment of the electric latch 310 and its operation is illustrated in FIGS. 28A, and 28B and described in detail below.

In one embodiment, the actuator 314 may be or include an electromechanical switch that is manually actuatable, as illustrated by example in FIG. 27A, to cause the source 312 of electrical power to actuate the electric door strike 310 to the latch release position described above. Release of the switch illustratively causes the source 312 of electrical power to deactuate the electric door strike 310 to the latch engage position. In some embodiments, actuator 314 and/or the source 312 of electrical power may include a delay between release of the switch and deactuation of the electric door strike 310, and in other embodiments such deactuation may occur immediately upon release of the switch. Alternatively or additionally, the actuator 314 may be a voice-activated switch assembly including conventional voice-activation circuitry and/or components responsive to voice commands to cause the source 312 of electrical power to actuate the electric door strike 310 to the latch release position as illustrated by example in FIG. 27B. In still other embodiments, the actuator 314 may alternatively or additionally be a wireless communication-activated switch assembly including conventional electrical circuitry and/or components configured to wirelessly communicate with a fob or mobile device carried on or by a person to cause the source 312 of electrical power to actuate the electric door strike 310 to the latch release position upon detection of the fob or mobile device within a predefined or selectable distance from the actuator 314. In still further embodiments, the actuator 314 may alternatively or additionally be a proximity or conductive touch-activated switch assembly including a conventional switch electrically coupled to a conventional proximity or conductive touch sensor assembly responsive to detection of an object to cause the switch to apply electrical power from the source 312 to the electric door strike 310 to actuate the electric door strike 310. Those skilled in the art will recognize other components that may be included in or as part of the actuator 314, and/or recognize other techniques, that may be used to selectively cause the source 312 of electrical power to actuate the electric door strike 310 to the latch release position, and it will be understood that any such other components and/or techniques are intended to fall within the scope of this disclosure.

The lockset system 300 illustratively includes a hands-free opening feature which automatically opens the door 306 of the door assembly 302 upon actuation of the electric door strike 310 from the latch engage position to the latch release position to thereby release a latch of the handle set 308. It will be understood that the phrase "automatically opens the door," as this phrase is used herein, means that that hands-free opening feature forces the door 306, following actuation of the electric door strike 310 from the latch engage to the latch release position, to pivot via the one or more hinges coupling the door 306 to the jamb assembly 304 by at least an amount which displaces the latch of the handle set 308 relative to the electric door strike 310 so as to at least partially open the door 306. In this pivoted position, a person may then enter through the doorway by pushing against the now freely pivoting door 306, e.g., using any one or combination of body parts, e.g., shoulder, elbow, knee, hip, foot, etc. This disclosure contemplates various structures for implementing the hands-free feature, and some non-limiting example embodiments thereof are illustrated in the attached figures and described in detail below.

Figure 28A:
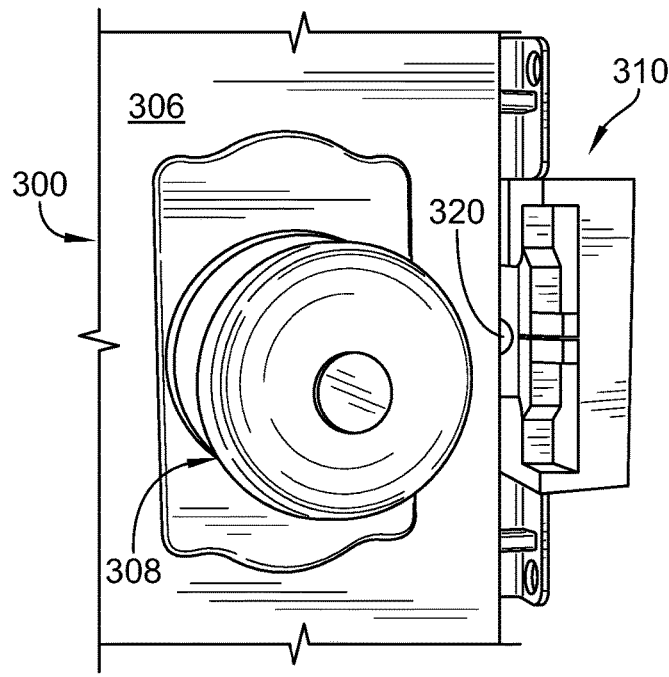
FIG. 28A is a perspective view of the electric lockset system of FIG. 26 illustrating an embodiment of the electric strike which incorporates an automatic door opening feature.
Figure 28B:
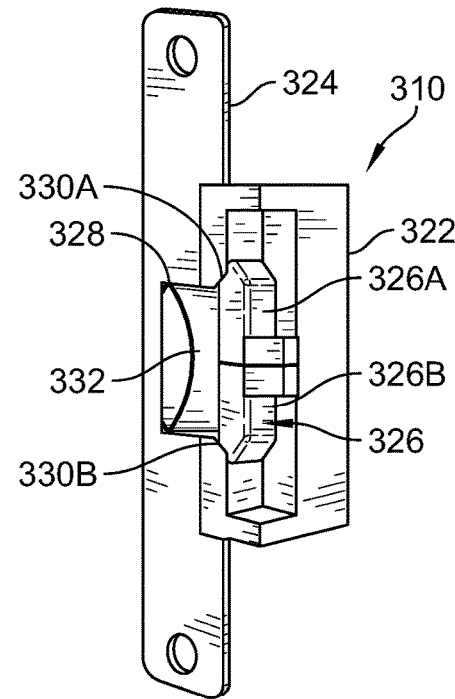
FIG. 28B is a perspective view of the electric strike of FIG. 28A.

Referring now to FIGS. 28A and 28B, an embodiment is shown of the electric strike 310 illustrated in FIG. 26 in which the electric strike 310 illustratively incorporates the hands-free feature in the form of a biasing member for biasing a latch of the knob set or lever set 308 outwardly away from a latch pocket of the strike 310 upon actuation of the strike 310 to the latch release position. The strike 310 illustratively includes a strike housing 322 affixed to a mounting bracket 324 that is configured to be mounted to the jamb 304B of the jamb assembly 304 opposite the handle set 308. A keeper assembly 326 is mounted within the housing 322 and includes a pair of pivoting keepers 326A, 326B normally abutting one another over a latch pocket 328 defined by the housing 322 as illustrated in FIGS. 28A and 28B. This is the latch engage position of the strike 310. The keepers 326A, 326B are responsive to electrical actuation thereof to pivot away from one another about respective pivot attachments 330A, 330B to open a channel therebetween. This is the latch release position of the strike 310. A biasing member 332, e.g., a leaf spring or other biasing member, is illustratively positioned in the latch pocket 328 as most clearly shown in FIG. 28B.

As illustrated in FIG. 28A, the latch 320 of the handle set 308 is illustratively captured in the latch pocket 328 between the biasing member 332 and the abutting keepers 326A, 326B in the latch engage position of the strike 310. The biasing member and/or the biasing force of the biasing member 332 is illustratively selected so as to force the latch 320 against the keepers 326A, 326B in the latch engage position of the strike 310 sufficiently so that, upon switching of the strike 310 from the latch engage position to the latch release position, the latch 320 is ejected through the channel formed between the keepers 326A, 326B, thereby causing the door 306 to pivot about its hinges and thus automatically open in response to switching of the strike 310 from the latch engage position to the latch release position.

Figure 29:
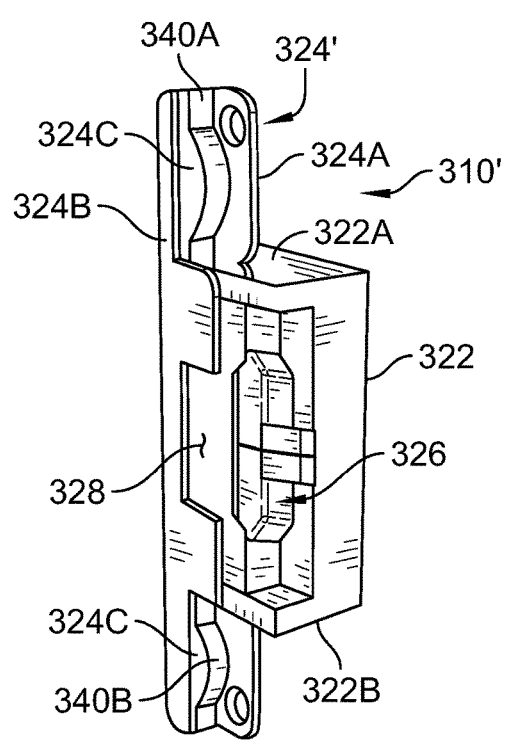
FIG. 29 is a perspective view of another embodiment of the electric strike of FIG. 26 which incorporates the automatic door opening feature.

Referring now to FIG. 29, another embodiment 310' is shown of the electric strike 310 illustrated in FIG. 26 in which the electric strike 310' illustratively incorporates the hands-free feature in the form of biasing members disposed on either side of the strike housing 322 for biasing respective structures of the handle set 308 outwardly away from the strike 310' upon actuation of the strike 310' to the latch release position. The strike 310' is identical is some respects to the strike 310 illustrated in FIGS. 28A-28B, and like numbers are therefore used to identify like structures. The strike housing 322 is affixed to a mounting bracket 324' having a planar mounting portion 324A configured to be mounted to the jamb 304A of the jamb assembly 304 opposite the handle set 308, having another planar portion 304B offset from the planar portion 304A, and a planar wall 304C joining the planar portions 304A, 304B rearwardly of the housing 322. A biasing member 340A is mounted to the planar wall 324C adjacent to a top end 322A of the housing 322, and another biasing member 304B is mounted to the planar wall 324C adjacent to a bottom end 322B of the housing 322. The keeper assembly 326 is mounted within the housing 322 the latch pocket 328 defined between the housing 322 and the keeper assembly 326. In the illustrated embodiment, the biasing members are provided in the form of leaf springs. In some alternate embodiments, as illustrated by example in FIG. 30A, a pin or post 342A is mounted to the mounting portion 324B' of a modified mounting bracket 324" adjacent to the top end 322A of the housing 322, and another pin or post 342B is mounted to the mounting portion 324B adjacent to the bottom end 322B of the housing 322. A biasing member in the form of a torsion spring 344A is received on the pin or post 342A with one end of the spring 344A abutting the housing 322 and/or a portion of the bracket 324", and another biasing member also in the form of a torsion spring 344B is received on the pin or post 342B with one end of the spring 344B abutting the housing 322 and/or a portion of the bracket 324".

Figure 30A:
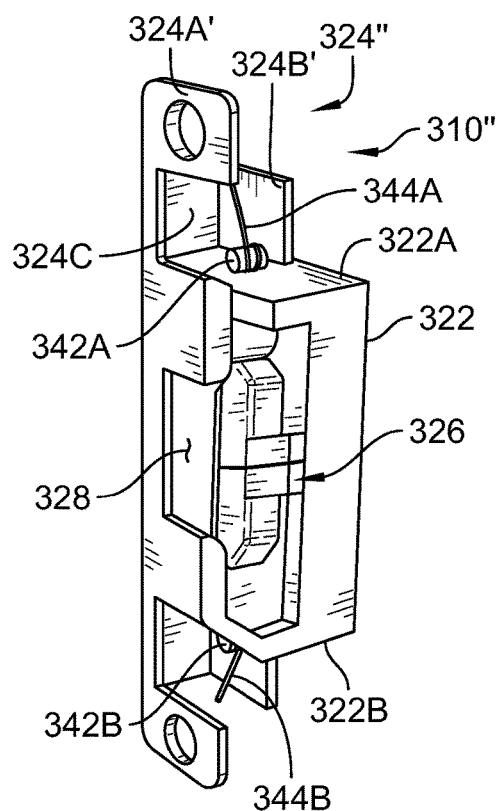
FIG. 30A is a perspective view of yet another embodiment of the electric strike of FIG. 26 which incorporates the automatic door opening feature.

Referring now to FIGS. 30B and 30C, another embodiment of a lockset system 300' is shown implementing the strike 310" of FIG. 30A. In the illustrated embodiment, the latch 320 of a modified lockset 308' is shown captured in the pocket 328 defined by the housing 322 of the strike 310" with the keeper assembly closed such that the strike 310" is in the latch engage position. A pin, post or other suitable structure 346A is mounted to the edge face 306A of the door 306 above the latch 320 and is aligned with the free end of the torsion spring 344A such that, in the closed position of the door 306 with the latch 320 captured in the pocket of the strike 310" in the latch engage position of the strike 310", the free end of the torsion spring 344A applies a biasing force against the pin, post or other suitable structure 346A in the opening direction of the door 306. Illustratively, another pin, post or other suitable structure 346B is mounted to the edge face 306A of the door 306 below the latch 320 and is aligned with the free end of the torsion spring 344B such that, in the closed position of the door 306 with the latch 320 captured in the pocket of the strike 310" in the latch engage position of the strike 310", the free end of the torsion spring 344B applies a biasing force against the pin, post or other suitable structure 346B in the opening direction of the door 306. The biasing forces applied by the torsions springs 344A, 344B against the pins, posts or other suitable structures 346A, 346B is selected so as to force the door 306 to an open position, i.e., to automatically open the door 306, upon switching of the electric strike 310" from the latch engaged position to the latch release position. In embodiments in which the strike 310' of FIG. 29 is implemented, the force applied by the leaf springs 340A, 340B against the pins, posts or other suitable structures 346A, 346B is likewise selected so as to force the door 306 to an open position, i.e., to automatically open the door 306, upon switching of the electric strike 310' from the latch engaged position to the latch release position.

Figure 31A:
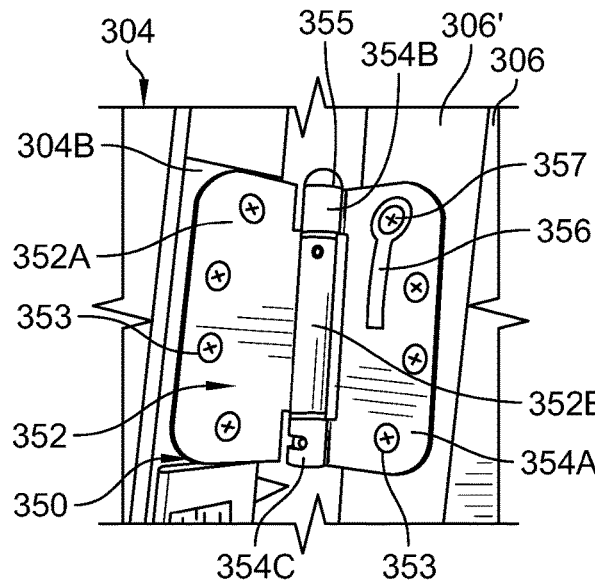
FIG. 31A is a perspective view of an embodiment of a door hinge assembly for the electric lockset system of FIG. 26, wherein the door hinge assembly incorporates another embodiment of the automatic door opening feature.
Figure 31B:
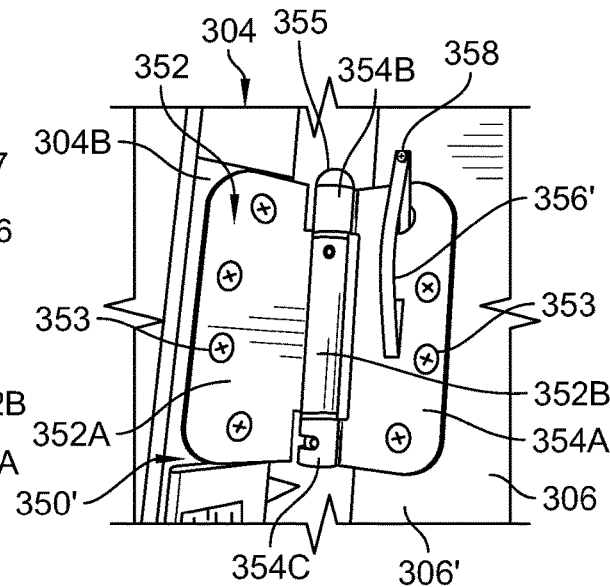
FIG. 31B is a perspective view of another embodiment of a door hinge assembly which incorporates the automatic door opening feature.

In some embodiments, the hands-free feature described above, i.e., the automatic door opening feature, may be implemented or embodied in one or more hinges pivotably coupling the door 306 to the door jamb assembly 304. Referring to FIGS. 31A and 31B, for example, embodiments of a hinge assembly 350, 350' respectively are shown which include an automatic door opening feature. The hinge assembly 350 includes a conventional hinge 352 having a hinge plate 352A secured to an inwardly-facing side of a jamb 304B of the jamb assembly 304 via at least one conventional fixation element 353, and another hinge plate 354A secured to an outwardly-facing side edge 306' of the door 306 via at least one conventional fixation element 353. In the illustrated embodiment, the hinge plate 354A defines two spaced-apart hinge pin receivers 354B, 354C extending laterally from the plate 354A, and the hinge plate 352A defines a single hinge pin receiver 352B extending from the plate 352A and aligned with the space defined between the hinge pin receivers 352B, 352C such that an elongated hinge pin 355 is sequentially received by and within the hinge pin receivers 354B, 352B, 354C respectively to pivotably couple together the hinge plates 352A, 354A such that the plates 352A, 354A pivot relative to another about a central, longitudinal axis defined through the elongated hinge pin 355 as is conventional. It will be understood that the hinge plates 352A, 354A may alternatively include one or any number spaced-apart hinge pin receivers configured to be pivotably coupled to one another by a single hinge pin. In the embodiment illustrated in FIG. 31A, a biasing member 356, e.g., a leaf spring, is secured directly to the hinge plate 354A by a fixation element 357. In the embodiment illustrated in FIG. 31B, a biasing member 356', e.g., a leaf spring, is mounted to the side edge face 306' of the door 306 above (and/or below) the hinge plate 354A via at least one fixation element 358 with the body of the leaf spring 356' extending over at least a portion of the hinge plate 354A.

The embodiments of the hinge assemblies 350, 350' illustrated in FIGS. 31A, 31B operate identically in that, with the door 306 closed and the latch 320 of the handle set 308 captured within the pocket 328 of a conventional electric strike 310 in its latch engage position, the biasing member 356, 356' applies a biasing force against and between the inwardly-facing side of the jamb 304B and the side edge face 306' of the door 306. Upon switching of the electric strike 310 from the latch engage position to the latch release position, the biasing force of the biasing member 356, 356' acting between the inwardly-facing side of the jamb 304B and the side edge face 306' of the door 306 forces the door 306 to an open position, i.e., the biasing member 356, 356' automatically opens the door. In the illustrated embodiment, a single biasing member 356, 356' is mounted to or in contact with the hinge plate 354, although in alternate embodiments the single biasing member 356, 356' may be mounted instead to the hinge plate 352. In some alternate embodiments, a biasing member 356, 356' may be mounted to the hinge plate 352 and another biasing member 356, 356' may also be mounted to the hinge plate 354. In any embodiment, two or more biasing members 356, 356' may be mounted to the hinge plate 352 and/or to the hinge plate 354. In some embodiments, the biasing member(s) 356, 356' may be provided in the form of one or more other conventional biasing members, e.g., springs of other forms, or any combination of conventional biasing members.

Figure 31C:
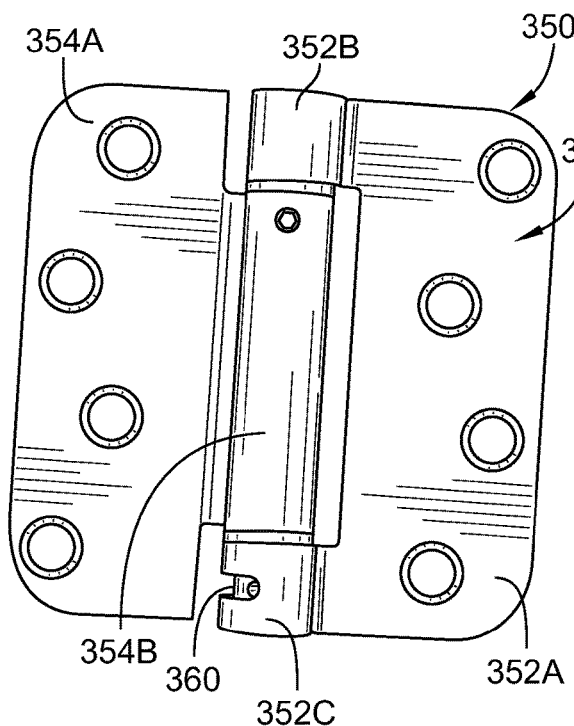
FIG. 31C is a perspective view of yet another embodiment of a door hinge assembly which incorporates the automatic door opening feature.

Referring now to FIG. 31C, an embodiment is shown of a spring hinge 350" having hinge plates 352, 354 and a hinge pin (not shown) as described above, and further including at least one spring 360 operatively mounted to or integral with the hinge pin receiver(s) 352B, 352C and/or 354B and/or the hinge pin. Such a spring hinge 350" is generally intended to be mounted so as to apply an inward biasing force to and between a door jamb and a corresponding side edge face of the door 306 so as to draw the side face of the door 306 toward and against the door jamb to thereby assist in closing the door 306 and/or in maintaining the door 306 is a closed position. In the embodiment as depicted in FIG. 31C, in contrast, the hinge 350" is instead mounted oppositely to and between the door jamb and the corresponding side edge face of the door 306 so as to push the side face of the door 306 away from the door jamb to thereby automatically open the door 306 upon switching of the conventional electric strike 310 from the latch engage position to the latch release position.

Figure 32:
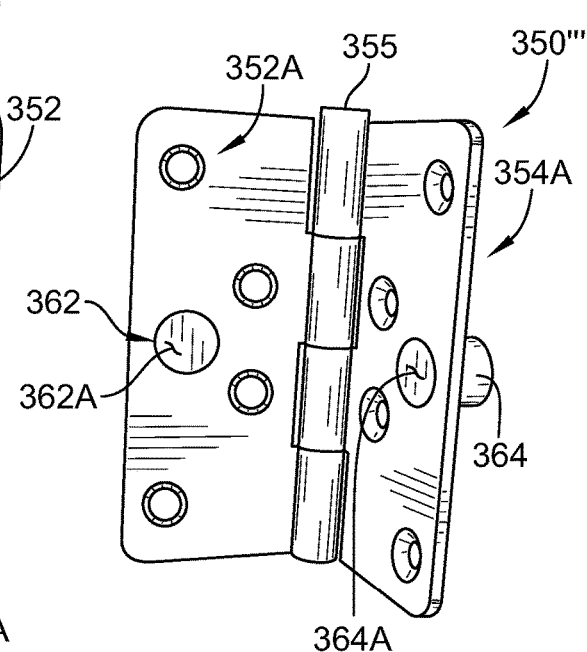
FIG. 32 is a perspective view of yet another embodiment of a door hinge assembly which incorporates the automatic door opening feature.

Referring now to FIG. 32, another embodiment of a hinge assembly 350''' is shown which includes the automatic door opening feature in the form of opposed magnets mounted to the hinge plates 352A, 354A respectively. In the illustrated embodiment, a magnet 362 is mounted to the hinge plate 352A such that a face 362A of the magnet 362 faces the hinge plate 354A when the hinge 350''' is closed. Likewise, another magnet 364 is mounted to the hinge plate 354A such that a face 364A of the magnet 364 faces the hinge plate 352A. The magnets 362, 364 are illustratively aligned with one another relative to the hinge plates 352A, 354A such that, with the hinge 350''' closed the faces 362A, 364A of the respective magnets 362, 364 are juxtaposed with one another. Illustratively, the faces 362A, 264A of the magnets 362, 364 have the same polarity, e.g., either North or South, such that the magnets 362, 364 repel one another when sufficiently close to one another. With the door 306 closed and the latch 320 of the handle set 308 captured within the pocket 328 of a conventional electric strike 310 in its latch engage position, the common-polarity faces 362A, 264A of the magnets 362, 364 repel one another with a force established by the physical characteristics of the magnets 362, 364. Upon switching of the electric strike 310 from the latch engage position to the latch release position, the repelling magnetic forces acting between the faces 362A, 364A of the magnets 362, 364 forces the door 306 to an open position, i.e., the magnets 362, 364 act to automatically open the door 306. In the illustrated embodiment, a single pair of aligned magnets 362, 364 is mounted to or in contact with the hinge plates 352A, 354A, although in alternate embodiments two or more pairs of aligned magnets 362, 364 may be mounted to or in contact with the hinge plates 352A, 354A. In one embodiment, any such magnets are illustratively provided in the form of conventional permanent magnets, although in some alternate embodiments at least one pair of aligned magnets 362, 364 may be conventional electromagnets responsive to electrical actuation thereof, e.g., via the source 312 of electrical power or other source of electrical power 312, to establish the repelling magnetic force described above, e.g., prior to, simultaneous with, or following switching of the electric strike 310 from the latch engage position to the latch release position.

In some embodiments, the biasing member(s) 356, 356', 360, 362, 364 is/are implemented on a single hinge 350, 350', 350", 350''' mounted to and between the door 306 and the jamb assembly 304, although in alternate embodiments the biasing member(s) 356, 356', 360, 362, 364 may be implemented on two or more hinges 350, 350', 350", 350''' mounted to and between the door 306 and the jamb assembly 304. In some embodiments, a single one or any combination of the biasing member(s) 356, 356', 360, 362, 364 may be implemented on any one or more hinges 350, 350', 350", 350''' mounted to and between the door 306 and the jamb assembly 304. In some embodiments, a single one or any combination of the biasing member(s) 356, 356', 360, 362, 364 may be implemented on any one or more hinges 350, 350', 350'', 350''' mounted to and between the door 306 and the jamb assembly 304 in combination with any of the implementations of the automatic door opening feature mounted to or integral with the electric strike 310 as illustrated by example in any of FIGS. 28A-30C.

Figure 33C:
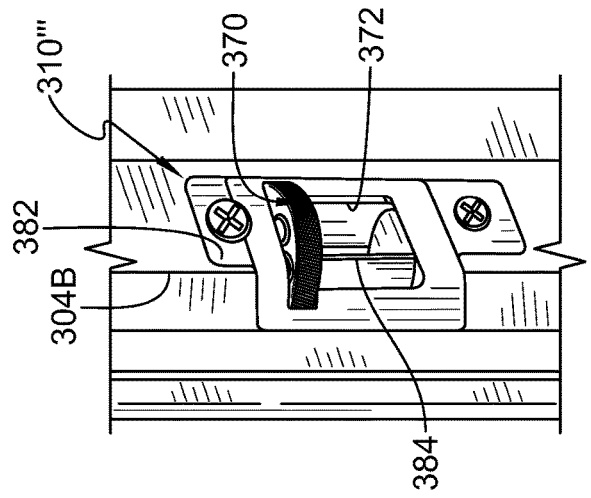
FIG. 33C is a perspective view illustrating an embodiment of the electric strike assembly of FIGS. 33A and 33B mounted to a jamb of a jamb assembly mounted to a doorway.
Figure 33D:
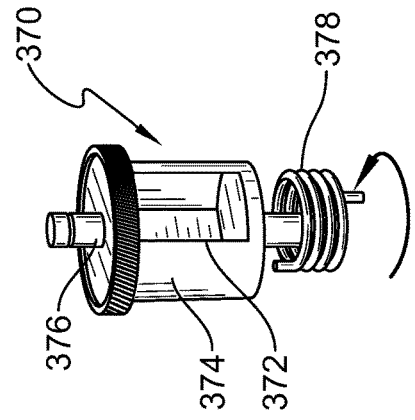
FIG. 33D is a perspective view of the electric strike assembly of FIG. 33C.
Figure 33A:
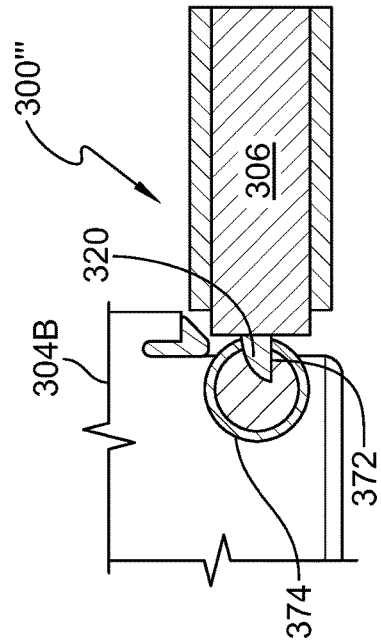
FIGS. 33A and 33B are simplified top plan schematic views illustrating operation of another embodiment of an electric strike assembly which incorporates the automatic door opening feature.
Figure 33B:
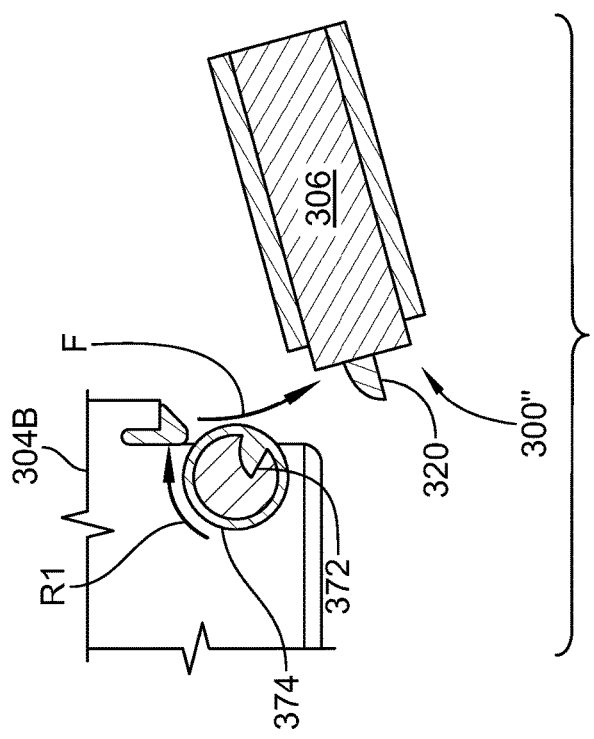

Referring now to FIGS. 33A-33D, yet another embodiment of a lockset system 300''' is shown in which an electric strike 310''' including a biased latch-engaging barrel assembly 370. As depicted by example in FIGS. 33C and 33D, the latch-engaging barrel assembly 370 includes a barrel housing 374 defining a latch pocket 372 therein. The barrel housing 374 is rotatable about a spindle 376 which is mounted to a latch plate assembly 382 such that the barrel housing 374 is rotatable about the spindle 376 with the latch pocket 372 accessible via an opening 384 in the latch plate assembly 382. A biasing member, e.g., a coiled spring 378, stores energy as the barrel housing 374 is rotated about the spindle, i.e., in the counterclockwise direction in the illustrated embodiments. As further depicted by example in FIG. 33A, with the door 306 closed the latch 320 of the handle set 308 is captured and maintained within the latch pocket 372 of the latch-engaging barrel 374 of the electric strike 310''' in its latch engage position. The electric strike 310''' illustratively includes an actuatable pin, post or other suitable structure which engages a stop in the latch engage position of the electric strike 310''' so as to maintain the latch 320 captured within the latch pocket 372 of the barrel housing 374 as illustrated in FIG. 33A. The actuatable pin, post or other suitable structure and the stop are omitted from FIGS. 33A-33B so as not to obscure details of the latch-engaging barrel assembly 370, although those skilled in the art will recognize that such an actuatable pin, post or other suitable structure and the stop may be conventional components. In any case, upon switching of the electric strike 310''' from the latch engage position to the latch release position, the energy stored in the biasing member 378 rotates the barrel housing 374, e.g., in the clockwise direction R1 such that the latch pocket 372 guides the latch 320 along the direction F to automatically open the door 306 as depicted by example in FIG. 33B. It will be understood that the embodiment illustrated in FIGS. 33A-33D may be combined with one or many combination of the various hands-free door opening embodiments illustrated in FIGS. 28A-32 and described above.

Figure 34:
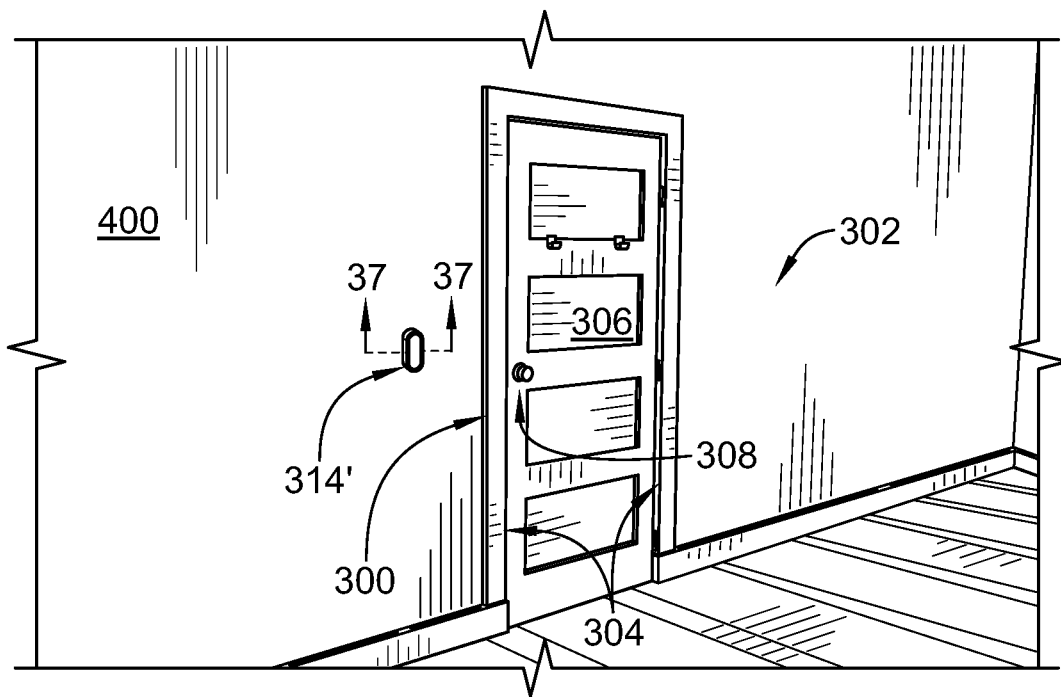
FIG. 34 is a perspective view of the electric lockset assembly and access door illustrated in FIG. 26 illustrating an alternate embodiment of an actuator assembly.

Referring now to FIGS. 34-37, another embodiment is shown of an actuator 314' for the lockset the lockset system 300, wherein the actuator 314' includes the source 312 of electrical power in the form of one or more batteries. The lockset 300 is otherwise identical to the lockset 300 illustrated in FIG. 26 and described above, and like numbers are therefore used to identified like components. As depicted in FIG. 34, for example, the lockset system 300 illustratively includes a door assembly 302 having a jamb assembly 304 mounted to and within a doorway of a building, and an access door 306 is movably mounted to the jamb assembly 304. A conventional lock set 308 is operatively mounted to the access door 306 as shown, and an electric strike (not shown) is mounted to one jamb of the jamb assembly 304 and is electrically coupled to the actuator 314' as described above with respect to FIG. 26. The electric strike may be or include any of the embodiments described above with respect to FIGS. 28A-30C and 33A-33D, and/or the door assembly 302 may include any of the hinge assemblies described above with respect to FIGS. 31A-32.

Figure 36:
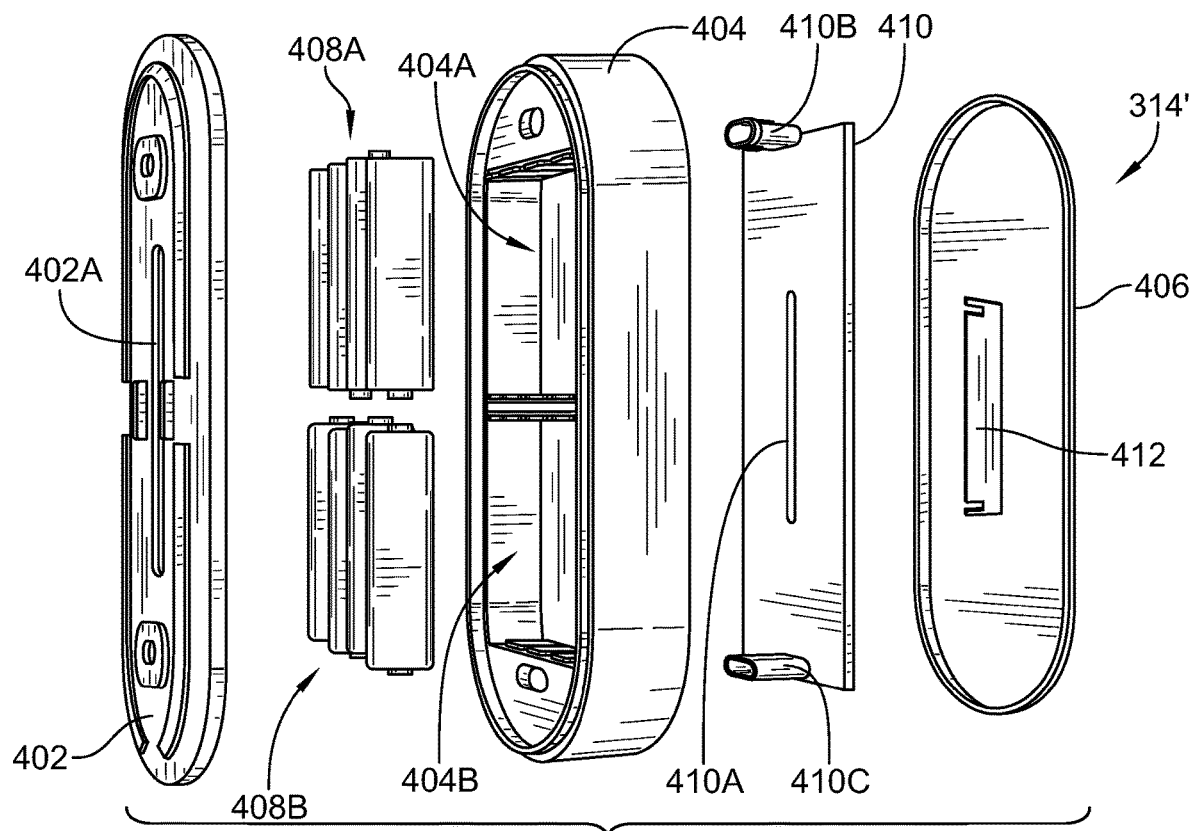
FIG. 36 is a perspective assembly view of the actuator assembly illustrated in FIGS. 34-35B.
Figure 37:
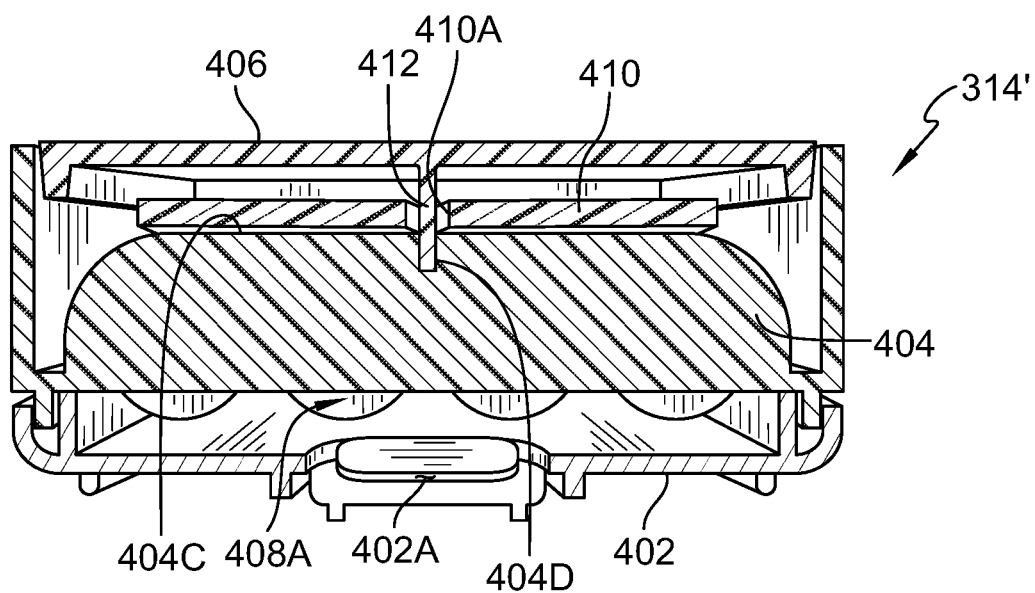
FIG. 37 is a cross-sectional view of the actuator assembly of FIGS. 34-36 as viewed along section lines 37-37 of FIG. 34.

Referring now specifically to FIGS. 34 and 36 and 37, the actuator 314' illustratively includes a mounting plate 402 configured to be mounted to a wall 400 of the building adjacent to or spaced apart from the door assembly 302. A housing 404 is configured to be mounted to the mounting plate 402, and a toggle plate 406 is received in the housing 404 with a circuit board 410 disposed therebetween. In the illustrated embodiment, the housing is configured to include upper and lower pockets 404A, 404B each sized and configured to receive therein a set of batteries 408A, 408B respectively. The pockets 404A, 404B are each illustratively outfitted with conventional electrical contacts configured to electrically connect to the batteries making up the respective sets of batteries 404A, 404B, and to electrically connect to the circuit board 410.

An elongated opening 410A is formed vertically through the circuit board 410, and the opening 410A is sized to receive therethrough a correspondingly sized elongated projection 412 extending away from a rear face of the toggle plate 406. A front face 404C of the housing 404, opposite the pockets 404A, 404B, defines a slot 404D therein likewise sized to receive the elongated projection 412 therein as best shown in FIG. 37. The projection 412 is illustratively flexible or at least semi-flexible along its longitudinal axis so as to form a living hinge relative to the slot 414D of the housing 404 and the opening 410A of the circuit board 410, such that the toggle plate 406 is movable relative to the housing 404 between three different switch positions as will be described below.

An electrical connector 410B extends rearwardly from the circuit board 410, and is configured to connect, via one or more wires, the actuator 314' to the electric strike 310 mounted in the door assembly 302, wherein the one or more wires may pass through the mounting plate 402 to the electric strike 310 via an opening 402A formed through the mounting plate 402. In some embodiments, a "learn button" 410C may be mounted to the circuit board 410 for pairing with, and then interfacing with, one or more conventional remote control units and/or mobile communication devices. The circuit board 410 illustratively includes conventional circuitry for detecting and distinguishing between the three different positions of the toggle plate 406 relative to the housing 404 and the circuit board 410, and for corresponding controlling the switching of electrical power from the batteries 408A, 408B to the electrical connector 410B.

Figure 35A:
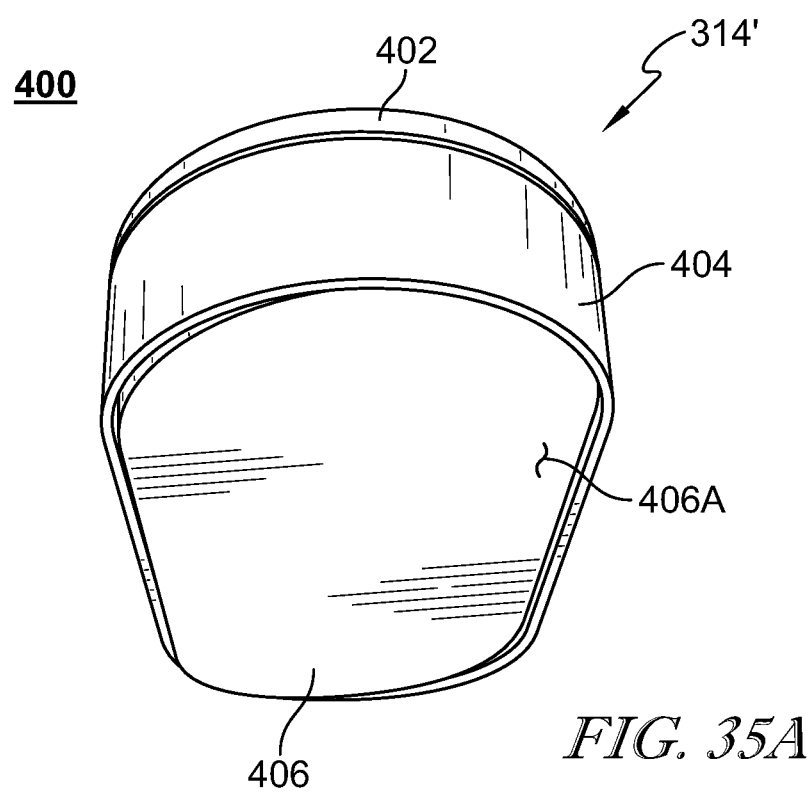
FIG. 35A is a top perspective view of the actuator assembly illustrated in FIG. 34, showing the switch plate in one electric lockset actuating position.
Figure 35B:
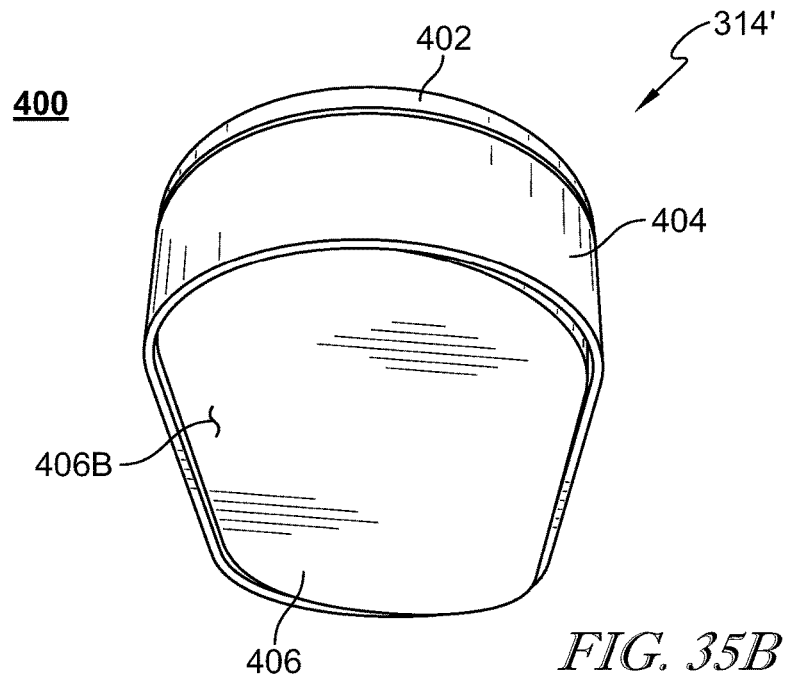
FIG. 35B is a top perspective view similar to FIG. 35A and showing the switch plate in another electric lockset actuating position.

Referring now specifically to FIGS. 35A, 35B and 37, the three different positions of the toggle plate 406 relative to the housing 404 and the circuit board 410 are illustrated. The position of the toggle plate 406 illustrated in FIG. 37 is the center position, and is illustratively the "off" position in which the actuator 314' is deactuated so that no electrical power is supplied to the electrical connector 410B (and thus no electrical power is supplied to the electric strike 310). The toggle plate 406 also has right (FIG. 35A) and left (FIG. 35B) "on" positions. As illustrated by example in FIG. 35A, pressure applied manually to the right side 406A of the toggle plate 406 causes the toggle plate 406 to move from the center "off" position to the right-side "on" position, and pressure applied manually to the left side 406B of the toggle plate 406 causes the toggle plate 406 to similarly move from the center "off" position to the left-side "on" position. Illustratively, the toggle plate 406 and the remaining components of the actuator 314' are sized so as to be easily activated manually by a persons' hand, elbow, shoulder, hip or other body part. In alternate embodiments, the actuator 314' may be configured to include more or fewer switch positions, i.e., more or fewer "on" positions of the toggle plate 406.

Figure 38:
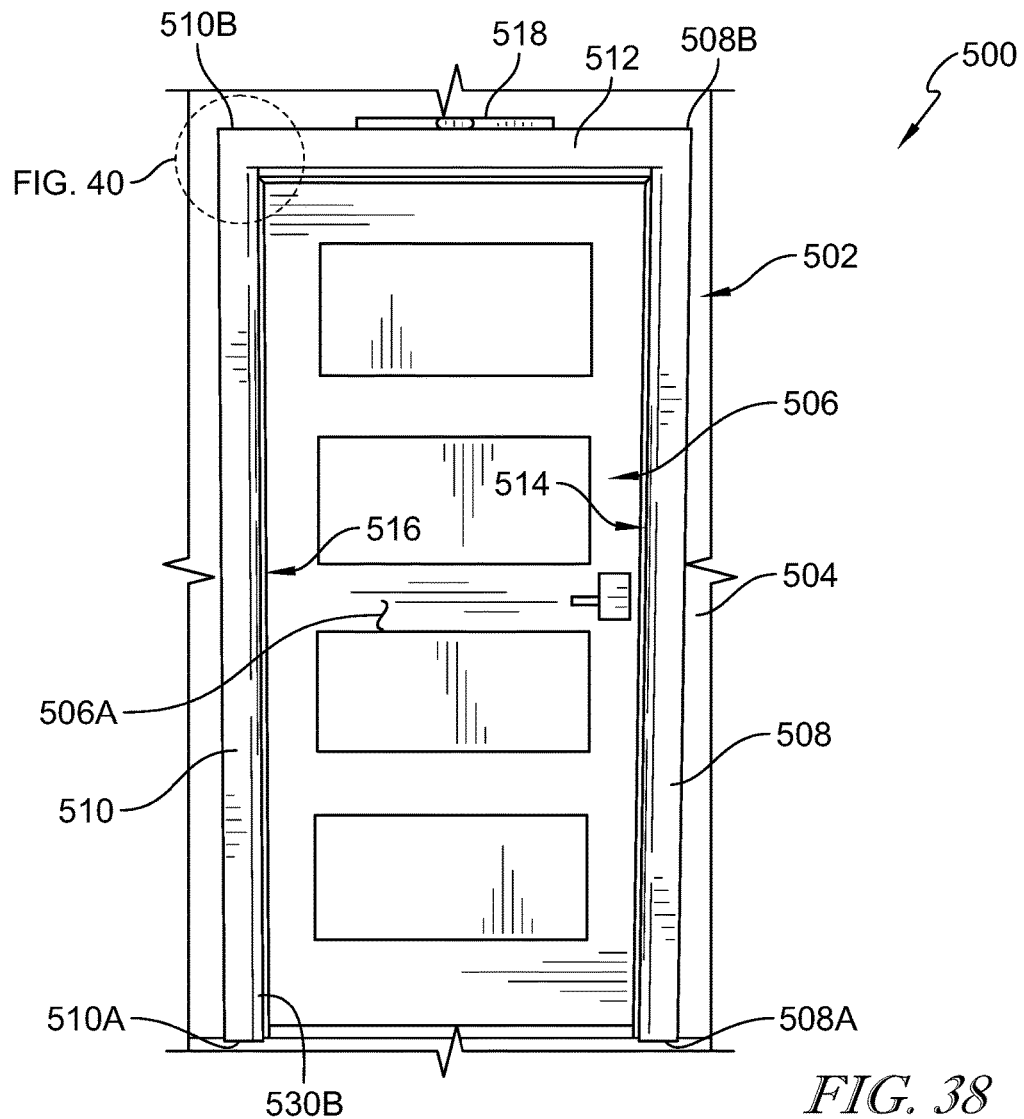
FIG. 38 is a front plan view of an embodiment of an illumination kit including jamb casing assemblies, each having an illumination strip mounted thereto, and a header casing assembly having a power and control module mounted thereto, wherein the jamb casing assemblies and the header casing assembly are shown mounted to a door jamb surrounding a door and to which the door is operatively mounted.

Referring now to FIGS. 38-45, an embodiment is shown of an illumination kit 502 mountable to a door jamb assembly 504 defined about a doorway opening to provide for a corresponding illuminated door system 500. Referring specifically to FIG. 38, the illumination kit 502 is shown mounted to the jamb assembly 504 about a door 506, and the door 506 is shown operatively mounted to one side of the jamb assembly 504 in a conventional manner. The jamb assembly 504 is illustratively as described above in the various embodiments illustrated in the attached figures, and illustratively includes jambs positioned on opposite sides of the door 506 and secured to corresponding sides of a door frame assembly of the building, and a header coupled to and between top ends of the jambs. In one embodiment, the illumination kit 502 is separate from the door 506 and may be retrofit to an existing door assembly, i.e., a door assembly previously mounted to the jamb assembly 504. In alternate embodiments, the illumination kit 502 may be supplied with a door 506 for mounting together to the jamb assembly 504. In some such embodiments, the illumination kit 502 may be matched, e.g., color-matched and/or style-matched, to the door 506, and in other such embodiments the illumination kit 502 may be colored and/or styled differently than the door 506.

As depicted in FIG. 38, the illumination kit 502 illustratively includes a door casing assembly 508 mountable to the jamb assembly 504 along one side of the door 506, e.g., along the latch side of the door 506, another door casing assembly 510 mountable to the jamb assembly 504 along the opposite side of the door 506, e.g., along the hinge side of the door 506, a header casing assembly 512 mountable to a header of the jamb assembly 504 along a top of the door 506, and a power and control module 518 mounted or mountable the header casing assembly 512. The door casing assembly 508 is illustratively oriented such that a bottom end 508A thereof is positioned adjacent to, or near, the floor of the building to which the door 506 is mounted, e.g., at or near the bottom of the door 506, and such that a top end 508B is positioned above the top of the door 506. The door casing assembly 510 is likewise illustratively oriented such that a bottom end 510A thereof is positioned adjacent to, or near, the floor of the building to which the door 506 is mounted, e.g., at or near the bottom of the door 506, and such that a top end 510B is positioned above the top of the door 506. Between the bottom 508A and the top 508B of the door casing assembly 508, an illumination strip 514 is mounted such that illumination thereof is visible forward of the door 506, i.e., from the view illustrated in FIG. 38. Between the bottom 510A and the top 510B of the door casing assembly 510, an illumination strip 516 is likewise mounted such that illumination thereof is visible forward of the door 506, i.e., from the view illustrated in FIG. 38.

Figure 39:
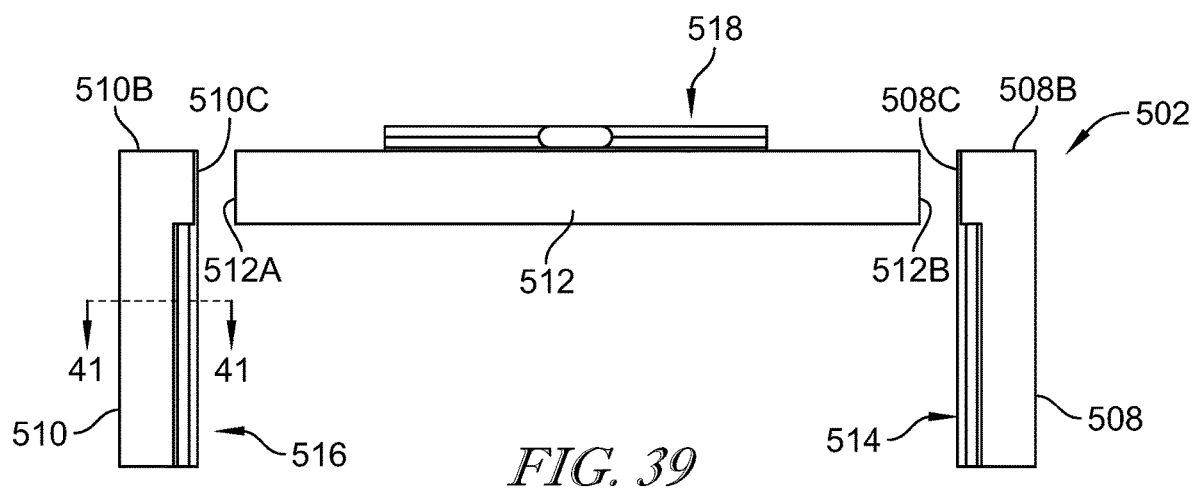
FIG. 39 is an exploded view of a portion of the illumination kit illustrated in FIG. 38 illustrating adjustable mounting of the header casing assembly to the jamb casing assemblies.

The header casing assembly 512 is oriented such that one end 512A of the header casing assembly 512 abuts an inner edge 510C of the door casing assembly 510 adjacent to the top 510B thereof, and such that an opposite end 512B of the header casing assembly 512 abuts an inner edge 508C of the door casing assembly 508 adjacent to the top 508B thereof, as best illustrated in FIG. 39. The power and control module 518 is illustratively mounted or mountable to and along a top edge or surface of the header casing assembly 512. In some embodiments, the power and control module 518 is centered on the header casing assembly 512, although in alternate embodiments the power and control module 518 may not be so centered, may be mounted to a different portion of the header casing assembly 512, may be mounted to the door casing assembly 508 or 510, or may be mounted to the jamb assembly 504 and/or to the wall adjacent to the header casing assembly 512 or adjacent to one of the door casing assemblies 508, 510.

In one embodiment, the door casing assemblies 508, 510 and the header casing assembly 512 are sized to be mounted to a jamb assembly 504 of a correspondingly sized door 506. In some alternate embodiments, the door casing assemblies 508, 510 may be sized to be mounted to a jamb assembly 504 of a range of widths of the door 506, and the header casing assembly 512 may be sized for the maximum width door 506 in the range of widths. In such embodiments, the header casing assembly 512 may be cut to size, e.g., by cutting either or both of the ends 512A, 512B, to accommodate a correspondingly sized door 506. Alternatively or additionally, the door casing assemblies 508, 510 may be sized to be mounted to a jamb assembly 504 of a range of heights. In such embodiments, the door casing assemblies 508, 510 may be cut to size, e.g., by cutting the bottom ends 508A, 510A, to accommodate a correspondingly sized door. In one example implementation, which should not be considered to be limiting in any way, the header casing assembly 512 (and in some embodiments also the door casing assemblies 508, 510) may be sized to accommodate a 36 inch door 506 but may be cut or otherwise shortened as just described to accommodate a 32 inch door 506.

Figure 40:
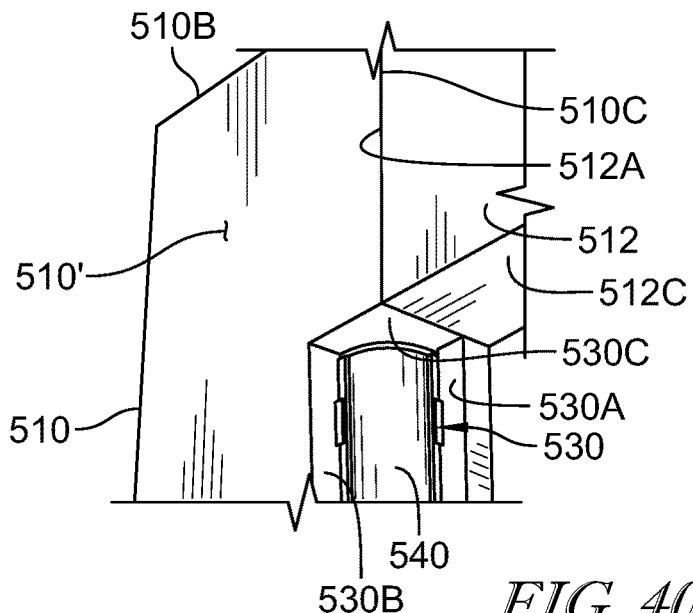
FIG. 40 is a magnified view of the circled portion of the illumination kit shown in FIG. 38, illustrating further details of the illumination strip integrated into the jamb casing assemblies.
Figure 41:
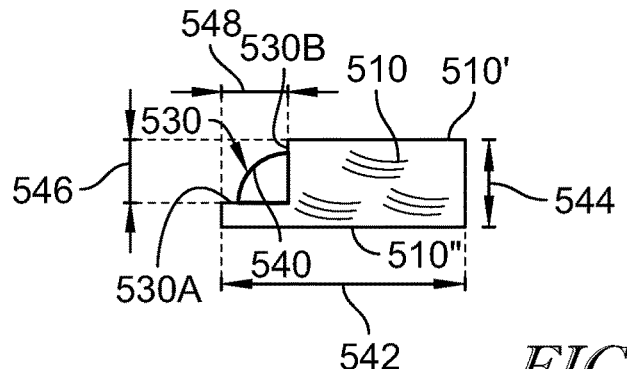
FIG. 41 is a cross-sectional view of one of the jamb casing assemblies, as viewed along section lines 41-41 of FIG. 39.
Figure 42:
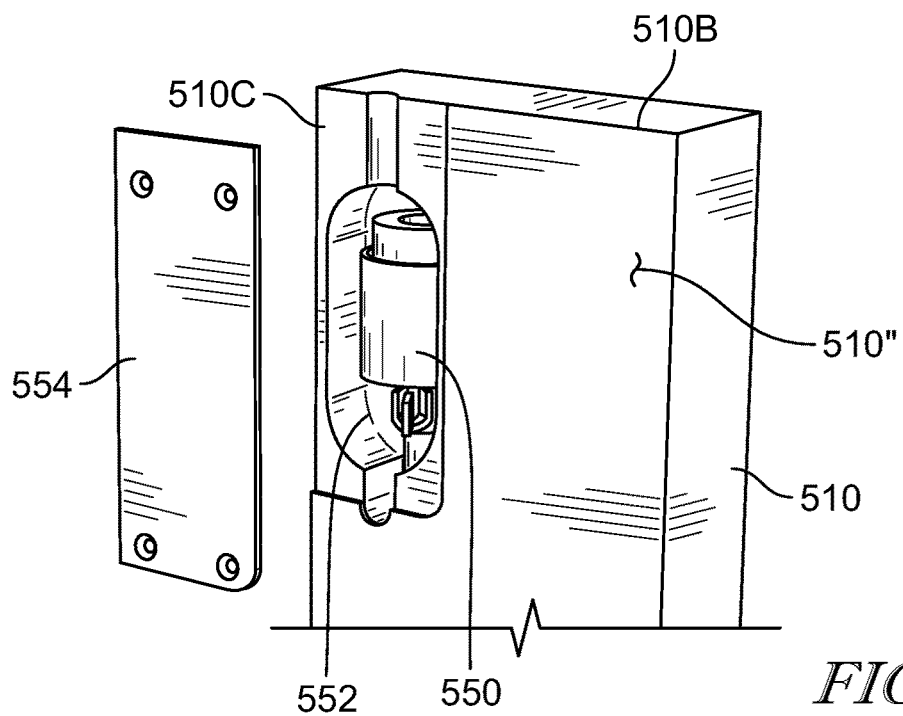
FIG. 42 is a perspective view of a portion of the backside of one of the jamb casing assemblies illustrating mounting of an illumination device assembly thereto for illuminating the illumination strip illustrated in FIG. 40.

The door casings 508, 510 are each illustratively configured to integrate therein an illumination strip 540 and an illumination device assembly 550 operatively coupled thereto, such that illumination produced by the illumination device assembly 550 is emitted by the illumination strip 540 in a direction inwardly across the door 506 (toward the opposite illumination strip 540) and outwardly away from the outer face 506A of the door 506 (as illustrated in FIG. 38). Referring now to FIGS. 40-42, an embodiment of the door casing assembly 510 is shown illustrating such features, and it will be understood that the door casing assembly 508 is identically configured. As best illustrated in FIGS. 40 and 41, the inwardly-facing edge of the door casing assembly 510 (i.e., the edge of the assembly 510 facing the oppositely positioned door casing assembly 508) defines an L-shaped channel 530 having a wall 530A that is recessed relative to, and substantially parallel with, the front face 510' of the door casing assembly 510, and another wall 530B that is recessed relative to the inwardly-facing edge of the door casing assembly 510 and substantially normal to the wall 530A. A top 530C of the channel 530 is approximately flush with the bottom edge 512C of the header casing assembly 512, and a bottom 530D is spaced upwardly apart from the bottom end 510A of the door casing assembly 510 (see FIG. 38).

Figure 21:
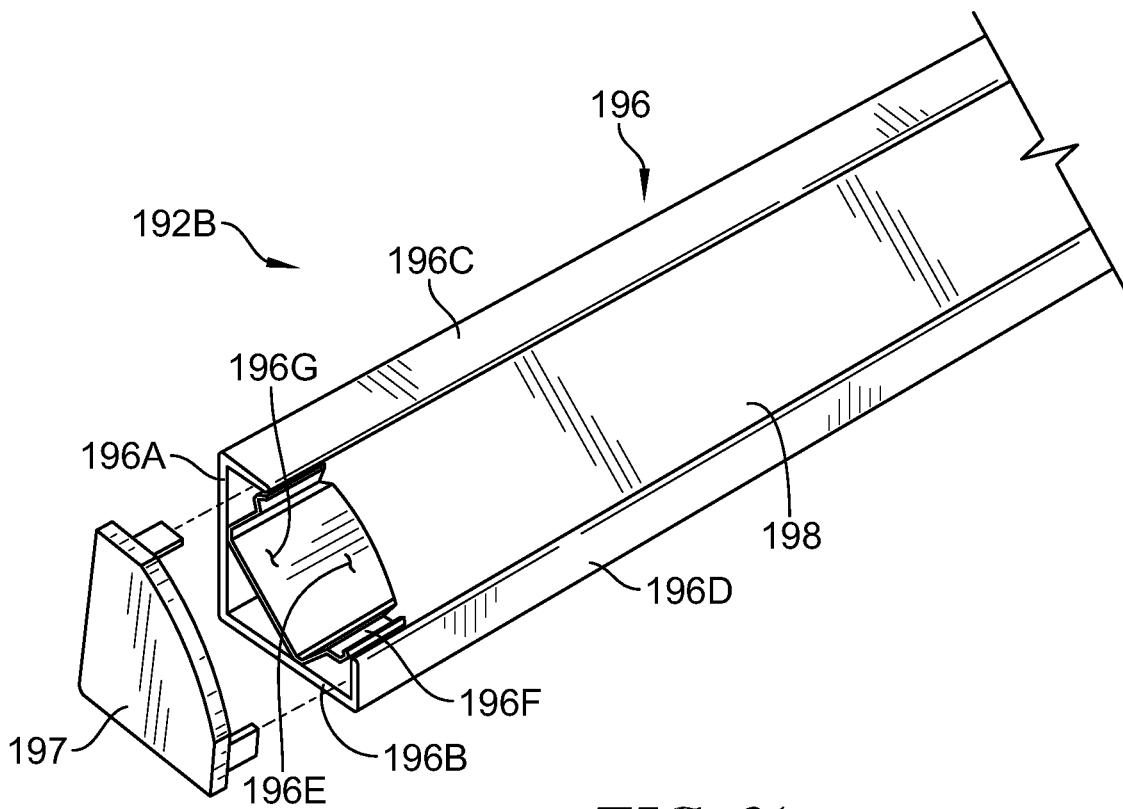
FIG. 21 is a perspective view of an embodiment of the illumination strip mounted to the door assembly of FIG. 20.

The illumination strip 540 is illustratively shaped like the illumination strips 192A, 192B illustrated in FIG. 21 and described above, and includes normal, planar sides abutting the walls 530A, 530B respectively, and an arcuate wall joining the ends of the normal, planar walls. Illustratively, at least the arcuate wall of the illumination strip 540 is formed of a light-transmissive material as described above with respect to the cover 198 illustrated in FIG. 21. In some embodiments, the illumination strip 540 may be formed entirely of such material so as to form an illumination tube, e.g., a light pipe. In any case, the illumination strip 540 illustratively extends downwardly through the bottom 530D of the channel 530 and upwardly through the top 530C of the channel 530 such that the illumination strip 540 is secured to, and integrated into, the door casing assembly 510.

The door casing assembly 510 illustratively has a width 542 and a thickness 544, and the channel 530 has a width 548 and a thickness 546. In one example embodiment, which should not be considered limiting in any way, the width 542 is 3.5 inches, the thickness 544 is 1.5 inches, the width 548 is 0.97 inches and the thickness 548 is 0.94 inches, although it will be understood that in alternate embodiments one or more of the above example dimensions may be greater or lesser. In some embodiments, the width 542 of the door casing assembly 510 may be reduced, e.g., by cutting the edge opposite the channel 530.

As best shown in FIG. 42, a pocket 552 is illustratively formed in the rear face 510" of the door casing assembly 510 just below the top 510B thereof and just above the top 530C of the channel 530 (see FIG. 40), and is sized to receive the illumination device assembly 550 therein. The illumination device assembly 550 is illustratively similar or identical to the illumination device assembly 202A, 202B illustrated in FIGS. 22 and 23 and described above, and is configured to operatively couple to the illumination strip 540 as also described above. The illumination device assembly 550 includes at least one illumination source, and illumination produced thereby is directed into the illumination strip 540 for illumination thereof as further described above. A suitable cover 554 may be mounted over the pocket 552 to protect the illumination device assembly 550.

Figure 43:
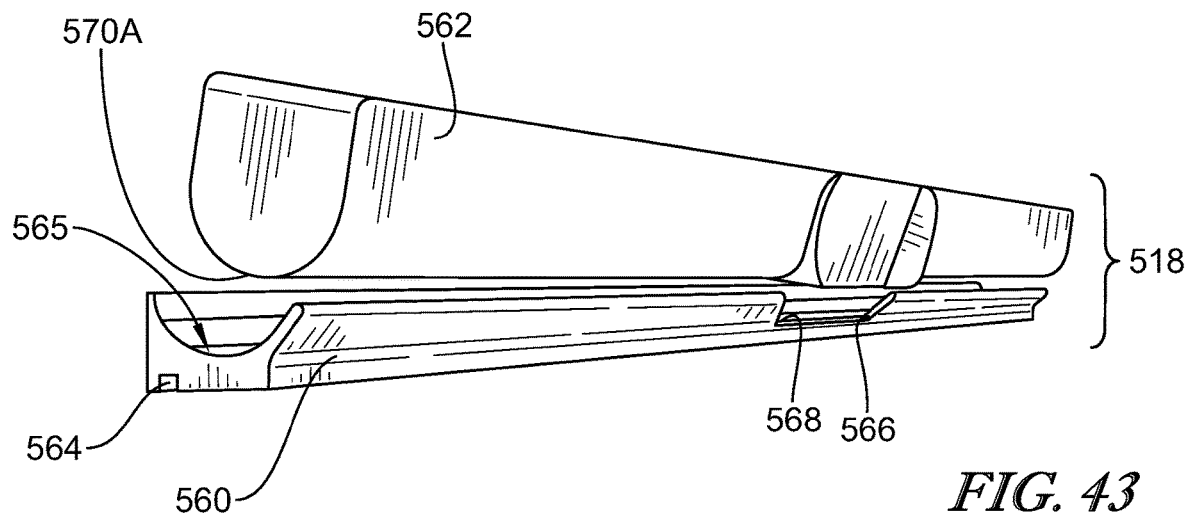
FIG. 43 is a perspective view of an embodiment of the power and control module of the illumination kit.
Figure 44:
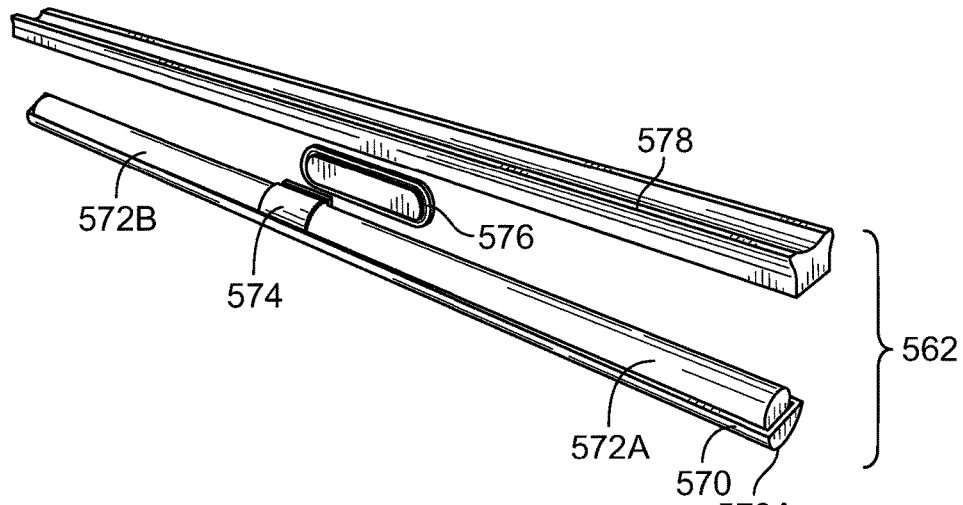
FIG. 44 is an exploded, perspective view of the housing portion of the power and control module illustrated in FIG. 43.
Figure 45:
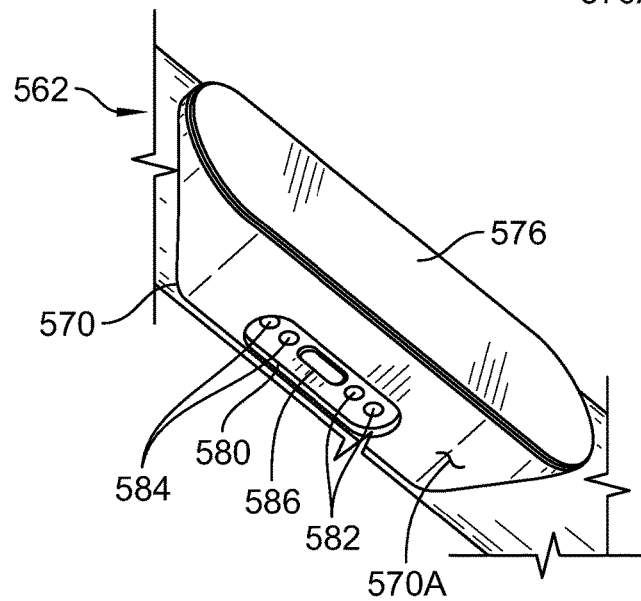
FIG. 45 is a bottom perspective view of a section of the housing portion of the power and control module illustrating an embodiment of an electrical interface thereof.

Referring now to FIGS. 43-45, an embodiment is shown of the power and control module 518 illustrated in FIGS. 38 and 39. In the illustrated embodiment, the power and control module 518 includes an elongated base or cradle 560 and an elongated, housing 562. The base or cradle 560 is configured to be mounted, e.g., secured, to the top surface of the header casing assembly 512. The base or cradle 560 illustratively defines at least one longitudinal channel 564 along a bottom surface thereof through which an electrical interface wire(s) or cable can be routed between the illumination strips 514, 516 and electrical terminals defined on the base or cradle 560. One such electrical interface wire(s) or cable is operatively connected between the illumination device assembly 550 that is coupled to the illumination strip 514 and an electrical terminal 566 defined on the base or cradle 560, and another electrical interface wire(s) or cable is operatively connected between the illumination device assembly 550 that is coupled to the illumination strip 516 and an electrical terminal 568 defined on the base or cradle 560.

The cradle 560 and the housing 562 are configured such that the housing 562 can be releasably coupled, both mechanically and electrically, to the base or cradle 560. In one embodiment, for example, the cradle 560 defines a longitudinal, concave, e.g., arcuate, channel or pocket 565 in a top side thereof (opposite the bottom side of the cradle 560 that is mounted to the top edge or surface of the header casing assembly 512), and a bottom surface 570A of the housing 562 defines a complementarily configured longitudinal, convex, e.g., arcuate, surface such that the housing 562 mounts to the cradle 560 with the convex surface 565 of the housing 562 being received within the concave channel 565 as illustrated by example in FIG. 43. In alternate embodiments, the cradle 560 and the housing 562 may be alternately configured such that the housing 562 may be releasably couple to the cradle 560. In one embodiment, the housing 562 and the cradle 560 are both fitted with one or more permanent magnets, such that the housing 562 magnetically couples to the cradle 560 when the convex surface 570A is received within the concave channel 565. In such embodiments, the strength(s) of the one or more magnets will be selected such that the housing 562 will be normally magnetically coupled to the cradle 560, but will be manually removable therefrom. In alternate embodiments, one or more non-magnetic components may be used to releasably secure the housing 562 to the cradle 560.

As illustrated by example in FIG. 45, the bottom surface 570A of the housing 562 defines a pocket 580 therein in which electrical terminals 582, 584 are positioned. The electrical terminals 582, 584 are configured to align with the electrical terminals 566, 568 respectively such that the electrical terminals 566 electrically connect to the electrical terminals 582, and the electrical terminals 568 electrically connect to the electrical terminals 584, when the housing 562 is coupled to the cradle 560 as described above and illustrated by example in FIG. 43.

Referring specifically to FIG. 44, the housing 562 illustratively includes an elongated bottom case member 570 and an elongated top case member 578 configured to be coupled to one another. Elongated batteries (or other power sources) 572A, 572B are received within the bottom case member 570, and are both electrically connected to an electrical control circuit 574 also received within the bottom case member 570, e.g., between the two batteries 572A, 572B. In one embodiment, the batteries 572A, 572B are rechargeable batteries, and in such embodiments the pocket 580 defined in the bottom surface 570A of the bottom case member 570 includes an electrical connector 586 specifically configured as a recharge port via which the batteries 572A, 572B can be recharged (see FIG. 45). To accomplish this, the housing 562 is detached from the cradle 560, and a suitable charging cable is then connected between the electrical connector 586 and a suitable external power source until the batteries 572A, 572B are recharged to a desired state. In some embodiments, one or more illumination or other indicators may be attached to the housing 562 for displaying the charge state or level of the batteries 572A, 572B. In the illustrated embodiment, the battery 572A supplies electrical power to the illumination device assembly 550 that is coupled to the illumination strip 514, and the battery 572B supplies electrical power to the illumination device assembly 550 that is coupled to the illumination strip 516.

Referring again to FIG. 44, the electrical control circuit 574 illustratively includes the electrical circuits 224A, 224B, 226, 228A, 228B, 230A, 230B, 232 and at least one of the sensors 234, 236 illustrated in FIG. 25 and described above. A sensor lens 576 is affixed to the housing 562 so as to expose the sensor(s) 224, 226 to the environment forward of the power and control module 518. In some alternate embodiments, the electrical control circuit 574 may include more or fewer such circuit components, and in some alternate embodiments the housing 562 may be configured to carry more or fewer batteries 572A, 572B. In some alternate embodiments, either or both of the batteries 572A, 572B may be replaced with one or more alternate sources of rechargeable or non-rechargeable electrical power.

The electrical control circuitry 574 is electrically coupled to the batteries 572A, 572B as generally illustrated in FIG. 25, and is also electrically connected to the electrical terminals 582, 584. As such, the electrical control circuitry 574 electrically connects to the illumination device assemblies 550 coupled to the respective illumination strips 514, 516 via electrical connection between the electrical terminals 566, 568 and the respective electrical terminals 582, 584 when the housing 562 is operatively coupled to the cradle 560.

Referring now to FIGS. 46-48, another embodiment is shown of an illumination kit 602 mountable to a door jamb assembly 604 defined about a doorway opening to provide for a corresponding illuminated door system 600. Referring specifically to FIG. 46, the illumination kit 602 is shown mountable to the jamb assembly 604 about a door 606, and the door 606 is shown operatively mounted to one side of the jamb assembly 604 in a conventional manner. The jamb assembly 604 is illustratively as described above in the various embodiments illustrated in the attached figures, and illustratively includes jambs positioned on opposite sides of the door 606 and secured to corresponding sides of a door frame assembly of the building, and a header coupled to and between top ends of the jambs. In one embodiment, the illumination kit 602 is separate from the door 606 and may be retrofit to an existing door assembly, i.e., a door assembly previously mounted to the jamb assembly 604. In alternate embodiments, the illumination kit 602 may be supplied with a door 606 for mounting together to the jamb assembly 604. In some such embodiments, the illumination kit 602 may be matched, e.g., color-matched and/or style-matched, to the door 606, and in other such embodiments the illumination kit 602 may be colored and/or styled differently than the door 606.

As depicted in FIG. 46, the illumination kit 602 illustratively includes a door casing assembly 608 mountable to the jamb assembly 604 along one side of the door 606, e.g., along a right side of the door 606, another door casing assembly 610 mountable to the jamb assembly 604 along the opposite side of the door 606, e.g., along a left side of the door 606, a header casing assembly 612 mountable to a header of the jamb assembly 604 along a top of the door 606, and a power and control module 618 mounted or mountable the header casing assembly 612. The door casing assemblies 608 and 610 are illustratively identical, or at least similar, to the door casing assemblies 508 and 510 described above, except as noted below. An illumination strip 614 is illustratively mounted to the door casing assembly 608, and an illumination strip 616 is mounted to the door casing assembly 610. The header casing assembly 612 and the power and control module 618 are illustratively identical to the header casing assembly 512 and the power and control module 518 respective, as described above. In the illustrated embodiment, electrical connector cables 620A, 620B are shown electrically connected to the power and control module 618 and each electrically connectable to a respective one of a pair of illumination device assemblies 650A, 650B. Similar or identical cables may be used to connect the power and control module 518 illustrated in FIGS. 38-39 and 43-45 to the illumination device assemblies 550 illustrated in FIG. 42.

As described above with respect to the door casing assemblies 508, 510, the door casing assemblies 608, 610 are each illustratively configured to integrate therein a respective illumination strip 614, 616 and a respective illumination device assembly 650A, 650B operatively coupled thereto, such that illumination produced by the illumination device assemblies 650A, 650B is emitted by the illumination strips 614, 616 in a direction inwardly across the door 606 (toward the opposite illumination strip) and outwardly away from the outer face 606A of the door 606 (as illustrated in FIG. 46).

In the embodiment illustrated in FIG. 46, the illumination strips 614, 616 each illustratively include an elongated housing 622A, 622B mountable within a respective channel 630A, 630B defined in the door casing assembly 608, 610 respectively. Illustratively, the channels 630A, 630B may be identical, or at least similar, to the channels 530 defined in the door casing assemblies 508, 510 illustrated in FIGS. 39-41 and described above. In one embodiment, clips 623 and screws 625 may be used to mount the housings 622A, 622B to the door casing assemblies 608, 610, i.e., in the channels 630A, 630B, although in alternate embodiments any suitable fixation element(s) and/or bonding medium may be used to attach the housings 622A, 622B to the door casing assemblies 608, 610. In any case, an elongated light transmissive cover 624A, 624B is operatively mounted to the housing 622A, 622B so as to transmit therethrough illumination, e.g., light, produced by the respective illumination device assembly 650A, 650. In one embodiment, the housings 622A, 622B may be similar or identical to the housing 196, and the covers 624A, 624B may be similar or identical to the cover 198, all as illustrated in FIG. 21 and described above. In alternate embodiments, the housings 622A, 622B and/or the covers 624A, 624B may be alternatively configured.

As depicted by example in FIGS. 46 and 47, an opening 632A is defined through a top surface 608T of the door casing assembly 608 and extends into the channel 630A in which the illumination strip 614 is mounted, and an opening 632B is defined through a top surface 610T of the door casing assembly 610 and extends into the channel 630B in which the illumination strip 616 is mounted. The openings 632A, 632B are illustratively sized and configured to receive a respective one of the illumination device assemblies 650A, 650B therein such that the illumination device assemblies 650A, 650B operatively couple to a respective one of the illumination strips 614, 616.

Referring specifically now to FIG. 47, the illumination device assemblies 650A, 650B each illustratively include a light pipe 652 having one end extending through the opening 632A, 632B and into a respective one of the illumination strips 614, 616, e.g., into the space between the housing 622A, 622B and the cover 624A, 624B. A housing and heat sink 654 is received on the light pipe 652, e.g., the light pipe 652 extends through a central opening of the housing 654, and a light pipe funnel 656 operatively coupled to an opposite end of the light pipe 652. An LED 658 is operatively coupled to the funnel 656, and another heat sink 660 is positioned over and about the LED 658 such that the heat sink 660 is in thermal contact with the housing/heat sink 654. An electrical connection device 662 is operatively coupled to the LED 658, and includes an electrical connector configured for electrical connection to a matingly-configured electrical connector 627 coupled to an end of the electrical cable 620A, 620B so as to electrically connect the LED 658 to the power and control module 618. A flexible or semi-flexible grommet 664 is positioned over the electrical connection device 622. The entire illumination device assembly 650A, 650B is received within the opening 632A, 632B as illustrated by example in FIGS. 47 and 48.

Radiation, e.g., light, produced by the LED 658 is passed by the funnel 656 into the light pipe 652, and by the light pipe 652 into the illumination strip 614, 616, i.e., into the space between the housing 622A, 622B and the cover 624A, 624B, such that the radiation illuminates the cover 624A, 624B. In some alternate embodiments, the LED 658 may include two or more LEDs. In other alternate embodiments, one or more alternative, conventional illumination sources may be used.

Figure 49:
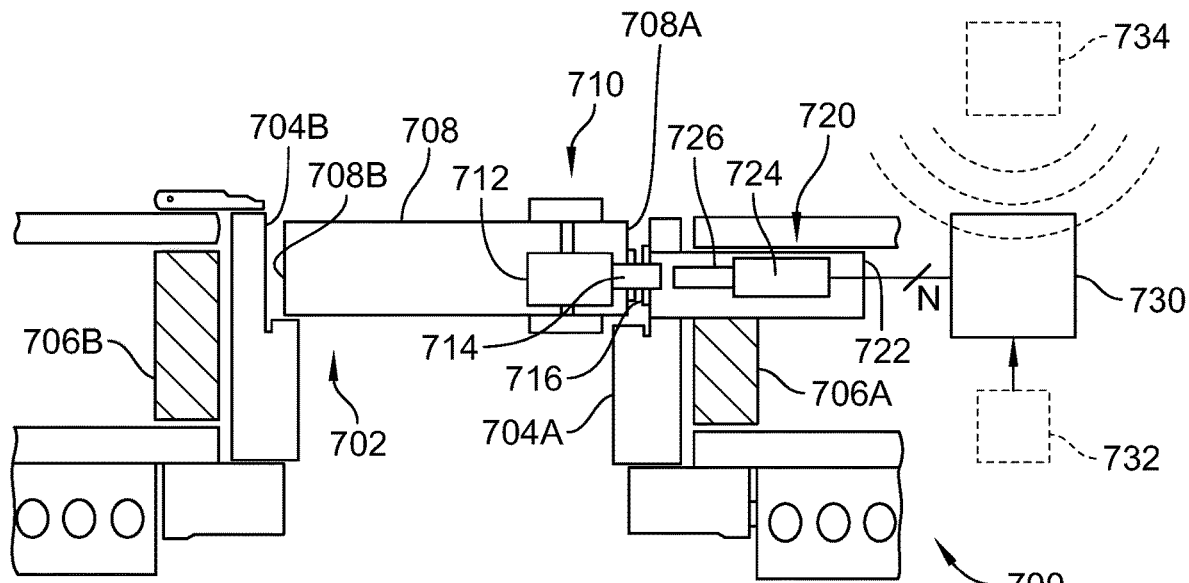
FIG. 49 is a simplified cross-sectional view of a door assembly including an embodiment of an electronically-controlled door unlatching system.
Figure 50:
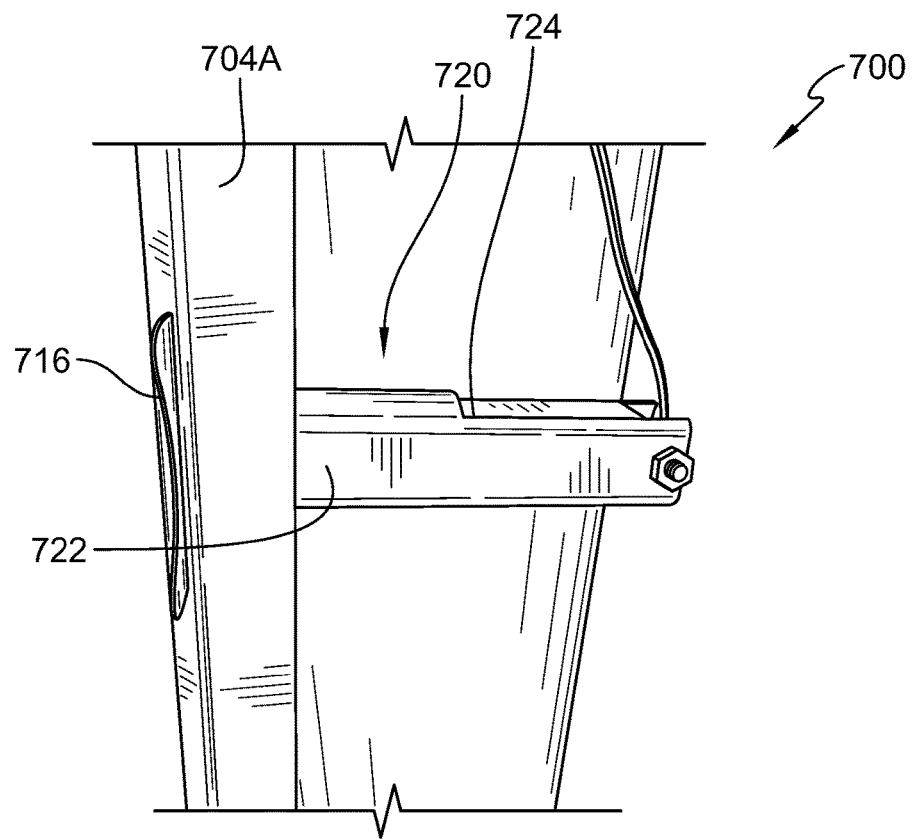
FIG. 50 is a front elevational view of an embodiment of the door unlatching assembly illustrated in schematic form in FIG. 49 and mounted to the latch-side door jamb.

Referring now to FIG. 49, a door assembly is shown which includes an embodiment of an electronically-controlled door unlatching system 700 mounted thereto. The door unlatching system 700 is illustratively configured and operable, as will be described in detail below, to automatically unlatch the door in response to a switch, sensor and/or mobile device-based command to do so such that the door will then be freely pivotable to an open position. In the illustrated embodiment, the door assembly 702 is conventional and includes spaced-apart, vertically-disposed door jambs 704A, 704B secured in a conventional manner to respective frame components 706A, 706B of the building to which the door assembly 702 is mounted. A conventional door 708 is operatively mounted to and between the jambs 704A, 704B with a hinge-side 708B of the door 708 movably mounted to the jamb 704B via a number of conventional hinges (not shown) and with a latch-side 708A positioned adjacent to the jamb 704A when the door is in a closed position as illustrated by example in FIG. 49. The door 708 is movable, e.g., swingable, via the hinges from the closed position illustrated in FIG. 49 to fully open position and any position therebetween. Adjacent to the latch-side 708A of the door 708, a handle set 710 is operatively mounted with a conventional latch control assembly 712 embedded in the door 708 and a conventional latch 714 extending from the latch assembly 712 outwardly through the latch-side 704A of the door 708. Door handles are mounted to opposite faces of the door 708 and are operatively coupled to the latch assembly 712 in a conventional manner. The door handles together or separately operate the latch in a conventional manner between a latched position in which the latch 712 extends fully out of the latch-side 708A of the door 708, through a strike plate 712 mounted to the jamb 704A and into a latch pocket 718 defined in the jamb 704A (e.g., see FIGS. 51 and 52) to thereby couple the latch-side 708A of the door 708 to the jamb 704A, and an unlatched position in which the latch 712 is retracted into the latch-side 708A of the door 708 to thereby decouple the latch-side 708A of the door 708 from the jamb 704A and allow the door 708 to pivot about the hinges.

In the illustrated embodiment, the electronically-controlled door unlatching system 700 includes an electronically-controlled door unlatching assembly 720 having a housing 722 carrying an actuator 724 and an elongated plunger 726. The housing 722 is illustratively mounted to the outwardly-facing surface of the jamb 704A and generally aligned with the strike plate 716 such that the plunger 726 is aligned with the latch pocket 718 and is further illustratively axially aligned with the latch 714 of the handle set 710. Illustratively, the cross-sectional area of the plunger 726 is smaller than that of the cross-sectional area of the latch pocket 718 and of the opening defined through the latch plate 716 such that the plunger 726 may extend axially through the latch pocket 718 and, in some embodiments, also through the opening defined through the latch plate 716. The actuator 724 is illustratively a conventional electrically-controlled linear actuator, and is configured to be responsive to an actuator activation signal to extend the plunger 726 axially into the latch pocket 718 and to an actuator deactivation signal to draw the plunger 726 out of the latch pocket 718. In some embodiments, the actuator 724 may be or include a conventional motor configured to drive the plunger 726 axially inwardly toward and outwardly away from the motor. In some alternate embodiments, the plunger 726 may be magnetic and the actuator 724 may include one or more conventional magnets, and the actuator 724 may be configured to move the one or more magnets (or apply electrical current to, in the case of one or more conventional electromagnets) in a manner which causes the plunger 726 to move as described below under the force of magnetic fields produced by the one or more magnets. In any case, the housing 722 further illustratively carries one or more conventional sources of electrical power, e.g., one or more rechargeable batteries and, in some embodiments, one or more conventional actuator driver circuits. In some embodiments, the source(s) of electrical power may be or include a conventional DC converter circuit hardwired (or hardwireable) to the electrical system of the building in which the system 700 is installed.

The electronically-controlled door latching system 700 further illustratively includes a control circuit 730 electrically connected to the actuator 724 via a number, N, of signal paths, where N may be any positive integer. In some embodiments, the system 700 further includes at least one motion or proximity sensor or user-actuated switch 732 electrically connected to the control circuit 730, as illustrated in FIG. 49 in dashed-line form. Alternatively or additionally, the control circuit 730 may include electrical componentry configured to communicate wirelessly with a mobile device 734 as also illustrated in FIG. 49 in dashed-line form, wherein the mobile device 734 may be any mobile device configured for wireless communications such as, but not limited to, a smart phone or other mobile phone, a key fob or other mobile fob, or the like. The control circuit 730 is conventional, and in some embodiments may include at least one conventional processor and at least one conventional memory device having instructions stored therein that are executable by the processor to control operation of the actuator 724 in accordance with such instructions. In any case, the control circuit 730 is configured to be responsive to signals produced by the sensor/switch 730 and/or to wireless signals received from the mobile device 734 to produce the actuator activation and deactivation signals to control operation of the plunger 726.

Referring now to FIGS. 49-52, the control circuit 730 is configured to be responsive to user-activation of the switch 732, to detection of on object by the motion or proximity sensor 732, and/or to detection of an activation signal wirelessly received from the mobile device 734, to produce an actuator activation signal. The actuator 724 is configured to be responsive to the actuator activation signal produced by the control circuit 730 to extend the plunger 726 axially into and through the latch pocket 718, as illustrated by example in FIG. 52. If the door 708 is in the closed position as illustrated in FIG. 49 and the latch 714 of the latch assembly 712 is extended into the latch pocket 718 defined through the jamb 704A, extension of the plunger 726 by the actuator 724 into and through the latch pocket 718 forces the latch 714 out of the latch pocket 714 and into the latch assembly 712, such that the door 708 is then no longer coupled to the jamb 704A and is freely pivotable about the hinges to an open position. The tip or free end of the plunger 726 need only extend into the latch pocket 718 a distance which will force the latch 714 out of the latch pocket 718 sufficiently to disengage from the latch pocket 718 and the strike plate 716. In some embodiments, this will require the plunger 726 to extend to, but not through, the opening defined through the strike plate 716, and in other embodiments will require the plunger 726 to extend through the latch pocket 718 and at least partially through the opening defined through the strike plate 716. In some embodiments, the handle set 710 may be configured such that the latch 714 is extendable into and out of the latch assembly 712 whether the latch assembly 712 is in a locked or an unlocked state. In such embodiments, the door 708 may be automatically and simultaneously unlocked and unlatched by the control circuit 730 in response to a command signal to do so received from the switch/sensor 732 and/or from the mobile device 734 as described above. In other embodiments, the handle set 710 may be configured such that the latch 714 is extendable into and out of the latch assembly 712 only when the latch assembly 712 is in the unlocked state, and in such embodiments the latch assembly 712 must be unlocked before it may be automatically unlatched as just described.

Figure 51:
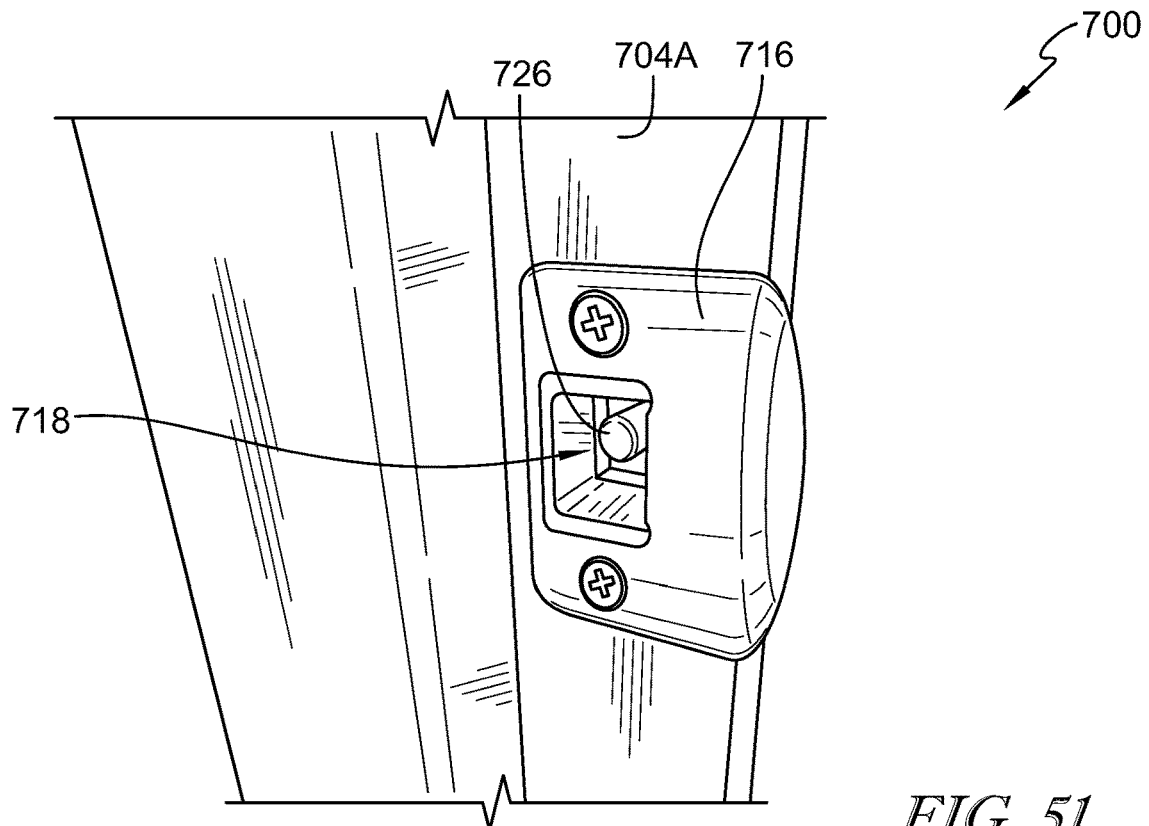
FIG. 51 is a side elevational view of the strike plate of the handle set shown in FIG. 49 illustrating the plunger of the door unlatching assembly recessed within the latch pocket of the latch-side door jamb.

The actuator 724 is further configured to be responsive to the actuator deactivation signal produced by the control circuit 730 to draw the plunger 726 axially out of the latch pocket 718, as illustrated by example in FIG. 51. If the door 708 is in the closed position as illustrated in FIG. 49, the latch 714, which is typically biased outwardly, will then extend into the latch pocket 714 to couple the door 708 to the jamb 704A. If the door 708 is in an open position, this will effectively clear the latch pocket 718 so that the latch 714 will extend therein when the door 708 is thereafter pivoted to the closed position. The tip or free end of the plunger 726 need only be drawn out the latch pocket 718 a distance which will allow the latch 714 to fully extend into the latch pocket 718 with the door 708 in the closed position. In some embodiments, this will require the plunger 726 to be drawn completely out of the latch pocket 718, and in other embodiments will require the plunger 726 to be only partially drawn out of the latch pocket 718. In one embodiment, the deactivation signal is illustratively produced by the control circuit 730 automatically after a predetermined time period has elapsed since the plunger 726 has been fully extended into the latch pocket 718 or since the command signal to activate the plunger 726 was received from the switch/sensor 732 and/or from the mobile device 734. In alternate embodiments, the deactivation signal may be produced by the control circuit 730 in response to a command signal to do so produced by the switch/sensor 732 and/or by the mobile device 734 in response to user (or object) interaction.

Figure 52:
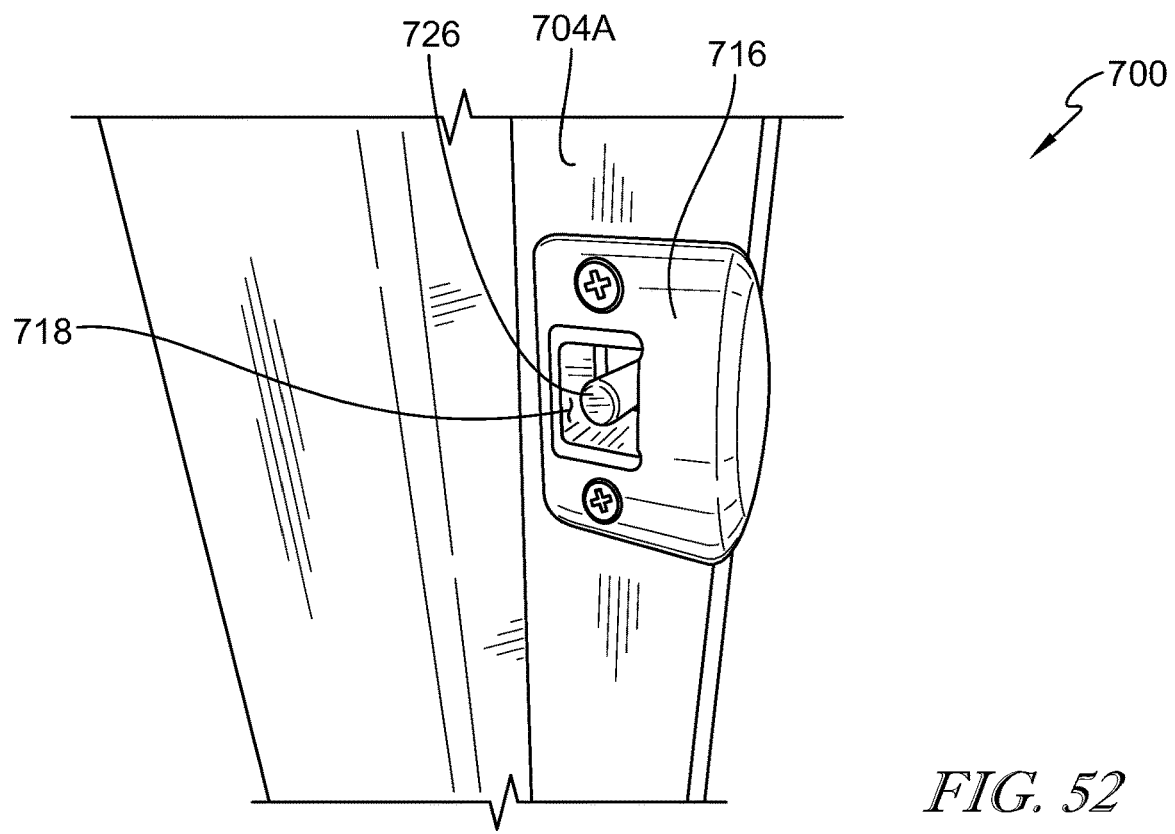
FIG. 52 is a side elevational view similar to FIG. 51 and illustrating the plunger of the door unlatching assembly extending from the latch pocket of the latch-side door jamb to displace the latch of the latch assembly to an unlatched position.
Figure 53:
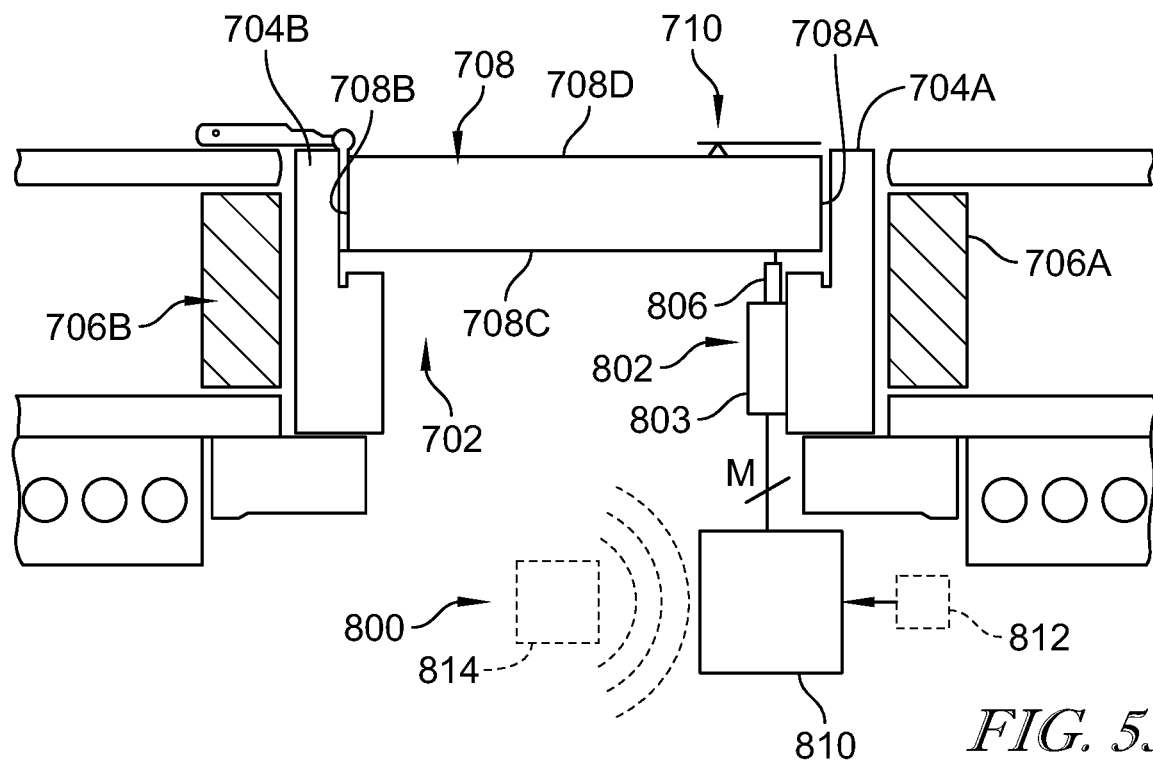
FIG. 53 is a simplified cross-sectional view of a door assembly including an embodiment of an electronically-controlled door opening system.

Referring now to FIG. 53, a door assembly is shown which includes an embodiment of an electronically-controlled door opening system 800 mounted thereto. The door opening system 800 is illustratively configured and operable, as will be described in detail below, to automatically force an unlatched door to an open position in response to a switch, sensor and/or mobile device-based command to do so. In the illustrated embodiment, the door assembly 702 is as described above with respect to FIG. 49, and like numbers are used to identify like components. The door 708 has opposite surfaces 708C and 708D, wherein the surface 708C is depicted in FIG. 52 and the surface facing the interior of the building to which the door 708 is mounted and the surface 708D faces the exterior of the building, and the door 708 is configured such that the door 708 opens, i.e., pivots about the hinges, outwardly toward the exterior of the building. In alternate embodiments, the door 708 may be configured and mounted such that the door 708 opens inwardly toward the interior of the building.

Figure 54:
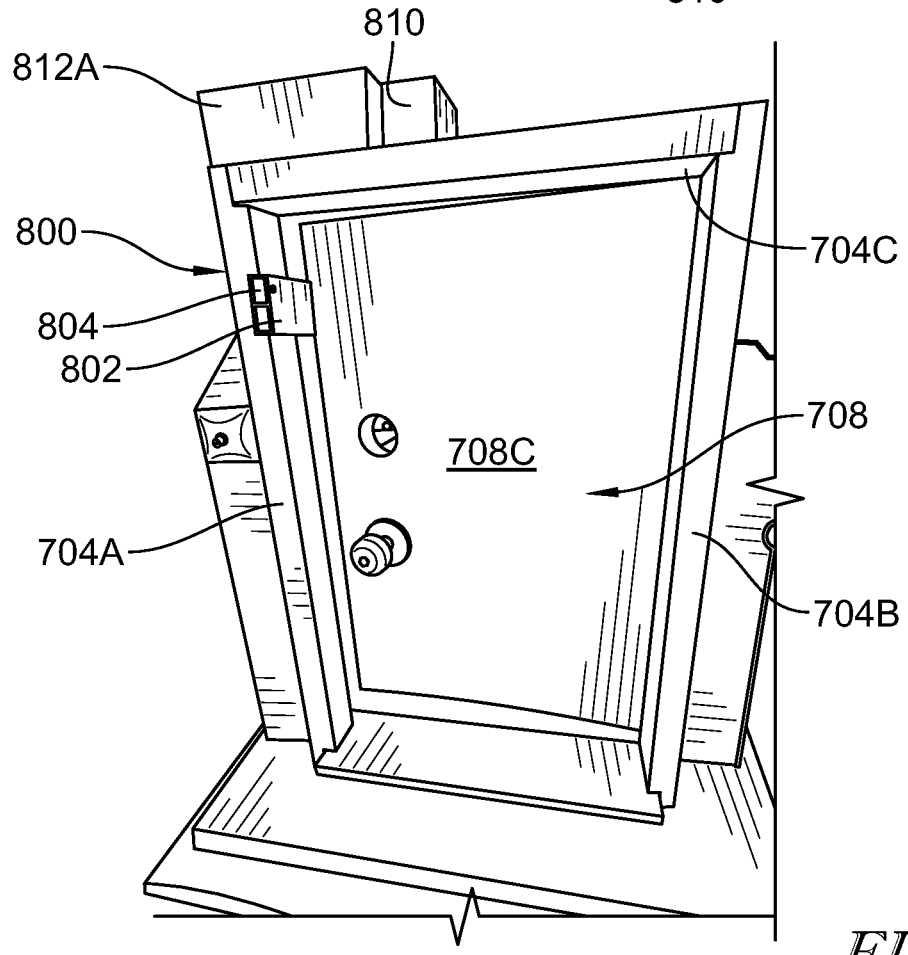
FIG. 54 is a front elevational view of an embodiment of the electronically-controlled door opening assembly illustrated in schematic form in FIG. 49 and mounted to the latch-side door jamb.

In the illustrated embodiment, the electronically-controlled door opening system 800 includes an electronically-controlled door opening assembly 802 having a housing 803 carrying an actuator 804 and an elongated plunger 806. The housing 803 is illustratively mounted to the inwardly-facing surface of the jamb 704A such that the free end of the plunger 806 faces the surface 708C of the door 708 adjacent to the jamb 704A and spaced apart from or adjacent to the head jamb 704C (see, e.g., FIG. 54). Alternatively, the housing 803 may be mounted facing the surface 708C of the door 708 anywhere along the jamb 704A, the jamb 704B or the head jamb 704C. It will be understood that in alternate embodiments in which the door 708 is configured and mounted so as to be inwardly opening, the housing 803 will be mounted to the jamb 704A, 704B or 704C such that the free end of the plunger 806 faces the surface 708D of the door 708. In any case, the actuator 804 and the plunger 806 are arranged and mounted within the housing 803 such that the plunger 806 may extend axially toward and away from the face 708C of the door 708. The actuator 804 is illustratively a conventional electrically-controlled linear actuator, and is configured to be responsive to an actuator activation signal to extend the plunger 806 axially away from the housing 803 and toward and into contact with the surface 708C of the door 708, and to an actuator deactivation signal to draw the plunger 806 away from the surface 708C of the door 708 and back toward the housing 803. In some embodiments, the actuator 804 may be or include a conventional motor configured to drive the plunger 806 axially inwardly toward and outwardly away from the motor. In some alternate embodiments, the actuator 804 may be or include a conventional solenoid or other actuator configured to drive the plunger 806. In any case, the housing 803 further illustratively carries one or more conventional sources of electrical power, e.g., one or more rechargeable batteries and, in some embodiments, one or more conventional actuator driver circuits. In some embodiments, the source(s) of electrical power may be or include a conventional DC converter circuit hardwired (or hardwire-able) to the electrical system of the building in which the system 800 is installed.

In order to force or "kick" the unlatched door 708 to an open position, the actuated plunger 804 will apply a force to the surface 708C of the door 708. In one example embodiment, the actuator 804 and plunger 806, and in some embodiments the one or more actuator driver circuits, are illustratively configured, using a 12-volt power source, to apply, when actuated, a maximum of 30 lbf of force to the door 708 to open the door 708 approximately six inches from the closed position, although it will be understood that in alternate embodiments such components may be configured to apply a maximum force of more or less than 30 lbf using a 12-volt power source or using a power source producing more or less than 12 volts to open the door 6 inches or other lesser or greater distance from the closed position.

The electronically-controlled door opening system 800 further illustratively includes a control circuit 810 electrically connected to the actuator 804 via a number, M, of signal paths, where M may be any positive integer. In some embodiments, the system 800 further includes at least one motion or proximity sensor or user-actuated switch 812 electrically connected to the control circuit 810, as illustrated in FIG. 53 in dashed-line form. Alternatively or additionally, the control circuit 810 may include electrical componentry configured to communicate wirelessly with a mobile device 814 as also illustrated in FIG. 53 in dashed-line form, wherein the mobile device 814 may be any mobile device configured for wireless communications such as, but not limited to, a smart phone or other mobile phone, a key fob or other mobile fob, or the like. The control circuit 810 is conventional, and in some embodiments may include at least one conventional processor and at least one conventional memory device having instructions stored therein that are executable by the processor to control operation of the actuator 804 in accordance with such instructions. In any case, the control circuit 810 is configured to be responsive to signals produced by the sensor/switch 812 and/or to wireless signals received from the mobile device 814 to produce the actuator activation and deactivation signals to control operation of the plunger 806.

Referring now to FIGS. 53-56, the control circuit 810 is configured to be responsive to user-activation of the switch 812, to detection of on object by the motion or proximity sensor 812, and/or to detection of an activation signal wirelessly received from the mobile device 814, to produce an actuator activation signal. The actuator 804 is configured to be responsive to the actuator activation signal produced by the control circuit 810 to extend the plunger 806 axially away from the housing 803 and into the surface 708C of the door, as illustrated by example in FIG. 56. If the door 708 is in the closed position and unlatched as illustrated in FIG. 53, extension of the plunger 806 by the actuator 804 away from the housing 803 and into the surface 708C of the door 708 forces or "kicks" the door 708 from the closed and unlatched position, as illustrated by example in FIG. 53, to an open position as illustrated by example in FIG. 54. The tip or free end of the plunger 806 need only extend from the housing 803 a distance which will force the door 708 open sufficiently to allow a person entering the building to force door 708 more fully open, e.g., with an arm, shoulder or hand, etc., in order to gain entrance into the building. In some embodiments, this distance is approximately six inches as described by example above, although in alternate embodiments this distance may be more or less than six inches.

Figure 55:
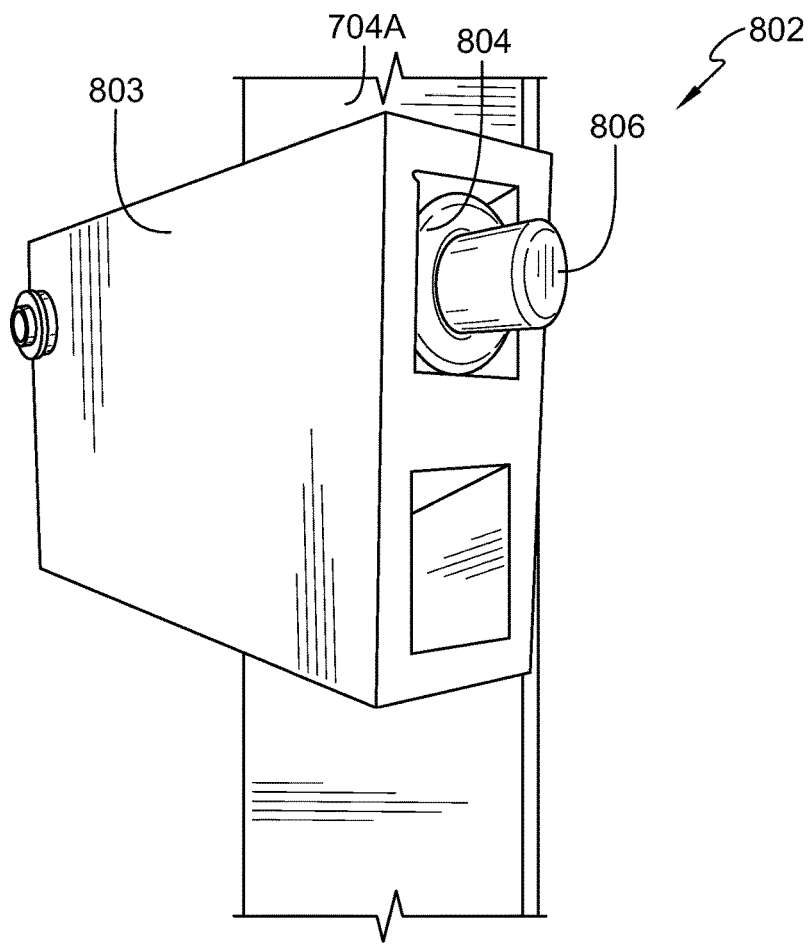
FIG. 55 is a perspective view of the door opening assembly of FIG. 54 in its unactuated state.
Figure 56:
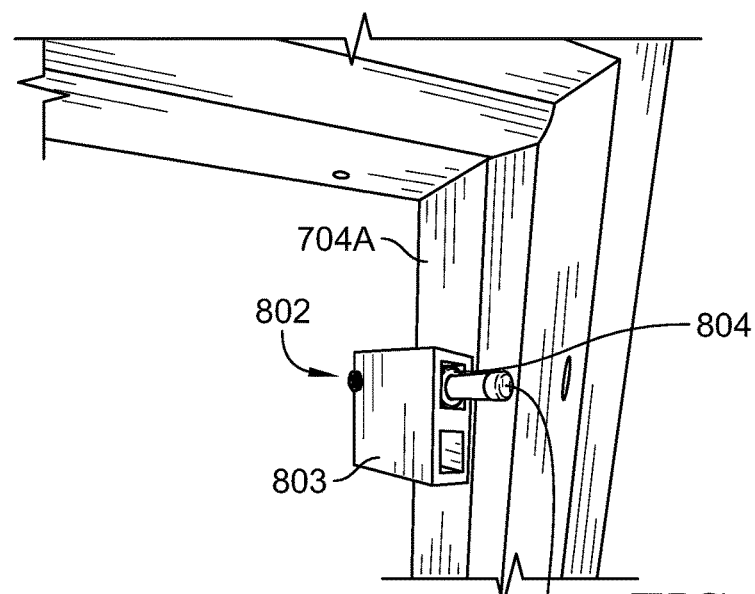
FIG. 56 is a perspective view of the door opening assembly of FIGS. 54 and 55 in its actuated state to force open the door.
Figure 57:
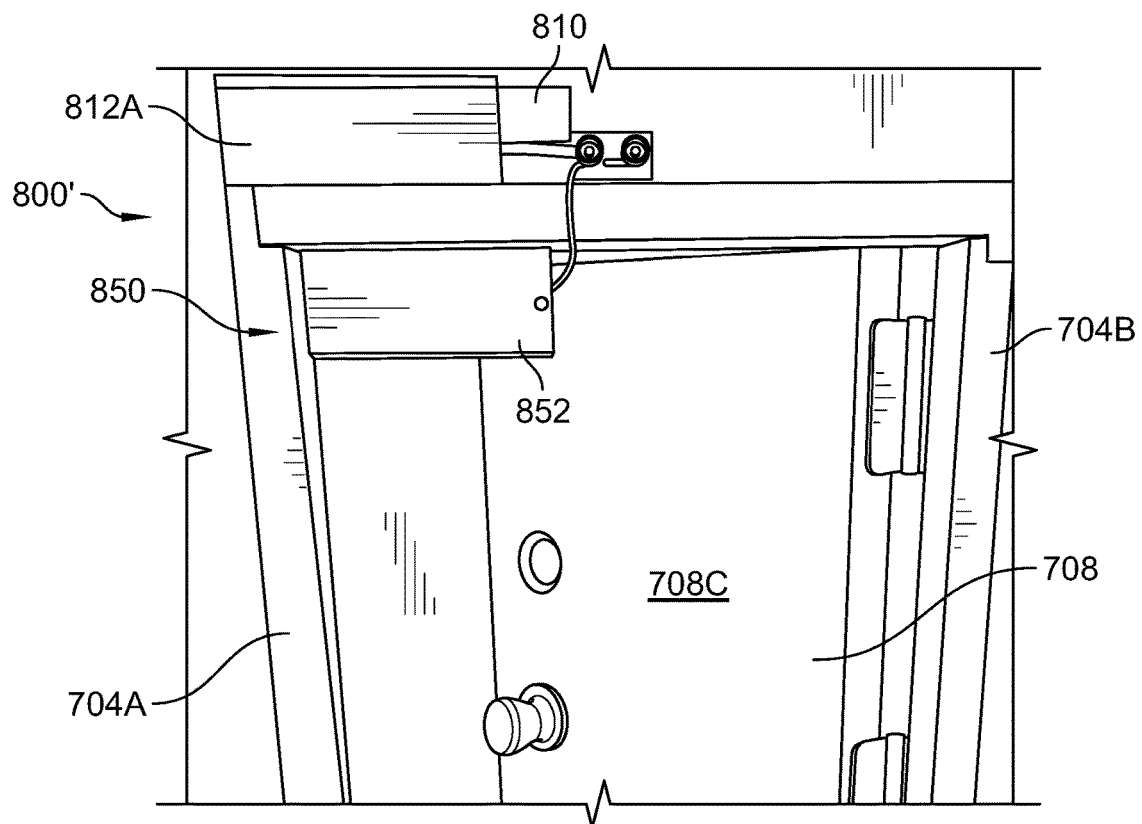
FIG. 57 is a front elevational view of an alternate embodiment of an electronically-controlled door opening system for the door assembly of FIG. 57 including an electronically-controlled magnet assembly mounted to the top plate of the door jamb assembly.
Figure 58:
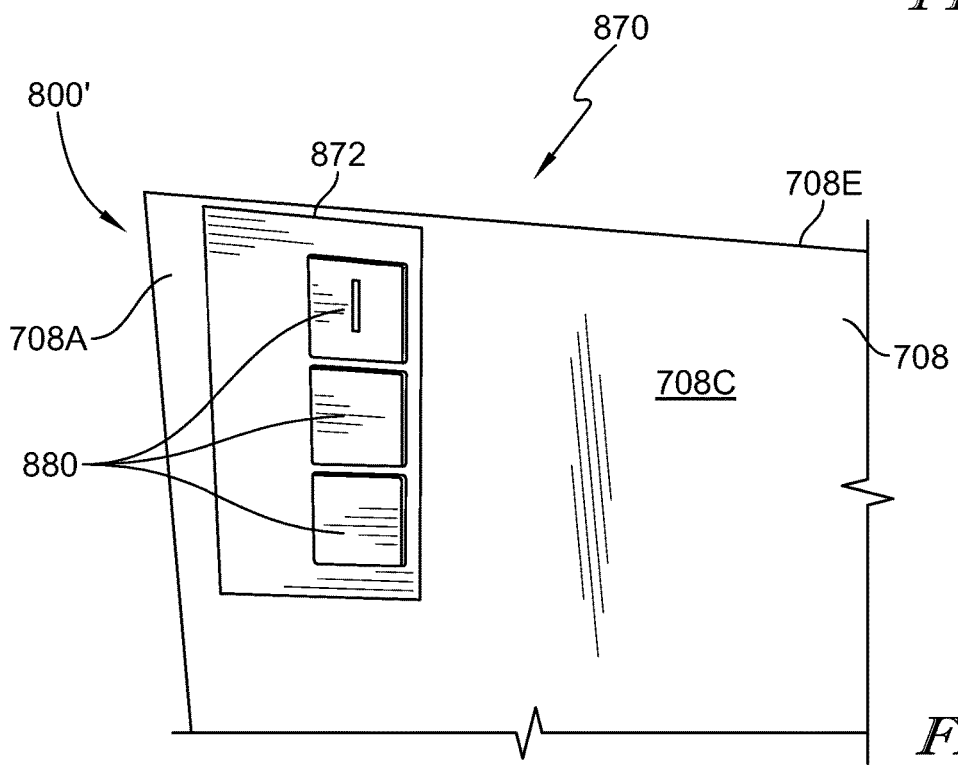
FIG. 58 is a front elevational view of a stationary magnet assembly mounted to the door and forming part of the door opening system illustrated in FIG. 57.
Figure 59A:
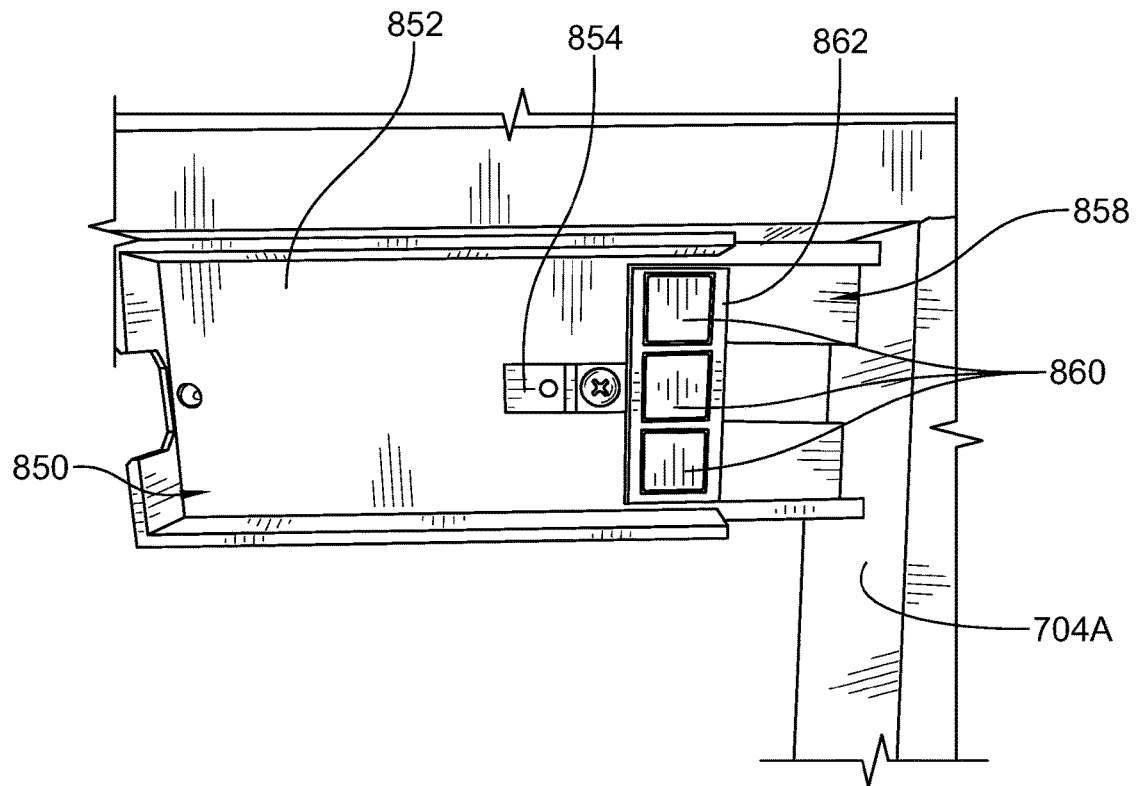
FIG. 59A is a front elevational view of the electronically-controlled magnet assembly of FIG. 57 shown in an unactuated state.
Figure 59B:
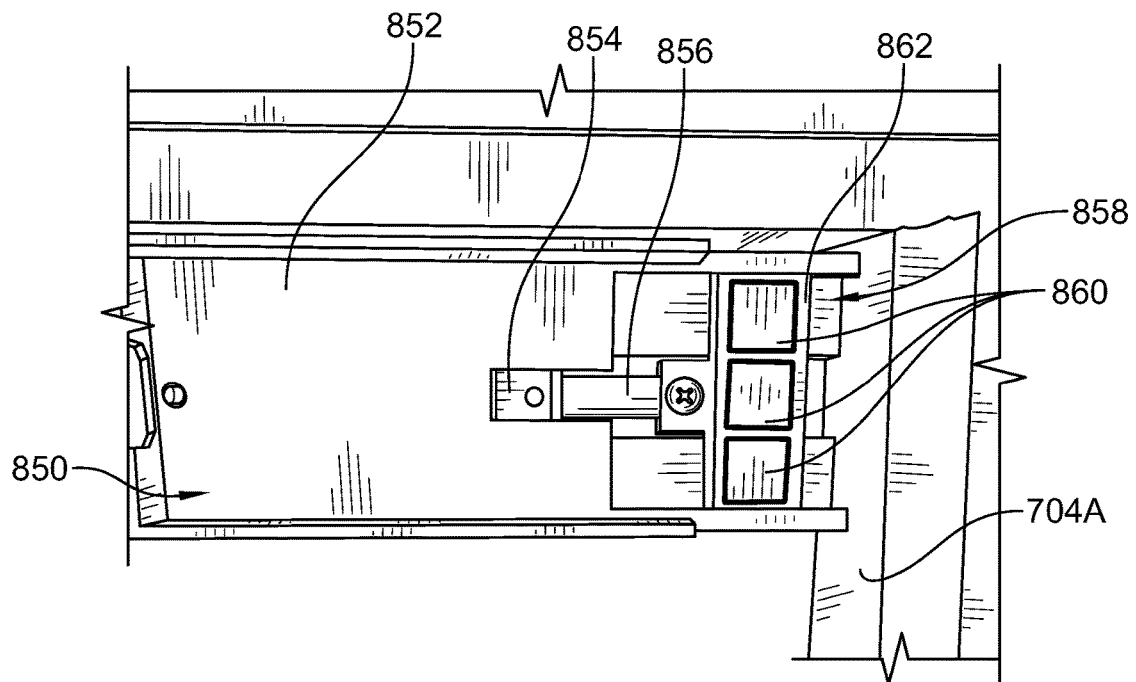
FIG. 59B is a front elevational view similar to FIG. 59A and showing the electronically-controlled magnet assembly in an actuated state to force open the door.

The actuator 804 is further configured to be responsive to the actuator deactivation signal produced by the control circuit 810 to draw the plunger 806 axially away from the surface 708C of the door 708 and back toward and into the housing 803, as illustrated by example in FIG. 55. The tip or free end of the plunger 806 need only be drawn away from the surface 708C of the door 708 and back into the housing 803 718 a distance which will allow the door 708 to be moved, i.e., pivoted about the hinges, to the closed position so that the latch assembly 712 can then couple the side 708A of the door 708 to the jamb 702A as described above. In some embodiments, this will require the plunger 806 to be drawn sufficiently into the housing 803 such that the free end of the plunger 806 will not be in contact with the surface 708C of the door 708 when the door 708 is moved to the closed position, and in other embodiments may require the plunger 806 to be drawn only sufficiently into the housing 803 such that the free end of the plunger 806 may be in contact with the surface 708C of the door 708 when the door 708 is moved to the closed position but not impede or prevent the door 708 from being moved to the closed position. In one embodiment, the deactivation signal is illustratively produced by the control circuit 810 automatically after a predetermined time period has elapsed since the plunger 806 has been fully extended or since the command signal to activate the plunger 806 was received from the switch/sensor 812 and/or from the mobile device 814. In alternate embodiments, the deactivation signal may be produced by the control circuit 810 in response to a command signal to do so produced by the switch/sensor 812 and/or by the mobile device 814 in response to user (or object) interaction.

In some embodiments, the systems 700 and 800 may be combined so as to include both electrically-controlled door unlatching and opening features. In such embodiments, control of these features may be shared such that only one control circuit 730, 810 and one switch/sensor 730, 812 are needed. In some alternative embodiments, the system 700 may be implemented without the system 800 or vice versa. In other alternative embodiments, the system 700 may be used in conjunction with any of the electrically-controlled door opening features described above with respect to FIGS. 31A-32. In still other alternative embodiments, the system 800 may be used in conjunction with any of the electrically-controlled door unlatching features described above with respect to FIGS. 26-30C and 33A-33D. In still further embodiments, either or both of the systems 700, 800 may be implemented with any of the illumination systems described above with respect to FIGS. 16-25 and 38-48 and described above, and in any such embodiments control of the various features may be shared such that only one control circuit, one switch/sensor or one set of switches/sensors and one power source (or power sources) are needed. In either system 700 or 800, or combination of systems including the system 700 and/or 800, the switch 732, 812, in embodiments which include it, may be implemented in the form of the actuator 314' described above 34-37.

Referring now to FIGS. 57-59B an alternative embodiment of the electronically-controlled door opening system 800' is shown in which the system 800' is structurally identical or similar to the system 800 with the exception that in the system 800' an alternate embodiment of an electronically-controlled door opening assembly 850 replaces the electronically-controlled door opening assembly 802 of the system 800. In the alternate embodiment illustrated in FIGS. 57-59B, the electronically-controlled door opening assembly 850 includes a housing 852 carrying an actuator 854 coupled to one end of an elongated plunger 856, and a magnet assembly 858 coupled to an opposite end of the plunger 856. The magnet assembly 858 is configured to carry one or more permanent magnets 860, and in the illustrated embodiment the magnet assembly 858 is configured to carry three separate magnets 860 mounted in a magnet housing 862 and vertically aligned with one another within the magnet housing 862. The door opening assembly housing 852 is illustratively mounted to the inwardly-facing surface of the head jamb 704C such that the exposed faces of the magnets 860 face the surface 708C of the door 708 adjacent to the jamb 704A (see, e.g., FIGS. 57 and 59A-59B). Alternatively, the housing 852 may be mounted facing the surface 708C of the door 708 anywhere along the jamb 704A, the jamb 704B or the head jamb 704C. It will be understood that in alternate embodiments in which the door 708 is configured and mounted so as to be inwardly opening, the housing 803 will be mounted to the jamb 704A, 704B or 704C such that the exposed faces of the magnets 860 face the surface 708D of the door 708. In any case, the actuator 854, plunger 856 and magnet assembly 858 are arranged and mounted within the housing 852 such that the plunger 856, and the magnet assembly 858 coupled thereto, are movable by the actuator 854 laterally within the housing 852 between a first position spaced apart from the jamb 708A as illustrated by example in FIG. 59A, and a second position adjacent to the jamb 708A as illustrated by example in FIG. 59B.

The actuator 854 is illustratively a conventional electrically-controlled linear actuator, and is configured to be responsive to an actuator activation signal to extend the plunger 856 and the magnet assembly 858 axially away from the actuator 854 and laterally toward the jamb 704A, and to an actuator deactivation signal to draw the plunger 856 and the magnet assembly 858 laterally away from the jamb 704A and back toward the housing 852. In some embodiments, the actuator 854 may be or include a conventional motor configured to drive the plunger 856 axially inwardly toward and outwardly away from the motor. In some alternate embodiments, the actuator 854 may be or include a conventional solenoid or other actuator configured to drive the plunger 856. In any case, the housing 852 further illustratively carries one or more conventional sources of electrical power, e.g., one or more rechargeable batteries and, in some embodiments, one or more conventional actuator driver circuits. In some embodiments, the source(s) of electrical power may be or include a conventional DC converter circuit hardwired (or hardwire-able) to the electrical system of the building in which the system 800' is installed.

The electronically-controlled door opening assembly 850 includes another magnet assembly 870 coupled to the face 708C of the door 708 generally opposite the housing 852. The magnet assembly 870 is configured to carry one or more magnets 880, and in the illustrated embodiment the magnet assembly 870 is configured to carry three separate magnets 880 mounted in a magnet housing 872 and vertically aligned with one another within the magnet housing 872. The magnet housing 872 is illustratively affixed to the face 708C of the door 708 adjacent to the side 780A and the top 708E of the door such that the magnets 880 each align with, e.g., are juxtaposed with, respective ones of the magnets 860 in the second position of the magnet assembly 858 (illustrated by example in FIG. 59B) when the door 708 is in the closed position. In the first position of the magnet assembly 858, illustrated by example in FIG. 59A, the magnets 860 and 880 are laterally offset from one another such that no portion of the faces of the magnets 860 and 880 align with one another when the door 708 is in the closed position.

In the illustrated embodiment, the polarities of the magnets 860 and 880 are all the same, e.g., all North (+ polarity) or all South (− polarity). With the door 708 in the closed and unlatched position, and with the magnet assembly 858 in the first position, i.e., such that the magnets 860 and 880 are laterally spaced apart from one another, the magnetic fields produced by the magnets 860 and 880 have little or no effect on each other and the door 708 remains in the closed position. Conversely, with the door 708 in the closed and unlatched position, and with the magnet assembly 858 in the second position, i.e., such that the magnets 860 and 880 are axially aligned with one another, the magnetic fields produced by the same-polarity magnets 860 and 880 repel one another with a force that pushes the door 708 to an open position. In one embodiment, the number of magnets 860 and 880 and the strengths of the magnetic fields produced by the magnets 860 and 800 are selected such that the door 708 is forced by the repulsive magnetic fields from the closed position to an open position of approximately six inches when the actuator 854 is controlled to move the magnet assembly 858 from the first to the second position, although it will be understood that in alternate embodiments the number of magnets 860 and 880 and the strengths of the magnetic fields produced by the magnets 860 and 800 may be selected such that the door 708 is forced by the repulsive magnetic fields to an open position that is greater or less than six inches from the closed position.

As described above with respect to FIGS. 53-56, the control circuit 810 is configured to be responsive to user-activation of the switch 812, to detection of on object by the motion or proximity sensor 812, and/or to detection of an activation signal wirelessly received from the mobile device 814, to produce an actuator activation signal. The actuator 854 is configured to be responsive to the actuator activation signal produced by the control circuit 810 to extend the plunger 856 axially away from the actuator 854 to move the magnet assembly 858 from the first position to the second position. If the door 708 is in the closed position and unlatched as illustrated in FIG. 53, such extension of the plunger 856 by the actuator 854 away from the actuator 854 moves the magnet assembly 858 into alignment with the magnet assembly 870 such that the repulsive magnetic fields produced by the aligned magnets 860 and 880 force or "kick" the door 708 from the closed and unlatched position, as illustrated by example in FIG. 53, to an open position as illustrated by example in FIG. 57.

The actuator 854 is further configured to be responsive to the actuator deactivation signal produced by the control circuit 810 to draw the plunger 856 axially toward the actuator 854 to thereby move the magnet assembly 858 from the second position to the first position and therefore laterally spaced from the magnet assembly 870. With the magnet assembly 858 laterally spaced from the magnet assembly 870, the magnets 860 and 880 will not align with one another when the door 708 is returned to the closed position, and the magnetic fields produced by the magnets 860 and 880 will have little or no effect on one another so that the door 708 will remain in the closed position. In one embodiment, the deactivation signal is illustratively produced by the control circuit 810 automatically after a predetermined time period has elapsed since the plunger 856 has moved the magnet assembly 858 from the first to the second position thereof or since the command signal to activate the plunger 856 was received from the switch/sensor 812 and/or from the mobile device 814. In alternate embodiments, the deactivation signal may be produced by the control circuit 810 in response to a command signal to do so produced by the switch/sensor 812 and/or by the mobile device 814 in response to user (or object) interaction.

Referring now to FIG. 60, an alternate embodiment of the magnet assemblies 858' and 870' are shown in which the magnets 860 are replaced with a conventional electromagnet 860' and in which the magnets 880 are likewise replaced with a single permanent magnet. In this alternate embodiment, the it will be understood that the magnet housing 862, illustrated by example in FIGS. 59A, 59B, will be modified to accommodate and carry the single electromagnet 860' and the magnet housing 872, illustrated by example in FIG. 58, will be modified to accommodate and carry the single permanent magnet 880. It will be further understood that the single electromagnet 860' may be alternatively implemented in the form of two or more electromagnets, and that the single permanent magnet 880 may likewise be alternatively implemented in the form of a matching number of two or more permanent magnets. In the illustrated embodiment, the permanent magnet 880 may be either polarity, i.e., North (+ polarity) as illustrated in FIG. 60, or South (− polarity) as illustrated parenthetically in FIG. 60, and the polarity of the voltage applied to the electromagnet 860' may then by selected to cause the electromagnet 860' to have a North (+) or South (−) polarity.

In the embodiment illustrated in FIG. 60, the actuator 854 and plunger 856 are omitted, and the control circuit 810 is electrically coupled, either directly or via one or more conventional driver circuits, to the electromagnet 860'. In one implementation, the deactivation signal produced by the control circuit 810 is the "0" signal which de-energizes the electromagnet so as not to produce any magnetic field. In the deactivated state, the magnetic field produced by the permanent magnet 880 will attract the de-energized electromagnet, which will typically be formed of a paramagnetic material, such that, as the door 708 is being moved to the closed position, the magnetic attraction between the de-energized electromagnet 860' and the permanent magnet 880 will act to draw the door 708 toward and to the closed position, thereby ensuring that the door 708 will not be inadvertently left open, and will further act to maintain the door 708 in the closed position. In an alternate implementation, the deactivation signal produced by the control circuit 810 is the "−" or "+" signal which energizes the electromagnet to produce a magnetic field opposite in polarity to the magnetic field produced by the permanent magnet 880. In this case, the attractive magnetic fields produced by the electromagnet 860' (shown by single-headed, dashed-line arrows in FIG. 60) and the permanent magnet 880 will further act to draw the door 708 toward and to the closed position, thereby ensuring that the door 708 will not be inadvertently left open, and will further act to maintain the door 708 in the closed position. In any case, the activation signal produced by the control circuit 810 will be either "+" or "−" depending upon the polarity of the permanent magnet 880 such that, when energized, the electromagnet 860' has the same polarity as the permanent magnet 880. Thus, with the door 708 in the unlatched state as described above, the activation signal produced by the control circuit 810 and applied to the electromagnet 860' causes the electromagnet 860' to produce a magnetic field which repels the magnetic field produced by the permanent magnet 880 (as shown by the double-headed arrows in FIG. 60), thereby forcing the door 708 to an open position as described above.

Referring now to FIGS. 61A and 61B, another alternate embodiment of the magnet assemblies 858" and 870" are shown in which the magnets 860 are replaced with a number of horizontally-disposed, alternating polarity permanent magnets 860, and in which the magnets 880 are likewise replaced with a number of horizontally-disposed, alternating polarity permanent magnets 880. In this alternate embodiment, the it will be understood that the magnet housing 862, illustrated by example in FIGS. 59A, 59B, will be modified to accommodate and carry the multiple, horizontally-disposed magnets 860 and the magnet housing 872, illustrated by example in FIG. 58, will likewise be modified to accommodate and carry the multiple, horizontally-disposed magnets 880. It will be further understood that the magnet assembly 858" may alternatively include more or fewer magnets than the four shown, and that the magnet assembly 870" may likewise include more or fewer magnets than the four shown. In the illustrated embodiment, the four magnets 860 are arranged, from left-to-right, with alternating polarities −, +, −, +, and the four magnets 880 are likewise arranged, from left-to-right, with alternating polarities −, +, −, +, although in alternate embodiments, the magnets 860 and 880 may be arranges with alternating polarities +, −, +, −. In any case, the plunger 856 is, in the illustrated embodiment, coupled to the left end (or right end) of the magnet assembly 858", and the magnet assembly 870" is fixed to the face 708C of the door 708 as described above.

With the plunger 856 coupled to the left side of the magnet assembly 858", as viewed in FIGS. 61A and 61B, the first position of the magnet assembly 858" relative to the magnet assembly 870" is that illustrated in FIG. 61A in which three of the magnets 860 and three of the magnets 880 are aligned with one another, and each aligned pair of the magnets 860, 880 are opposite in magnetic polarity. The second position of the magnet assembly 858" relative to the magnet assembly 870" is that illustrated in FIG. 61B in which all four of the magnets 860 are aligned with respective ones of the four magnets 880, and each aligned pair of the magnets 860, 880 have the same magnetic polarity.

The actuator 854 is configured to be responsive to the actuator activation signal produced by the control circuit 810 to extend the plunger 856 axially away from the actuator 854 to move the magnet assembly 858" from the first position illustrated in FIG. 61A to the second position illustrated in FIG. 61B. If the door 708 is in the closed position and unlatched as illustrated in FIG. 53, such extension of the plunger 856 by the actuator 854 away from the actuator 854 moves the magnet assembly 858" into alignment with the magnet assembly 870" such that the repulsive magnetic fields produced by the aligned magnets 860 and 880 (shown by double-headed arrows in FIG. 61B) force or "kick" the door 708 from the closed and unlatched position, as illustrated by example in FIG. 53, to an open position as illustrated by example in FIG. 57. The actuator 854 is further configured to be responsive to the actuator deactivation signal produced by the control circuit 810 to draw the plunger 856 axially toward the actuator 854 to thereby move the magnet assembly 858" from the second position illustrated in FIG. 61B to the first position illustrated in FIG. 61A such that the attractive magnetic fields produced by the three aligned magnets 860 and 880 (shown by single-headed arrows in FIG. 61A) will act to draw the door 708 toward and to the closed position, thereby ensuring that the door 708 will not be inadvertently left open, and will further act to maintain the door 708 in the closed position.

Referring now to FIGS. 62A and 62B, another alternate embodiment of the magnet assemblies 858''' and 870''' are shown in which the linear magnet housing 862 is replaced with a circular (or other shape) magnet housing 862' and in which a number of magnets 860 are radially-disposed with alternating magnetic polarity about one face of the circular housing 862'. The linear magnet housing 872 is likewise replaced with a circular (or other shape) magnet housing 872', and a number of magnets 880 are radially-disposed with alternating magnetic polarity about one face of the circular housing 872'. Although the views illustrated in FIGS. 62A, 62B, show the magnet housings 862' and 872' offset from one another, this is done only for ease of illustration, it being understood that with the door 708 in the closed position illustrated by example in FIG. 53, the exposed faces of the housings 862' and 872' (i.e., facing toward each other) will be juxtaposed with one another. It will be further understood that the magnet assembly 858''' may alternatively include more or fewer magnets than the four shown, and that the magnet assembly 870''' may likewise include more or fewer magnets than the four shown. In the illustrated embodiment, the four magnets 860 are arranged, clockwise and starting with the top left magnet in FIG. 62A, with alternating polarities +, −, +, −, and the four magnets 880 are likewise arranged, clockwise and starting with the top left magnet in FIG. 62A, with alternating polarities −, +, −, +, although in alternate embodiments, the magnets 860 may be arranged with alternating polarities −, +, −, + and the magnets 880 may be arranged with alternating polarities +, −, +, −.

In the embodiment illustrated in FIGS. 62A and 62B, the plunger 856 is coupled to a center point 864 of the magnet housing 862', and the actuator 854 is a rotational actuator, e.g., such as a motor or the like, configured to rotationally drive the magnet housing 862' about a rotational axis defined by and through the center point 864 of the housing 862' (as depicted by the arcuate, double-headed arrow "R" in FIG. 62B). The magnet housing 862', in contrast, is fixed to the face 708C of the door 708. The first position of the magnet assembly 858''' relative to the magnet assembly 870''' is that illustrated in FIG. 62A in which the four aligned magnet pairs 860 and 880 all have opposite magnetic polarity. The second position of the magnet assembly 858''' relative to the magnet assembly 870''' is that illustrated in FIG. 62B in which the four aligned magnet pairs 860 and 880 all have the same magnetic polarity.

In the illustrated embodiment, the actuator 854 is configured to be responsive to the actuator activation signal produced by the control circuit 810 to rotate the plunger 856 clockwise to rotate the magnet assembly 858''' from the first position illustrated in FIG. 62A to the second position illustrated in FIG. 62B. If the door 708 is in the closed position and unlatched as illustrated in FIG. 53, such rotation of the plunger 856 by the actuator 854 in the clockwise direction rotates the magnet assembly 858''' relative to the magnet assembly 870'' such that the repulsive magnetic fields produced by the aligned magnets 860 and 880 (shown by double-headed arrows in FIG. 62B) force or "kick" the door 708 from the closed and unlatched position, as illustrated by example in FIG. 53, to an open position as illustrated by example in FIG. 57. The actuator 854 is further configured to be responsive to the actuator deactivation signal produced by the control circuit 810 to rotate the plunger 856 counterclockwise to rotate the magnet assembly 858''' from the second position illustrated in FIG. 62B to the first position illustrated in FIG. 62A such that the attractive magnetic fields produced by the aligned magnets 860 and 880 (shown by single-headed arrows in FIG. 62A) will act to draw the door 708 toward and to the closed position, thereby ensuring that the door 708 will not be inadvertently left open, and will further act to maintain the door 708 in the closed position.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected.

What is claimed is:

1. A panel configurable access door for a building, the panel configurable access door comprising:
    a core having first and second major faces opposite one another,
    first and second stiles defined along opposites sides respectively of the first major face of the core such that the first major face of the core between exterior surfaces of the first and second stiles defines a recessed pocket relative to the exterior surfaces of the first and second stiles, the core defining a length, between a top end of the core and a bottom end of the core, extending an entire length of the first and second stiles, each of the first and second stiles defining a channel therein extending longitudinally along an inwardly-facing edge thereof, the channel defined in each of the first and second stiles extending along the entire length of the respective one of the first and second stiles,
    a bottom elongated panel defining first tongue members at opposite sides thereof, the bottom elongated panel configured to be received transversely in the recessed pocket between the first and second stiles along bottom ends of the first and second stiles, the first tongue members configured to be received within the channels defined along the inwardly-facing edges of the first and second stiles to retain the bottom elongated panel in the recessed pocket, and
    a top elongated panel defining second tongue members at opposite sides thereof, the top elongated panel configured to be received transversely in the recessed pocket between the first and second stiles along top ends of the first and second stiles, the second tongue members configured to be received within the channels defined along the inwardly-facing edges of the first and second stiles to retain the top elongated panel in the recessed pocket,
    wherein, with the top and bottom elongated panels received in the recessed pocket, exterior faces of the first and second stiles, exterior faces of the top and bottom elongated panels, and an exposed surface of the recessed pocket between the top and bottom elongated panels and between the exterior surfaces of the first and second stiles together define an exterior surface of one side of the door.

2. The panel configurable access door of claim 1, wherein the core and the first and second stiles are of uniform construction.

3. The panel configurable access door of claim 1, wherein the first and second stiles are separate from, and mounted to, the core.

4. The panel configurable access door of claim 1, wherein the first and second stiles each define a lip extending longitudinally along and transversely away from the inwardly-facing edge thereof adjacent to the exterior face thereof such that the channel extends along the inwardly-facing edge between the lip and the recessed pocket, the lip extending over the channel such that the channel is recessed into the inwardly-facing edge relative to the lip.

5. The panel configurable access door of claim 4, wherein the first tongue members extend from the opposite sides of the bottom elongated panel such that side edges of each of the opposite sides of the bottom elongated panel are defined between the first tongue members and the exterior surface of the bottom elongated panel,
    and wherein the bottom elongated panel is configured to be received transversely in the recessed pocket between the first and second stiles with the first tongue members extending into the respective channels and the with the side edges of the bottom elongated panel abutting the respective lips of the first and second stiles.

6. The panel configurable access door of claim 4, wherein the second tongue members extend from the opposite sides of the top elongated panel such that side edges of each of the opposite sides of the top elongated panel are defined between the second tongue members and the exterior surface of the top elongated panel,
    and wherein the top elongated panel is configured to be received transversely in the recessed pocket between the first and second stiles with the second tongue members extending into the respective channels and the with the side edges of the top elongated panel abutting the respective lips of the first and second stiles.

7. The panel configurable access door of claim 1, wherein the top and bottom panels are configured such that, with the top and bottom elongated panels received in the recessed pocket, the exterior faces of the first and second stiles and the exterior faces of the top and bottom elongated panels are all co-planar with one another.

8. The panel configurable access door of claim 1, wherein the bottom elongated panel defines a lateral channel extending along a top edge thereof,
    and further comprising a middle elongated panel defining a third tongue member at a bottom end thereof, the middle elongated panel configured to be received longitudinally in the recessed pocket between the first and second stiles and between the top and bottom elongated panels, the third tongue member configured to be received within the lateral channel defined along the top edge of the bottom elongated panel to retain the middle elongated panel in the recessed pocket, wherein, with the top, bottom and middle elongated panels received in the recessed pocket, the exterior faces of the first and second stiles, the exterior faces of the top and bottom elongated panels, an exterior face of the middle elongated panel and exposed surfaces of the recessed pocket between the top, bottom and middle elongated panels define the exterior surface of the one side of the door.

9. The panel configurable access door of claim 1, wherein the top elongated panel defines a lateral channel extending along a bottom edge thereof,
and further comprising a middle elongated panel defining a third tongue member at a bottom end thereof, the middle elongated panel configured to be received longitudinally in the recessed pocket between the first and second stiles and between the top and bottom elongated panels, the third tongue member configured to be received within the lateral channel defined along the top edge of the bottom elongated panel to retain the middle elongated panel in the recessed pocket,
wherein, with the top, bottom and middle elongated panels received in the recessed pocket, the exterior faces of the first and second stiles, the exterior faces of the top and bottom elongated panels, an exterior face of the middle elongated panel and exposed surfaces of the recessed pocket between the top, bottom and middle elongated panels define the exterior surface of the one side of the door.

10. The panel configurable access door of claim 1, further comprising a first middle elongated panel defining third tongue members at opposite ends thereof, the first middle elongated panel configured to be received transversely in the recessed pocket between the first and second stiles and between the top and bottom elongated panels, the third tongue members configured to be received within the channels defined along the inwardly-facing edges of the first and second stiles to retain the first middle elongated panel in the recessed pocket,
wherein an exterior face of the first middle elongated panel further defines the exterior surface of the one side of the door.

11. The panel configurable access door of claim 10, further comprising a second middle elongated panel configured to be received longitudinally in the recessed pocket between the first middle elongated panel and the top elongate panel or the bottom elongated panel,
wherein an exterior face of the second middle elongated panel further defines the exterior surface of the one side of the door.

12. The panel configurable access door of claim 10, wherein the top elongated panel defines a first lateral channel extending along a bottom edge thereof, and the first middle elongated panel defines a second lateral channel extending along a top edge thereof,
and further comprising a second middle elongated panel defining third tongue members at top and bottom ends thereof, the third middle elongated panel configured to be received longitudinally in the recessed pocket between the first and second stiles and between the top and first elongated panels, the third tongue members configured to be received within the first and second lateral channel respectively defined along the bottom edge of the top elongated panel and the top edge of the first middle elongated panel to retain the middle elongated panel in the recessed pocket,
wherein, with the top, bottom, first and second middle elongated panels received in the recessed pocket, the exterior faces of the first and second stiles, the exterior faces of the top, bottom and first middle elongated panels, an exterior face of the second middle panel and exposed surfaces of the recessed pocket between the top, bottom, first middle and second middle elongated panels define the exterior surface of the one side of the door.

13. The panel configurable access door of claim 10, wherein the bottom elongated panel defines a first lateral channel extending along a top edge thereof, and the first middle elongated panel defines a second lateral channel extending along a bottom edge thereof,
and further comprising a second middle elongated panel defining third tongue members at top and bottom ends thereof, the third middle elongated panel configured to be received longitudinally in the recessed pocket between the first and second stiles and between the bottom and first elongated panels, the third tongue members configured to be received within the first and second lateral channel respectively defined along the top edge of the top bottom panel and the bottom edge of the first middle elongated panel to retain the middle elongated panel in the recessed pocket,
wherein, with the top, bottom, first and second middle elongated panels received in the recessed pocket, the exterior faces of the first and second stiles, the exterior faces of the top, bottom and first middle elongated panels, an exterior face of the second middle panel and exposed surfaces of the recessed pocket between the top, bottom, first middle and second middle elongated panels define the exterior surface of the one side of the door.

14. The panel configurable access door of claim 1, wherein the recessed pocket is a first recessed pocket, the channel defined in each of the first and second stiles is a first channel, the bottom elongated panel is a first bottom elongated panel, and the top elongated panel is a first top elongated panel, the panel configurable access door further comprising:
third and fourth stiles defined along opposites sides respectively of the second major face such that the second major face between exterior surfaces of the third and fourth stiles defines a second recessed pocket, each of the third and fourth stiles defining a second channel therein extending longitudinally along an inwardly-facing edge thereof,
a second bottom elongated panel defining third tongue members at opposite sides thereof, the second bottom elongated panel configured to be received transversely in the second recessed pocket between the third and fourth stiles with the third tongue members received within the second channels defined along the inwardly-facing edges of the third and fourth stiles to retain the second bottom elongated panel in the second recessed pocket, and
a second top elongated panel defining fourth tongue members at opposite sides thereof, the second top elongated panel configured to be received transversely in the second recessed pocket between the third and fourth stiles with the fourth tongue members received within the second channels defined along the inwardly-facing edges of the third and fourth stiles to retain the second top elongated panel in the second recessed pocket,
wherein, with the second top and second bottom elongated panels received in the second recessed pocket, exterior faces of the third and fourth stiles, exterior faces of the second top and second bottom elongated panels, and an exposed surface of the second recessed pocket between the second top and second bottom elongated panels define an exterior surface of an opposite side of the door.

15. The panel configurable access door of claim 14, further comprising at least one middle elongated panel defining third tongue members at opposite ends thereof, the at least one middle elongated panel configured to be received transversely in at least one of (i) the first recessed pocket between the first and second stiles and between the first top and first bottom elongated panels and (ii) the second recessed pocket between the second and third stiles and between the second top and second bottom elongated panels, the third tongue members configured to be received within at least one of (i) the first channels defined along the inwardly-facing edges of the first and second stiles to retain the at least one middle elongated panel in the first recessed pocket and (ii) the second channels defined along the inwardly-facing edges of the second and third stiles to retain the at least one middle elongated panel in the second recessed pocket.

16. A method of constructing a panel configurable access door for a building, the panel configurable door including a core having first and second major faces opposite one another, and first and second stiles defined along opposites sides respectively of the first major face of the core such that the first major face of the core between exterior surfaces of the first and second stiles defines a recessed pocket relative to the exterior surfaces of the first and second stiles, the core defining a length, between a top end of the core and a bottom end of the core, extending an entire length of the first and second stiles, each of the first and second stiles defining a channel therein extending longitudinally along an inwardly-facing edge thereof, the channel defined in each of the first and second stiles extending along the entire length of the respective one of the first and second stiles, the method comprising:
  placing a bottom elongated panel, defining first tongue members at opposite sides thereof, transversely in the recessed pocket between the first and second stiles along bottom ends of the first and second stiles with the first tongue members received within the channels defined along the inwardly-facing edges of the first and second stiles to retain the bottom elongated panel in the recessed pocket, and
  placing a top elongated panel, defining second tongue members at opposite sides thereof, transversely in the recessed pocket between the first and second stiles along top ends of the first and second stiles with the second tongue members received within the channels defined along the inwardly-facing edges of the first and second stiles to retain the top elongated panel in the recessed pocket,
  wherein exterior faces of the first and second stiles, exterior faces of the top and bottom elongated panels, and an exposed surface of the recessed pocket between the top and bottom elongated panels and between the exterior faces of the top and bottom elongated panels together define an exterior surface of one side of the door.

17. The method of claim 16, further comprising, prior to placing at least one of the top elongated panel and the bottom elongated panel transversely in the recessed pocket between the first and second stiles, placing at least a first middle elongated panel, defining third tongue members at opposite ends thereof, transversely in the recessed pocket between the first and second stiles with the third tongue members received within the channels defined along the inwardly-facing edges of the first and second stiles to retain the at least a first middle elongated panel in the recessed pocket,
  wherein, with the top elongated panel and the bottom elongated panel placed transversely in the recessed pocket between the first and second stiles, the at least a first middle elongated panel is positioned in the recessed pocket between the top and bottom elongated panels,
  and wherein an exterior face of the at least a first middle elongated panel, the exterior faces of the top and bottom panels, the exterior faces of the first and second tiles and exposed surfaces of the recessed pocket between the first, second and at least one additional elongated panels together define the exterior surface of the one side of the door.

18. The method of claim 17, wherein the top elongated panel defines a first lateral channel extending along a bottom edge thereof, and the at least a first middle elongated panel defines a second lateral channel extending along a top edge thereof,
  and wherein the method further comprises:
  prior to placing the top elongated panel transversely in the recessed pocket between the first and second stiles, placing a second middle elongated panel, defining fourth tongue members at top and bottom ends thereof, longitudinally in the recessed pocket between the first and second stiles with the fourth tongue member at the bottom end of the second middle elongated panel received within the second lateral channel defined along the top edge of the at least a first middle elongated panel, and
  placing the top elongated panel transversely in the recessed slot between the first and second stiles with the fourth tongue member at the top end of the second middle elongated panel received within the first lateral channel defined along the bottom edge of the top elongated panel, to retain the second middle elongated panel in the recessed pocket,
  wherein, with the top elongated panel, the bottom elongated panel, the at least a first additional elongated panel and the second middle elongated panel all received in the recessed pocket, the exterior faces of the first and second stiles, the exterior faces of the top, bottom and at least a first middle elongated panels, an exterior face of the second middle panel and exposed surfaces of the recessed pocket between the top, bottom, at least a first middle and the second middle elongated panels together defining the exterior surface of the one side of the door.

19. The method of claim 17, wherein the bottom elongated panel defines a first lateral channel extending along a top edge thereof, and the at least a first middle elongated panel defines a second lateral channel extending along a bottom edge thereof,
  and wherein the method further comprises:
  prior to placing the at least a first middle elongated panel transversely in the recessed pocket between the first and second stiles, placing a second middle elongated panel, defining fourth tongue members at top and bottom ends thereof, longitudinally in the recessed pocket between the first and second stiles with the fourth tongue member at the bottom end of the second middle elongated panel received within the first lateral channel defined along the top edge of the bottom elongated panel, and placing the at least a first middle elongated panel transversely in the recessed slot between the first and second stiles with the fourth tongue member at the top end of the second middle elongated panel received within the second lateral channel defined along the bottom edge of the at least a first middle elongated panel, to retain the second middle elongated panel in the recessed pocket, wherein, with the top elongated panel, the bottom elongated panel, the at least a first additional elongated panel and the second middle elongated panel all received in the recessed pocket, the exterior faces of the first and second stiles, the exterior faces of the top, bottom and at least a first middle elongated panels, an exterior face of the second middle panel and exposed surfaces of the recessed pocket between the top, bottom, at least a first middle and the second middle elongated panels together defining the exterior surface of the one side of the door.

20. The method of claim 17, wherein the at least a first middle elongated panel includes at least two middle elongated panels with a bottom one of the at least two middle elongated panels defining a first lateral channel extending along a top edge thereof, and with a top one of the at least two middle elongated panels defining the a second lateral channel extending along a bottom edge thereof, and wherein the method further comprises:

prior to placing the top one of the at least two middle elongated panels transversely in the recessed pocket between the first and second stiles, placing a second middle elongated panel, defining fourth tongue members at top and bottom ends thereof, longitudinally in the recessed pocket between the first and second stiles with the fourth tongue member at the bottom end of the second middle elongated panel received within the first lateral channel defined along the top edge of the bottom one of the at least two middle elongated panels, and placing the top one of the at least two middle elongated panels transversely in the recessed pocket between the first and second stiles with the fourth tongue member at the top end of the second middle elongated panel received within the second lateral channel defined along the bottom edge of the top one of the at least two middle elongated panels, to retain the second middle elongated panel in the recessed pocket, wherein, with the top elongated panel, the bottom elongated panel, the at least two middle elongated panels and the second middle elongated panel all received in the recessed pocket, the exterior faces of the first and second stiles, the exterior faces of the top, bottom and the at least two middle elongated panels, an exterior face of the second middle panel and exposed surfaces of the recessed pocket between the top, bottom, at least two middle and the second middle elongated panels together defining the exterior surface of the one side of the door.

* * * * *